United States Patent
Heo et al.

(10) Patent No.: US 8,327,066 B2
(45) Date of Patent: Dec. 4, 2012

(54) METHOD OF MANAGING A SOLID STATE DRIVE, ASSOCIATED SYSTEMS AND IMPLEMENTATIONS

(75) Inventors: Jin Gyu Heo, Seoul (KR); Donggi Lee, Yongin-si (KR); Seongsik Hwang, Seoul (KR); Dongjin Lee, Seoul (KR); Jeong Woo Lee, Seoul (KR); Wonmoon Cheon, Hwaseong-si (KR); Seungho Lim, Suwon-si (KR); Jong-Min Kim, Anyang-si (KR); Jae-Hwa Lee, Busan (KR); Haeri Lee, Yongin-si (KR); Woonhyug Jee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 411 days.

(21) Appl. No.: 12/585,935

(22) Filed: Sep. 29, 2009

(65) Prior Publication Data
US 2010/0082890 A1    Apr. 1, 2010

Related U.S. Application Data

(60) Provisional application No. 61/136,822, filed on Oct. 7, 2008.

(30) Foreign Application Priority Data

| Sep. 30, 2008 | (KR) | 10-2008-0096117 |
| Oct. 15, 2008 | (KR) | 10-2008-0101093 |
| Oct. 15, 2008 | (KR) | 10-2008-0101095 |
| Oct. 15, 2008 | (KR) | 10-2008-0101097 |
| Oct. 15, 2008 | (KR) | 10-2008-0101098 |

(51) Int. Cl.
*G06F 13/00* (2006.01)
*G06F 13/28* (2006.01)
*G06F 12/00* (2006.01)

(52) U.S. Cl. . 711/103; 711/112; 711/170; 711/E12.008; 713/100; 714/6.13

(58) Field of Classification Search ............ 711/103, 711/112, 170, E12.008; 713/100; 714/6.13
See application file for complete search history.

(56) References Cited

U.S. PATENT DOCUMENTS 6,260,156 B1 * 7/2001 Garvin et al. ............... 714/6.13
(Continued)

FOREIGN PATENT DOCUMENTS

JP    2001-075773    3/2001
(Continued)

OTHER PUBLICATIONS

U.S. Office Action mailed Aug. 24, 2012 for U.S. Appl. No. 13/067,434.

*Primary Examiner* — Edward Dudek, Jr.
(74) *Attorney, Agent, or Firm* — Harness, Dickey & Pierce, P.L.C.

(57) ABSTRACT

A solid state drive may include one or more memory cell arrays divided into a plurality of blocks. A first portion of the blocks may be designated for storing user data and a second portion of the blocks may be designated as reserved blocks for replacing defective blocks in the first portion. In one embodiment, the method includes reformatting, by a memory controller, the solid state drive to convert one or more blocks in the first portion into reserved blocks.

29 Claims, 51 Drawing Sheets

U.S. PATENT DOCUMENTS

| | | |
|---|---|---|
| 7,073,053 B1 | 7/2006 | Oz et al. |
| 2001/0039612 A1 | 11/2001 | Lee |
| 2007/0047305 A1* | 3/2007 | Conley .................... 365/185.05 |
| 2007/0174602 A1 | 7/2007 | Kao |
| 2008/0082726 A1* | 4/2008 | Elhamias .................... 711/103 |
| 2009/0244982 A1 | 10/2009 | Han et al. |
| 2010/0235605 A1* | 9/2010 | Perry et al. .................... 711/170 |

FOREIGN PATENT DOCUMENTS

| | | |
|---|---|---|
| JP | 2002-269992 | 9/2002 |
| JP | 2004-259012 | 9/2004 |

* cited by examiner

Fig. 2

| Value | Command |
|---|---|
| 00h-CFh | Reserved |
| D0h | SMART READ DATA |
| D1h | Obsolete |
| D2h | SMART ENABLE/DISABLE ATTRIBUTE AUTOSAVE |
| D3h | SMART SAVE ATTRIBUTE VALUES |
| D4h | SMART EXECUTE OFF-LINE IMMEDIATE |
| D5h | SMART READ LOG |
| D6h | SMART WRITE LOG |
| D7h | Obsolete |
| D8h | SMART ENABLE OPERATIONS |
| D9h | SMART DISABLE OPERATIONS |
| DAh | SMART RETURN STATUS |
| DBh | Obsolete |
| DCh-DFh | Reserved |
| E0h-FFh | Vendor Specific |

Fig. 3

| Byte | F/V | Descriptions |
|---|---|---|
| 0-361 | X | Vendor speciifc |
| 362 | V | Off-line data collection status |
| 363 | X | Self-test execution status byte |
| 364-365 | V | Total time in seconds to complete off-line data collection activite |
| 366 | X | Vendor specific |
| 367 | F | Off-line data collection capability |
| 368-369 | F | SMART capability |
| 370 | F | Error logging capability<br>7-1    Reserved<br>  0        1=Device error logging supported |
| 371 | X | Vendor specific |
| 372 | F | Short self-test routine recommended polling time(in minutes) |
| 372 | F | Extended self-test routine recommended polling time(in minutes) |
| 374-385 | R | Reserved |
| 386-510 | X | Vendor specific |
| 511 | V | Data structure checksum |

Key:
F=The content of the byte is fixed and does not change.
V=The content of the byte is variable and may chage depending on the state of the device or the commands executed by the device.
X=The content of the byte is vendor specific and may be fixed or variable
R=The content of the byte is reserved and shall be zero

Fig. 4

| Byte | F/V | Descriptions |
|---|---|---|
| 0~1 | X | SSD's smart data version |
| 2~3 | X | Reserved block count |
| 4~7 | V | Runtime bad block count |
| 8~11 | V | Wear leveling count |
| 12~15 | X | Uncorrectable error count |
| 16~19 | X | Program/erase fail count |
| 20~23 | X | Column fail count |

Fig. 5

| Flash Status | Parameters | | | | | | Result | | | | Display |
|---|---|---|---|---|---|---|---|---|---|---|---|
| | Pa | Pb | Pc | Pd | Pe | Pf | Por | Pand | Psum | | |
| Good | a1-a2 | b1-b2 | c1-c2 | d1-d2 | e1-e2 | f1-f2 | | | | | Green |
| Warning | a3-a4 | b3-b4 | c3-c4 | d3-d4 | e3-e4 | f3-f4 | | | | | Yellow |
| Bad | a5-a6 | b5-b6 | c5-c6 | d5-d6 | e5-e6 | f5-f6 | | | | | Red |

Pa=Reserved block count
Pb=Runtime bad block count
Pc=Wear leveling count
Pd=Uncorrectable error count
Pe=Program/Erase fail count
Pf=Column fail count Por=(Pa or Pb or Pc or Pd or Pe or Pf)
Pand=(Pa and Pb and Pc and Pd and Pe and Pf)
Psum=F(Pa, Pb, Pc, Pd, Pe, Pf)

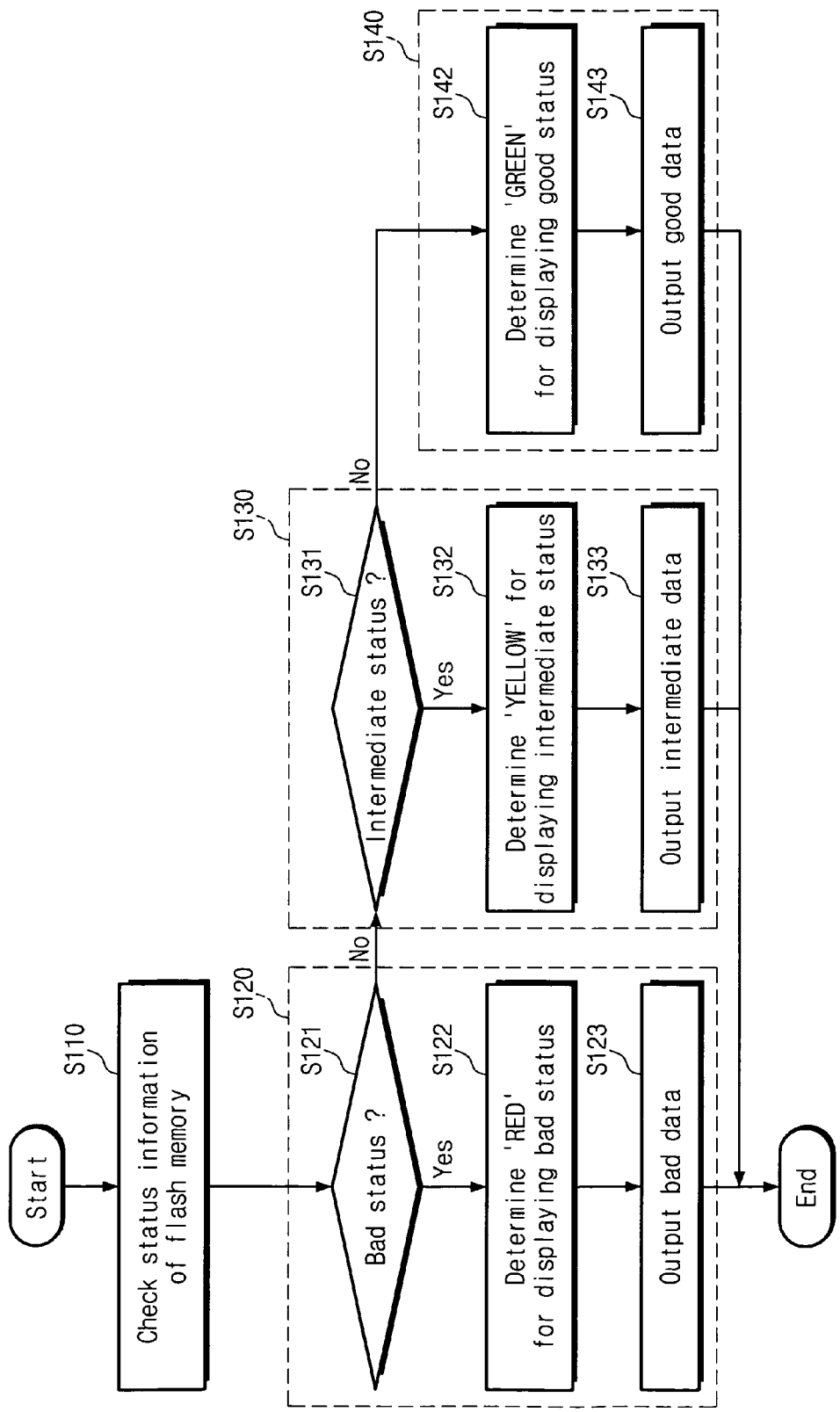

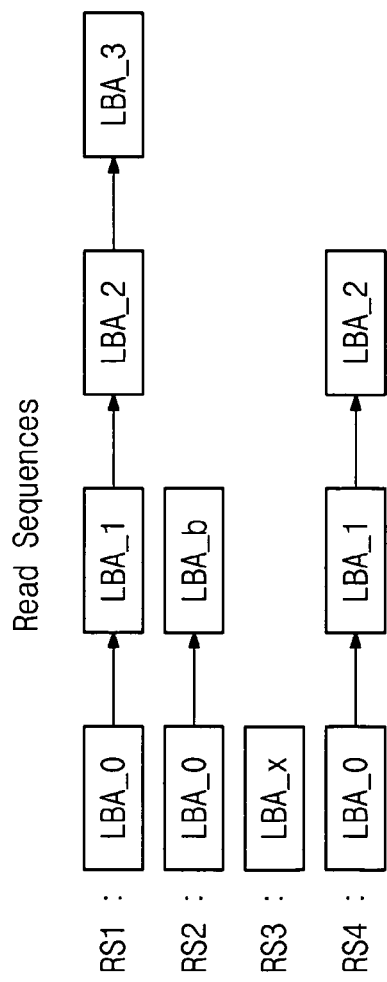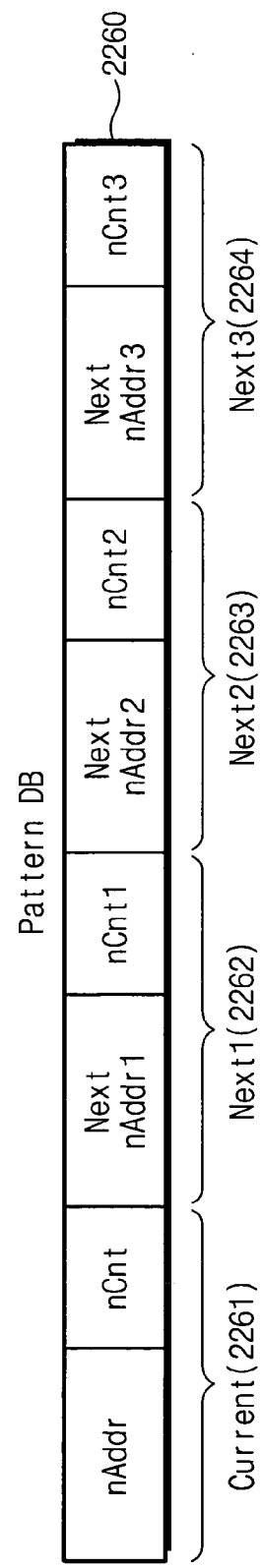

logfile

| | CMD | LBA | nSC |
|---|---|---|---|
| | read | 169439 | 16 |
| | read | 169455 | 16 |
| | read | 169471 | 16 |
| CMD Seq.  | read | 6320903 | 2 |
| | read | 1134783 | 2 |
| | read | 1134787 | 127 |
| | read | 1134914 | 127 |
| | read | 1135041 | 127 | us# METHOD OF MANAGING A SOLID STATE DRIVE, ASSOCIATED SYSTEMS AND IMPLEMENTATIONS

CROSS REFERENCE TO RELATED APPLICATIONS

This U.S. non-provisional patent application claims priority under 35 U.S.C. §119 to Korean Patent Application Nos. 10-2008-0096117, 10-2008-0101093, 10-2008-0101095, 10-2008-0101097 and 10-2008-0101098 in the Korean Intellectual Property Office (KIPO) filed on Sep. 30, 2008, Oct. 15, 2008, Oct. 15, 2008, Oct. 15, 2008 and Oct. 15, 2008 and U.S. Provisional Application No. 61/136,822 filed on Oct. 7, 2008 the entire contents of all of which are herein incorporated by reference.

BACKGROUND

In general, a memory system includes a memory device for storing data and a host for controlling operations of the memory device. The memory device is classified into a volatile memory (such as DRAM, SRAM, and so forth) and a non-volatile memory (such as EEPROM, FRAM, PRAM, MRAM, flash memory, and so forth).

The volatile memory loses its stored data when power supply is cut off, but the non-volatile memory retains its stored data even when there is no power supply. Among non-volatile memories, the flash memory is widely used as a data storage medium because of advantages such as a high programming speed, lower power consumption, high capacity data storage, and so forth.

A memory device demanding a high degree of integration causes defective products because of a plurality of limited requirements in manufacturing processes. Various trials have been made in order to resolve yield decrease and defects, which are caused by the factors such as the high degree of integration of a memory device. However, if a memory device is mounted in a memory system and is in operation, it is difficult for a user to determine defectiveness of a memory device.

A high capacity storage device such as a flash memory card or a solid state disk (SSD) has a typical structure including a plurality of flash memory chips. In general, the SSD is designed to replace a hard disk drive, and therefore, has a significantly larger capacity than a memory card. For example, the SSD may have one or two orders of magnitude greater storage space. Accordingly, the SSD includes many more flash memory chips than a memory card. In some flash memory chips, if the number of bad blocks is drastically increased due to program/erase fails and pre-reserved replacement blocks are all consumed, no more service is available.

A semiconductor memory device is a memory device capable of reading data when necessary after storing the data. The semiconductor memory device is largely classified into a random access memory (RAM) and a read only memory (ROM). Data stored in the RAM disappears when power supply is cut off. This type of a memory is called a volatile memory. On the contrary, data stored in the ROM does not disappear even when there is no power supply. This type of a memory is called a non-volatile memory.

A kind of the non-volatile memory device includes a flash memory device. The flash memory device is largely classified into a NOR type and a NAND type. Recently, portable electronic devices such as digital cameras, MP3 players, mobile phones, PDAs, and so forth use flash memories. This is because the flash memory is a non-volatile device having characteristics such as low power consumption and the high degree of integration. Because the flash memory is used in the portable electronic device, the reliability and life cycle of the flash memory are closely related to those of the portable electronic device. Accordingly, it is desirable to improve the reliability and life cycle of the flash memory.

Other specific volatile memory devices include SRAM, DRAM, and SDRAM. Other non-volatile memory devices include ROM, PROM, EPROM, EEPROM, PRAM, MRAM, RRAM, and FRAM.

Lately, a semiconductor disk device using a semiconductor memory device has been developed. The semiconductor disk device is better than a hard disk using a rotational disk, in aspects of reliability and speed. Accordingly, a computing system using the semiconductor disk device instead of a hard disk as a storage device has been developed.

SUMMARY

Embodiments relate to a method of managing a solid state drive.

For example, a solid state drive may include one or more memory cell arrays divided into a plurality of blocks. A first portion of the blocks may be designated for storing user data and a second portion of the blocks may be designated as reserved blocks for replacing defective blocks in the first portion.

In this and the following embodiments, at least one of a read operation and a write operation may be performed with respect to the first portion through a plurality of channels, wherein each channel includes at least one or a portion of one of the memory cell arrays.

In one embodiment, the method includes reformatting, by a memory controller, the solid state drive to convert one or more blocks in the first portion into reserved blocks.

The memory controller may determine if a number of available reserved blocks in the solid state drive is less than a threshold number. An available reserved block is a reserved block available to replace a block in the first portion. The solid state drive is reformatted to convert one or more blocks in the first portion into reserved blocks if the number of available reserved blocks in the solid state drive is less than the threshold number.

The memory controller may also determine if sufficient available space exists in the first portion to permit reformatting the solid state drive if the number of available reserved blocks in the solid state drive is less than a threshold number. Here the solid state drive is reformatted to convert one or more blocks in the first portion into available reserved blocks if (1) the number of available reserved blocks in the solid state drive is less than the threshold number and (2) sufficient available space exists in the first portion to permit reformatting the solid state drive.

In one embodiment, reformatting involve filling, at least partially, at least one block in the first portion by moving valid data portions from partially valid blocks in the first portion, creating free blocks from the partially valid blocks by erasing the partially valid blocks, and converting at least one of the created free blocks to an available reserved block.

In another embodiment, reformatting involves filling, at least partially, at least one block in the first portion by moving valid data portions from partially valid blocks in the first portion, creating free blocks from the partially valid blocks by erasing the partially valid blocks, and setting at least one of the created free blocks to a hybrid state. The hybrid state is recognized as a bad block by a host accessing the solid state drive and is recognized as an available reserved block by the solid state drive such that the host interprets a size of the first portion as being unchanged.

In a further embodiment, reformatting involves converting at least one free block in the first portion to an available reserved block.

In a still further embodiment, reformatting involves setting at least one free block in the first portion to the hybrid state.

In another embodiment, reformatting involves converting at least one invalid block storing invalid data to a free block, and converting at least one of the created free blocks to an available reserved block.

In a further embodiment, reformatting involves converting at least one invalid block storing invalid data to a free block, and setting at least one of the created free blocks to the hybrid state.

According to another embodiment of a method of managing a solid state drive, the embodiment includes increasing, by a memory controller, a number of available reserved blocks in the solid state drive, an available reserved block being a reserved block available to replace a block in the first portion.

In one embodiment, the increasing operation decreases a number of blocks in the first portion as seen by a host or operation system.

In another embodiment, the increasing operation does not decrease the number of blocks in the first portion as seen by a host or operating system.

According to yet another embodiment of a method of managing a solid state drive, the method includes setting, by a memory controller, at least one free block in the first portion to a hybrid state. The hybrid state is recognized as a bad block by a host accessing the solid state drive and is recognized as an available reserved block by the solid state drive such that the host interprets a size of the first portion as being unchanged.

In one embodiment, an indicator associated with the free block in a flash translation layer of a memory controller is set to indicate the hybrid state.

Embodiments also related to systems and implementations associated with managing a solid state drive.

In one embodiment, the system includes a memory device having one or more memory cell arrays divided into a plurality of blocks. A first portion of the blocks is designated for storing user data and a second portion of the blocks is designated as reserved blocks for replacing defective blocks in the first portion. The system also includes a memory controller configured to change one or more blocks in the first portion to reserved blocks.

In one embodiment, the memory controller is configured to determine if a number of available reserved blocks in the memory device is less than a threshold number. An available reserved block is a reserved block available to replace a block in the first portion. The memory controller is also configured to change one or more blocks in the first portion to reserved blocks if the first determining step determines the number of available reserved blocks in the solid state drive is less than a threshold number.

In one embodiment, the memory controller is configured to receive information on the number of available reserved blocks from a status checking module.

In another embodiment, the memory controller is configured to remove an association of at least one block address with the first portion to change one or more blocks in the first portion to reserved blocks.

In a further embodiment, the memory controller is configured to change an association of at least one block address from the first portion to the second portion to change one or more blocks in the first portion to reserved blocks.

In a still further embodiment, the memory controller is configured to change an indicator associated with at least one block address in an address translation table to change one or more blocks in the first portion to reserved blocks.

BRIEF DESCRIPTION OF DRAWINGS

FIG. 2 is a table illustrating command formats that are obtained by classifying SMART commands based on a feature register value.

FIG. 3 is a table illustrating a data structure for a result value of a SMART READ DATA command.

FIG. 4 is a table illustrating status information of a flash memory through a data area that a manufacturer can use.

FIG. 5 is a table illustrating a method for determining a status of a flash memory through various parameters representing statuses of the flash memory.

FIG. 6 is a flowchart illustrating a method of testing a status of the flash memory of FIG. 1.

FIG. 24A illustrates request sequences and will be used to explain the method of creating and updating a pattern database.

FIG. 24B illustrates an entry in the pattern database.

DETAILED DESCRIPTION

Figure 1:
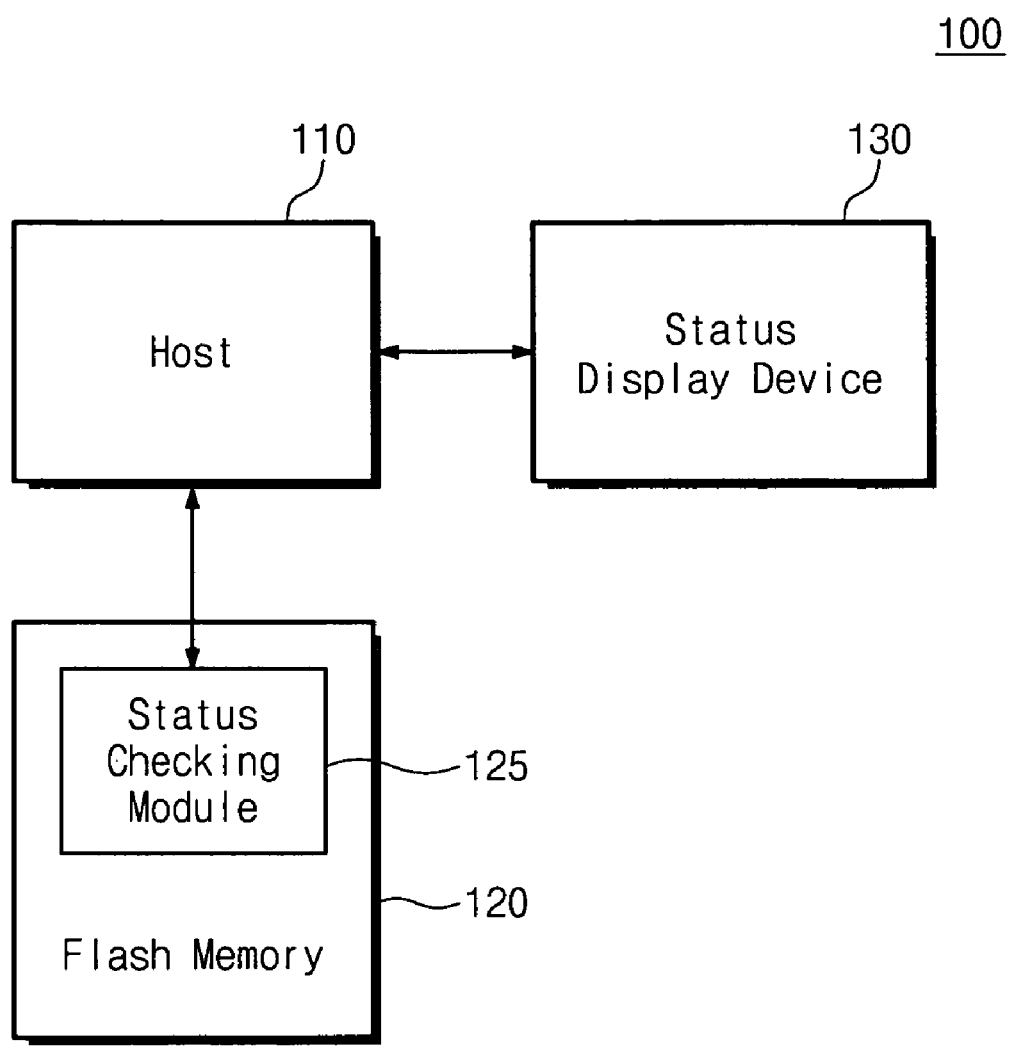
FIG. 1 is a block diagram illustrating a memory system according an first embodiment.

Various example embodiments will now be described more fully with reference to the accompanying drawings in which some example embodiments of the invention are shown. In the drawings, the thicknesses of layers and regions are exaggerated for clarity.

Specific structural and functional details disclosed herein are merely representative for purposes of describing example. This invention may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, embodiments according to inventive concepts of the present invention will be described in more detail with reference to the accompanying drawings in order that a person of ordinary skill in the art may easily implement the technical idea of inventive concepts of the present invention.

Inventive concepts of the present invention relates to a nonvolatile memory device, a memory system (e.g. a solid state drive SSD) including a nonvolatile memory device and a computing system including a memory system having a nonvolatile memory device. Inventive concepts of the present invention provides a nonvolatile memory device, a memory system (e.g. a SSD) and a computing system including a memory system having a nonvolatile memory device having advanced reliabilities and advanced operating speed. For example, a flash memory device, a memory system (e.g. a SSD) including a flash memory device and a computing system including a memory system having a flash memory device are described. However, the technical spirit according to inventive concepts of the present invention is not limited to a flash memory, a memory system including a flash memory device and a computing system including a memory system having a flash memory device. The technical spirit according to inventive concepts of the present invention is able to be applied and modified to a nonvolatile memory device such as a read only memory (ROM), a programmable ROM (PROM), an electrically programmable ROM (EPROM), an electrically programmable and erasable ROM (EEPROM), a flash memory, a magnetic random access memory (MRAM), a ferroelectric RAM (FeRAM or FRAM), a phase-change RAM (PRAM), a resistive RAM (RRAM), etc.

Status Monitoring

Hereinafter, referring to FIG. 1 to FIG. 11, a first embodiment according to inventive concepts of the present invention is described.

FIG. 1 is a block diagram illustrating a memory system according to the first embodiment of inventive concepts of the present invention. Referring to FIG. 1, a memory system 100 includes a host 110, a flash memory 120 including a status checking module 125, and a status display device 130 for displaying a status of the flash memory 120. The flash memory 120 may be a solid state drive (SSD). The memory system 100 tests status information of the flash memory 120 through the status checking module 125 and displays the test result to the external through the status display device 130.

The host 110 uses a SMART related command of an advanced technology attachment (ATA) interface in order to provide status information of the flash memory 120. SMART is an acronym for Self-Monitoring, Analysis and Reporting Technology, which can predict possible failure of a disk drive, and is a hard disk drive protocol. The SMART command will be described in more detail with reference to FIG. 2.

The flash memory 120 includes a plurality of memory cells for storing data. A set of the memory cells is called a memory cell array. The memory cell array includes a plurality of memory blocks. Each memory block includes a plurality of pages. Each page includes a plurality of memory cells. The flash memory 120 performs an erase operation by a memory block unit and performs a write or read operation by a page unit.

The flash memory 120 may store one bit data in one memory cell or more than one bit data in one memory cell. In general, a memory cell storing one bit data is called a single level cell (SLC), and a memory cell storing more than one bit data is called a multi level cell (MLC). The SLC has an erase status and a program status according to a threshold voltage. The MLC has an erase status or a plurality of program statuses according to more than one threshold voltage.

The flash memory 120 includes a status checking module 125. The status checking module 125 for tests a defective status of the flash memory 120 through various status information of the flash memory 120.

Parameters for detecting status information of the flash memory 120 include a reserved block count, a runtime bad block count, a wear leveling count, an uncorrectable error count, a program/erase fail count, and a column fail count. The reserved block count is the number of reserved blocks. It may be, for example, 2% of all storage capacity. The runtime bad block count is the number of the bad blocks during run time of the flash memory 120 after the flash memory is manufactured. The wear leveling count is the number of Program/Erase cycles performed during a wear leveling operation; namely, the number of times a wear leveling operation is performed to even out high erase and low erase sections of memory. The program/erase fail count is the number of program/erase fails (e.g., where program or erase of a flash cell has failed). The column fail count is the number of times a column line (bit line) has malfunctioned.

The status checking module 125 generates status information for displaying a defect status of the flash memory 120 through various parameters. The status checking module 125 combines status information to determine a status of the flash memory 120 and/or provides the status information to the host 110 in order to allow the host 110 to combine the status information and determine a status of the flash memory 120. At this point, the status checking module 125 provides the status information to the host 110 in response to the SMART command.

Moreover, the status checking module 125 updates periodically a plurality of status information of the flash memory 120 in the cell array of the flash memory 120. This is for preventing the loss of status information of the flash memory 120 during sudden power off of the memory system 100. Here, the sudden power off means a case of when power supply is cut off due to various unwanted reasons such as carelessness during an operation of the memory system 100.

Furthermore, the status checking module 125 compensates status information for the flash memory 120 with an appropriate value when sudden power off occurs. For example, let's assume a situation where status information is a program/erase cycle. Under the assumption that the updated program/erase cycle count is 1000 and an update period is 10 seconds before sudden power off, the program/erase cycle count is compensated with 1010 during the next update after sudden power off. A compensation value preparing for sudden power off can be obtained through various experimental data.

Additionally, the memory system 100 according to inventive concepts of the present invention may prepare for sudden power off through an auxiliary battery (not shown). Once sudden power off occurs, the memory system 100 updates status information of the flash memory 120 in the cell array of the memory cell through an auxiliary power supply or battery.

A status display device 130 displays a status of the flash memory 120 to a user. The status display device 130 displays whether the flash memory 120 is a good status, an intermediate status, or a bad status according to status information of the status checking module 125. Through the status display device 130, a user confirms a status of the flash memory 120 and also performs various operations such as data backup or memory replacement.

The status display device 130 may be realized with a display device such as an LED. For example, if the flash memory 120 is in a good status, the status display device 130 turns on a green LED. If the flash memory 120 is in the intermediate status, the status display device 130 turns on a yellow LED. If the flash memory 120 is in a bad status, the status display device 130 turns on a red LED. Therefore, a status of the flash memory 120 can be displayed externally.

Additionally, the status checking device 130 can display a status of the flash memory 120 through an alarm device's alarm sound, a monitor's message box and a graph, an LED's light, etc.

The memory system 100 of FIG. 1 includes the status checking module 125 for testing a status of the flash memory 120 and the status display device 130 for displaying a status of the flash memory 120 externally. A status of the flash memory 120 used in the memory system 100 can be easily confirmed and operations such as data backup or memory replacement can be performed at an appropriate time.

FIG. 2 is a table illustrating command formats that are obtained by classifying SMART commands based on a feature register value. Among SMART commands of FIG. 2, nine commands such as SMART READ DATA(D0h), SMART ENABLE/DISABLE ATTRIBUTE AUTOSAVE (D2h), SMART SAVE ATTRIBUTE VALUE(D3h), SMART EXECUTE OFF-LINE IMMEDIATE(D4h), SMART READ LOG(D5h), SMART WRITE LOG(D6h), SMART ENABLE OPERATIONS(D8h), SMART DISABLE OPERATIONS (D9h), and SMART RETURN STATUS(DAh) are designated by standards or protocols.

In order to provide status information of the flash memory 120 of FIG. 1, the SMART READ DATA command having the feature register value of D0h can be used. That is, when the SMART READ DATA command is provided from the host 110 of FIG. 1, the flash memory 120 generates status information that represents a status of the flash memory 120 through the status checking module 125 and then provides it to the host 110.

On the other hand, a command (for example, FFh) corresponding to one feature register value among a range of E0h to FFh (i.e., an area of a feature register value), that a manufacturer can use, may be used as a command for providing status information of the flash memory 120. Additionally, one of nine standard commands may be used as the above command.

FIG. 3 is a table illustrating a data structure for a result value of a SMART READ DATA command. As illustrated in FIG. 3, a data structure of the SMART READ DATA command may be constituted by 512 bytes. Through a data area (0 byte to 361 byte and 386 byte to 510 byte) that a manufacturer can use among the 512 bytes, status information (such as a reserved block count, a wear leveling count, a program/erase fail count, a column fail count, and a program/erase cycle count) can be provided.

In FIG. 3, 'F' means that the content of a corresponding byte is fixed and does not change. 'V' means that the content of a corresponding byte is variable and may change. 'R' means that the content of a corresponding byte is reserved and shall be 0. 'X' means that the content of a corresponding byte is vendor specific and may be fixed or variable.

FIG. 4 is a table illustrating status information of a flash memory through a data area that a manufacturer can use. In FIG. 4, a reserved block count, a runtime bad block count, a wear leveling count, an uncorrectable error count, a program/ erase fail count, and a column fail count are provided. Other than those, the status information of the flash memory can include diverse information such as a program/erase cycle count, which indicates the number of program and erase cycles.

As illustrated in FIG. 4, a byte area 0 to 1 provides information about a SMART data version. A byte area of 2 to 3 provides information about a reserved block count. A byte area of 4 to 7 provides information about a runtime bad block count. A byte area of 8 to 11 provides information about a wear leveling count. A byte area of 12 to 15 provides information about an uncorrectable error count. A byte area of 16 to 19 provides information about a program/erase fail count. A byte area of 20 to 23 provides information about a column fail count. Additionally, the remaining area may provide a reserved block count or other necessary or desired information.

Status information of the flash memory 120 such as a reserved block count may be stored in a meta block of the flash memory 120. The flash memory 120 provides status information such as a reserved block count in response to the SMART READ DATA command or the SMART RETURN STATUS command. A user can easily confirm a status of the flash memory 120 through the SMART command.

FIG. 5 is a table illustrating a method for determining a status of a flash memory through various parameters representing statuses of the flash memory. Referring to FIG. 5, a status of the flash memory may be divided into good, intermediate, and bad. The intermediate status is a status state between the good and bad status. The intermediate status may indicate a warning status that the flash memory 120 is transitioning from the good to the bad state. For example, the warning state may indicate the flash memory 120 is approaching the bad state. The intermediate status may indicate to back-up the flash memory 120.

In one embodiment, the status of the flash memory is determined from six parameters Pa to Pf. Pa represents a reserved block count. Pb represents a runtime bad block count. Pc represents a wear leveling count. Pd represents an uncorrectable error count. Pe represents a program/erase fail count. Pf represents a column fail count. These parameters are just examples and a status of a flash memory can be determined through other parameters, or more or less than these six parameters.

Each of the parameters has threshold value ranges corresponding to a good status, an intermediate status, and a bad status. For example, if Pa is a value between a1 and a2, it is in a good status. If Pa is a value between a3 and a4, it is in an intermediate status. If Pa is a value between a5 and a6, it is in a bad status. Likewise, a value of a desired (or, alternatively a predetermined) range is given for Pb, Pc, Pd, Pe, and Pf according to a status. There may be various methods for determining a status of a flash memory through various parameters. Three representative methods are shown in FIG. 5.

First, there is a method for performing an OR operation on parameters (hereinafter, referred as a Por method). For example, the Por method generates an intermediates signal if at least one of several parameters corresponds to an intermediate status and generates a bad signal if at least one corresponds to a bad status. Otherwise, a good signal is generated. If an intermediate signal is generated, a yellow LED is turned on. If a bad signal is generated, a red LED is turned on.

Second, there is a method for performing an AND operation on parameters (hereinafter, referred to as a Pand method). For example, the Pand method generates an intermediate signal if all parameters correspond to an intermediate status. If all the parameters correspond to a bad status, the Pand method generates a bad signal. If an intermediate signal is generated, a yellow LED is turned on. If a bad signal is generated, a red LED is turned on. Otherwise, a good signal is generated.

Third, there is a method for combining parameters through operations other than the OR or AND operations (hereinafter, referred to as a function or Psum method). For example, in one embodiment of the Psum method, the status of each parameter is determined according to the table of FIG. 5. In this embodiment, a weight is associated with each status state (e.g., the good status state may have a weight of 0, the intermediate status state may have a weight at 3 and the bad status state may have a weight of 5). Alternatively, each parameter may have its own associated set of weights for the good, intermediate and bad states. The weight for each determined status state of each parameter is summed, and that sum (Psum) is compared to thresholds defining the good, intermediate, and bad states for the flash memory. For example, Psum$\leq$10 is good, 10<Psum$\leq$20 is intermediate, and 20<Psum is bad.

Alternatively, the weights for less than all of the parameters may be summed. As a still further alternative, some combination of the OR, AND and Psum methods may be used.

Also, the above parameter operations of FIG. 5 may be performed in the host 110 of FIG. 1, or the status checking module 125 of FIG. 1 in the flash memory 120 of FIG. 1. For example, if the parameter operation is performed in the host 110, the SMART READ DATA command may be used, and if the parameter operation is performed in the status checking module 125, the SMART RETURN STATUS command may be used.

FIG. 6 is a flowchart illustrating a method of testing a status of the flash memory 120 of FIG. 1. Hereinafter, a method of testing a status of the flash memory 120 in the memory system 100 will be described in more detail with reference to FIGS. 1 and 6. It is assumed that the parameter operation of FIG. 5 is performed in the host 110.

In operation S110, the status checking module 125 checks status information of the flash memory 120. The status checking module 125 checks various parameters such as a reserved block count in order to a test a status of the flash memory 120. The status checking module 125 provides status information of the flash memory 120 to the host 110 according to the SMART command of the host 110.

In operation S120, the host 110 receives the status information of the flash memory 120 and determines whether the flash memory 120 is in a bad status or not. The host 110 performs an operation (for example, an OR, AND, or SUM operation) on various parameters to determine a status of the flash memory 120.

If the flash memory 120 is determined as a bad status in operation S121, the host 110 determines red for displaying a bad status in operation S122. The host 110 outputs bad data or signal for displaying a bad status to the status display device 130.

Also, when the bad status in determined, the host may restrict input to and/or output from the flash memory. For example, read only one may be permitted. As another example, input and output may be prevented. Still further, this I/O restriction may be imposed by the host, the status checking module and/or a memory controller of the flash memory.

In operation S130, if the flash memory 120 is not determined as a bad status, whether it is an intermediate status or not is determined and an intermediate data or signals are output. If the intermediate status is determined in operation S131, the host 110 determines yellow for displaying an intermediate status in operation S132. The host 110 outputs intermediate data or signal for displaying an intermediate status to the status display device 130.

In operation S140, if the flash memory 120 is not determined as an intermediate status, good data or signal are output. If it is not determined as an intermediate status in operation S131, the host 110 determines green for displaying a good status in operation S142. The host 110 outputs good data or signal for displaying a good status to the status display device 130.

Referring to FIG. 6, if the flash memory 120 is not determined as a bad status in operation S121, it is determined whether the flash memory 120 is in an intermediate status or not in operation S131. If it is in an intermediate status, intermediate data are output, and if not, good data are output.

Here, the memory system 100 determines whether it is in an intermediate status or not in operation S131, and then performs several additional jobs such as an error checking and correcting (ECC) operation, data backup, memory replacement according to the determination result. Therefore, a bad status can be prevented or dealt with in advance.

Additionally, after operation S110, the memory system 100 may perform operation S120 for determining a bad status, operation S130 for determining an intermediate status, and operation S140 for determining a good status in a different order or concurrently.

Referring to FIG. 1 again, the memory system 100 tests a status of the flash memory 120 through a status checking module 125, and displays the test result externally through the status display device 130. Such that a user can easily confirm the test result. Accordingly, a good or bad status of the flash memory 120 can be easily identified and jobs such as data backup or memory replacement can be performed at an appropriate time.

Figure 7:
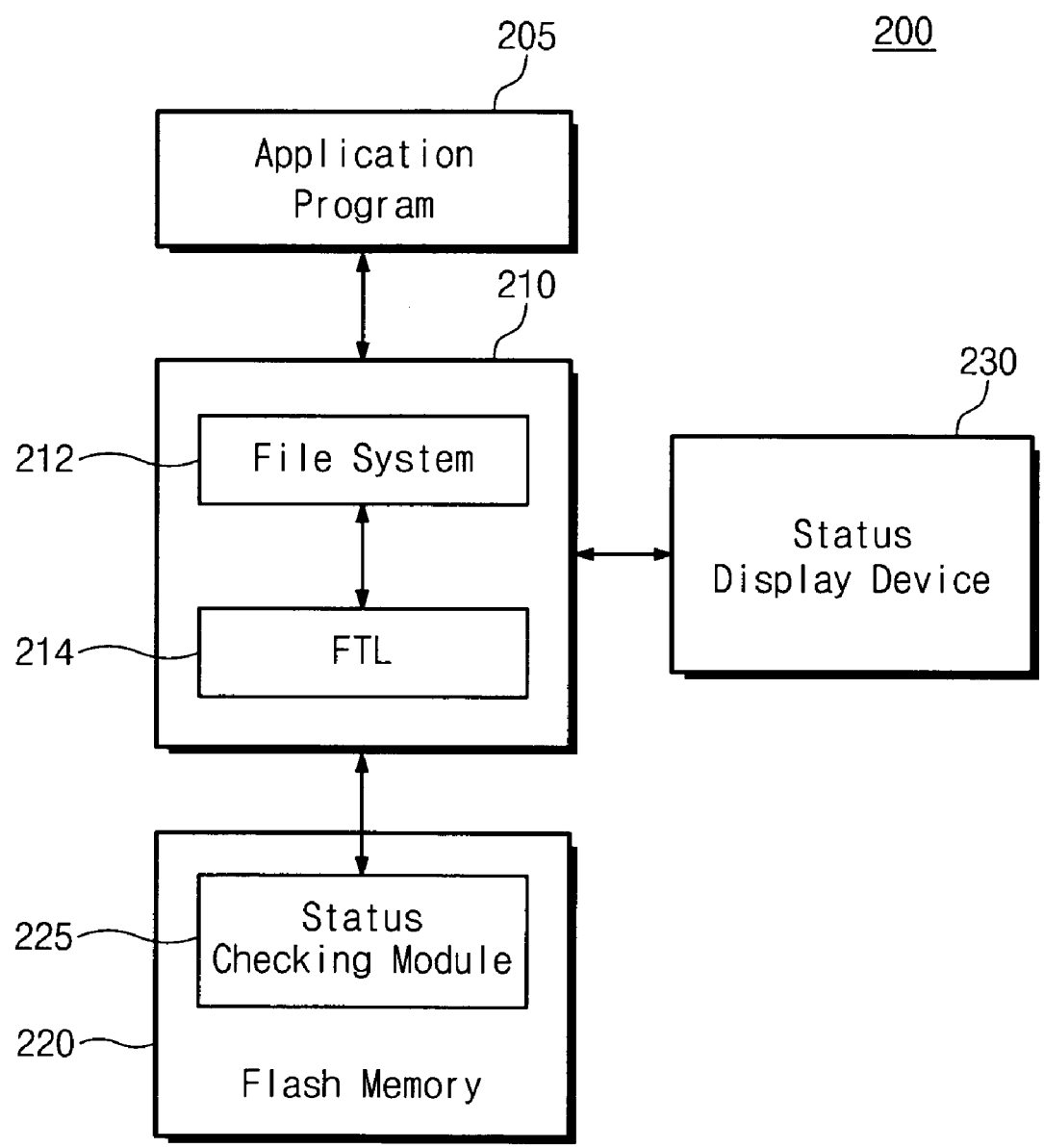
FIG. 7 is a block diagram illustrating a memory system according to another embodiment.

FIG. 7 is a block diagram illustrating a memory system according to another embodiment. Referring to FIG. 7, a memory system 200 includes a host 210 loading an application program 205, a flash memory 220 having a status checking module 225, and a status display device 230 for indicating a status of the flash memory 220.

The application program 205 includes an algorithm in order to allow a user to request a desired (or alternatively, a predetermined) data operation on the flash memory 220 or to perform a logical operation on a desired (or alternatively, a predetermined file). The host 210 loads the application program 205 in order to perform a desired (or alternatively, a predetermined) data operation on the flash memory 220 upon a user's request.

The host 210 includes a file system 212 and a flash translation layer (FTL) 214. The file system 212 loads the application program 205. The FTL 214 manages a data operation upon a user's request, that is, a read/write operation of the flash memory 220. The FTL 214 converts a logical address, generated during a write operation by the file system 212, into a physical address.

The flash memory 220 performs an erase operation before performing a write operation. Additionally, the flash memory 220 performs a write operation by a page unit and performs an erase operation by a block unit. That is, the flash memory 220 is characterized in having a larger erase operation unit than a write operation unit.

These characteristics may make it difficult for the flash memory 220 to be used as a main memory. Additionally, when the flash memory 220 is used as an auxiliary memory device, those characteristics may make it difficult to utilize a file system for a typical hard disk drive. Accordingly, the memory system 200 uses the FTL 214 between the file system 212 and the flash memory 220 in order to conceal an erase operation of the flash memory 220.

Due to an address mapping function of the FTL 214, the host 210 recognizes the flash memory 220 as a hard disk, and can access the flash memory 220 using the same method as with a hard disk. If the flash memory 220 is used as a solid state disk or drive (SSD) or a hard disk, the flash memory 220 includes a status checking module 225 and utilizes SMART related commands in order to provide a bad status of the flash memory 220 to a user.

The status checking module 225 tests an intermediate status of the flash memory 220 through various parameters of the flash memory 220. A method of testing an intermediate status of the flash memory 220 is the same as the above method. The status checking module 225 provides status information to the host 210 through various parameters. The status information is used for displaying status of the flash memory 220 externally.

The status display device 230 is a device for notifying a user of a status of the flash memory 220. The status display device 230 displays a good status, an intermediate status, or a bad status of the flash memory 220 according to status information of the status checking module 225. A user confirms the status of the flash memory 220 through the status display device 230 and also performs jobs such as data backup or memory replacement.

The memory system 200 of FIG. 7 uses the application program 205 to recognize a status of the flash memory 220. The application program 205 communicates with the status checking module 225 periodically and determines a status of the flash memory 220. Then, the application program 205 notifies the status display device 230 of the determined result. If the application program 205 is used, the status of the flash memory 220 can be shown in a message box or a graph through a monitor other than an LED.

The memory system 200 of FIG. 7 updates status information in the flash memory 220 against sudden power off, or compensates for status information for update. Additionally, the memory system 200 may update status information in the flash memory 220 through an auxiliary battery.

Figure 8:
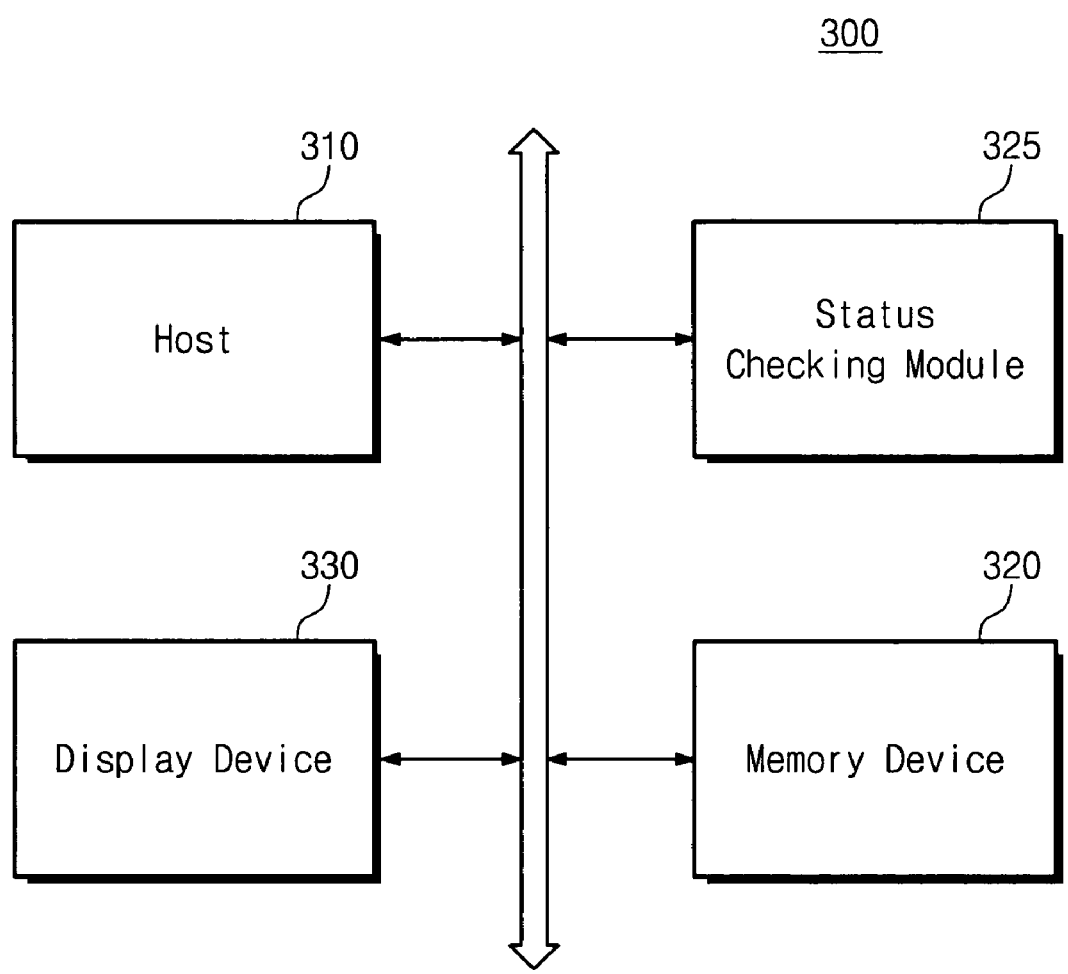
FIG. 8 is a block diagram illustrating a memory system according to another embodiment.

FIG. 8 is a block diagram illustrating a memory system according to another embodiment of inventive concepts of the present invention. Referring to FIG. 8, a memory system 300 includes a host 310, a memory device 320, a status checking module 325, and a display device 330. In FIG. 8, the memory device 320 may include volatile memories (for example, DRAM, SRAM, etc.), non-volatile memories (for example, PRAM, MRAM, etc.), a hard disk, SSD, OneNAND, and CD ROM other than the flash memory. Moreover, the status checking module 325 may be placed in the memory device 320. As shown in FIG. 8, the status checking module 325 may be placed outside the memory device 325.

The status checking module 325 tests a status of the memory device 320 through various parameters of the memory device 320. The status checking module 325 provides status information of the memory device 320 to the host 310. The host 310 determines a status of the memory device 320 comprehensively through status information. The host 310 provides the status result of the memory device 320 to the display device 330. The display device 330 displays the status of the memory device 320 in order for a user to understand it without difficulties.

The memory system 300 of FIG. 8 updates status information in the flash memory 220 against sudden power off, or compensates for status information for update. Additionally, the memory system 300 may update status information in the flash memory 320 through an auxiliary battery.

Figure 9:
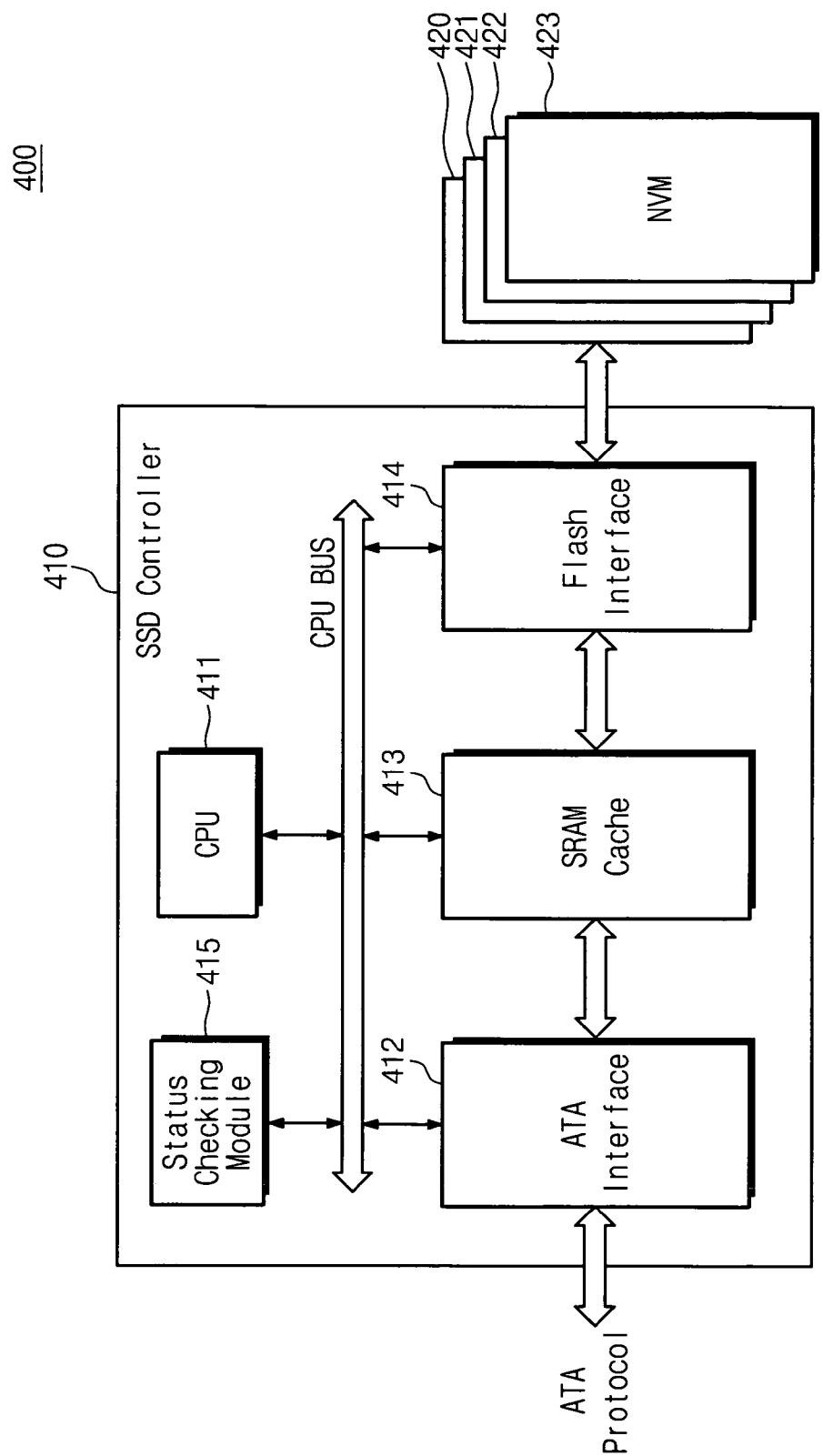
FIG. 9 is a block diagram illustrating a storage device according to an embodiment.

FIG. 9 is a block diagram illustrating a storage device according to an embodiment of inventive concepts of the present invention. Referring to FIG. 9, a storage device 400 includes a memory controller 410 and non-volatile memories 420 to 423. The memory controller 410 includes a CPU 411, an ATA interface 412, a SRAM cache 413, a flash interface 414, and a status checking module 515.

In FIG. 9, SSD in the storage device 400 is shown as an example. SSD products expected to replace hard disk drive products in the next generation memory market receive considerable attention. The SSD is a data storage device using memory chips such as a flash memory to store data, instead of a rotational disk used in a typical hard disk drive (HDD). Compared to a mechanically moving HDD, the SSD has various advantages such as a fast operating speed, strong resistance against external impact, and low power consumption.

The CPU 411 receives commands from a host (not shown) and then controls and determines whether to store data from the host in the flash memory or to read stored data of the flash memory in order to transmit them to the host.

The ATA interface 412 exchanges data with the host according to a control of the CPU 411. The ATA interface 412 fetches a command and an address from the host and delivers them to the CPU 411 through a CPU bus. Data inputted from the host or data to be transmitted to the host, via ATA interface, are delivered through the SRAM cache 413 not the CPU bus according to a control of the CPU 411. Here, the ATA interface 412 may be realized with a SATA or PATA interface.

The SRAM cache 413 temporarily stores transmitted data between the host and the flash memories 420 to 423. Additionally, the SRAM cache 413 may be used for storing a program that will be operated by the CPU 411. The SRAM cache 413 may be regarded as a kind of a buffer memory, and may be realized with other types of memory than an SRAM.

The flash interface 414 exchanges data with the non-volatile memories 420 to 423. The flash interface 414 may be configured to support a NAND flash memory, an One-NAND flash memory, or a multi-level flash memory. The flash interface 414 and the non-volatile memories 420 to 423 exchange control signals and data.

The status checking module 415 tests statuses of the non-volatile memories 420 to 423 through various parameters. An operating principle of the status checking module 415 is the same as the above. The status checking module 415 provides status information to the host through the ATA interface 412. The host analyzes or evaluates status information, and delivers its analyzed result to a display device (not shown) through the ATA interface 412. Additionally, the status checking module 415 combines a plurality of status information to test a status of the non-volatile memory. At this point, the SSD controller 410 provides the combined result of the plurality of status information to the host or the display device.

The storage device 400 of FIG. 9 updates status information in the flash memories 420 to 423 against sudden power off, or compensates for status information for update. Additionally, the storage device 400 may update status information in the flash memories 420 to 423 through an auxiliary battery.

Figure 10:
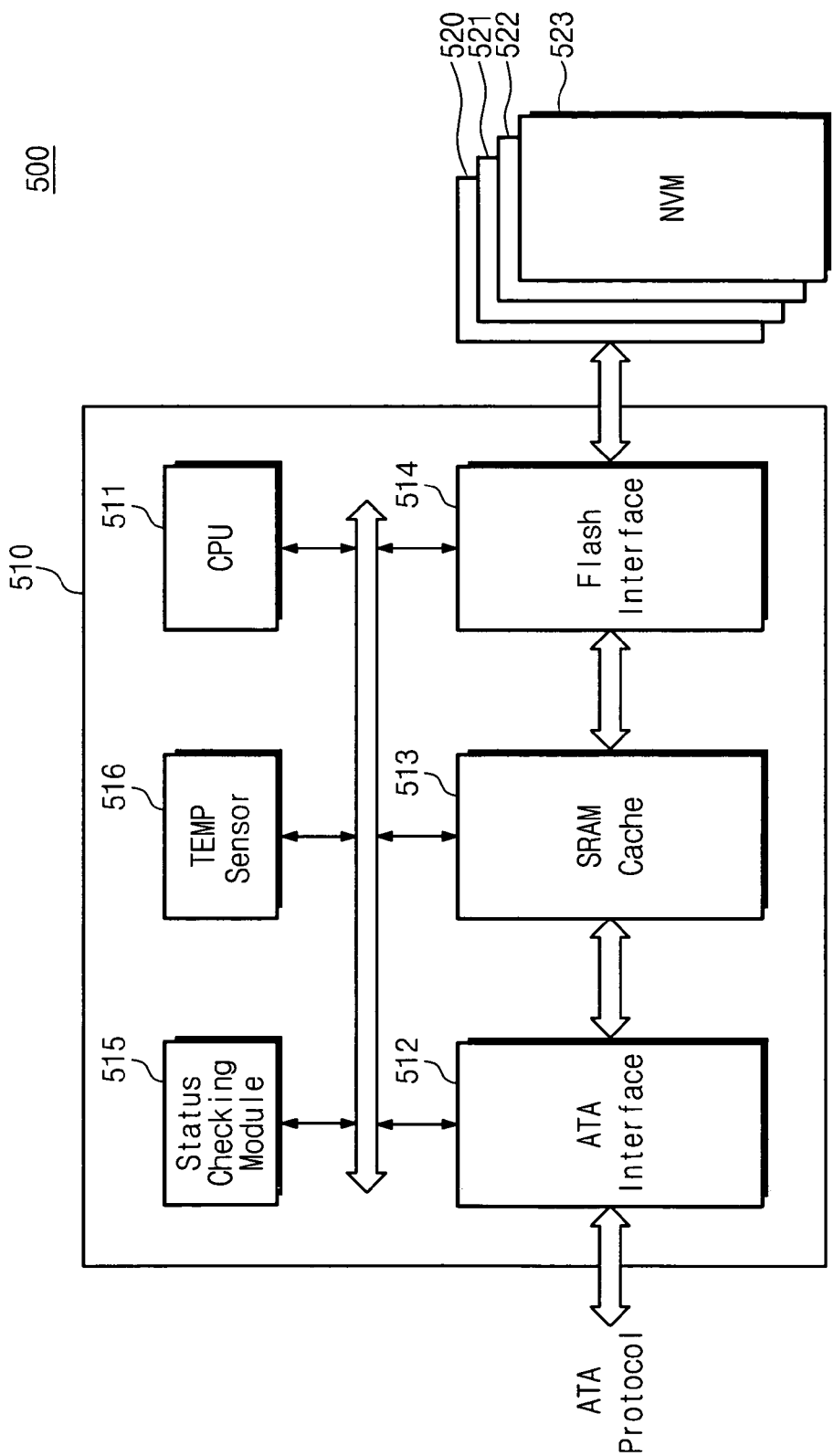
FIG. 10 is a block diagram illustrating a storage device according to an embodiment.

FIG. 10 is a block diagram illustrating a storage device according to an embodiment of inventive concepts of the present invention. Referring to FIG. 10, a storage device 500 includes SSD controller 510 and non-volatile memories 520 to 523. The SSD controller 510 includes a CPU 511, an ATA interface 512, a SRAM cache 513, a flash interface 514, a status checking module 515, and a temperature sensor 516.

The storage device 500 of FIG. 10 has the same structure and operating principle as FIG. 9 except for the temperature sensor 516. The temperature sensor 516 measures a temperature of the storage device 500, and provides the measured result to the status checking module 515. If the measured temperature is above or below the standard, the status checking module 515 adjusts the upper value and the lower value of the parameters of FIG. 5 to be appropriate for the measured temperature.

The memory system or the storage device according to the embodiments may be used as a mobile storage device. Accordingly, they may be used as a storage device of an MP3, a digital camera, a PDA, and an e-book. Additionally, they may be used as a storage device of a digital TV or a computer.

The memory system or the storage device according to inventive concepts of the present invention may be mounted through various kinds of packages. For example, the memory system or the storage device may be mounted through various packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP).

As described above referring to FIG. 1 to FIG. 10, a status of a SSD is able to be determined based on the LED. Thus, when a SSD is defected, it is able to be replaced with a normal SSD in times. That is, reliabilities of a nonvolatile memory device, a memory system including a nonvolatile memory device and a computing system including a memory system having a nonvolatile memory device are advanced.

I/O Restriction

A memory storage device according to a second embodiment of inventive concepts of the present invention is configured to set a read only mode for a memory chip where defects occur. Therefore, it is possible to backup important user data of a defective memory chip. Hereinafter, referring to FIG. 11 to FIG. 21, the second embodiment of inventive concepts of the present invention is described.

Figure 11:
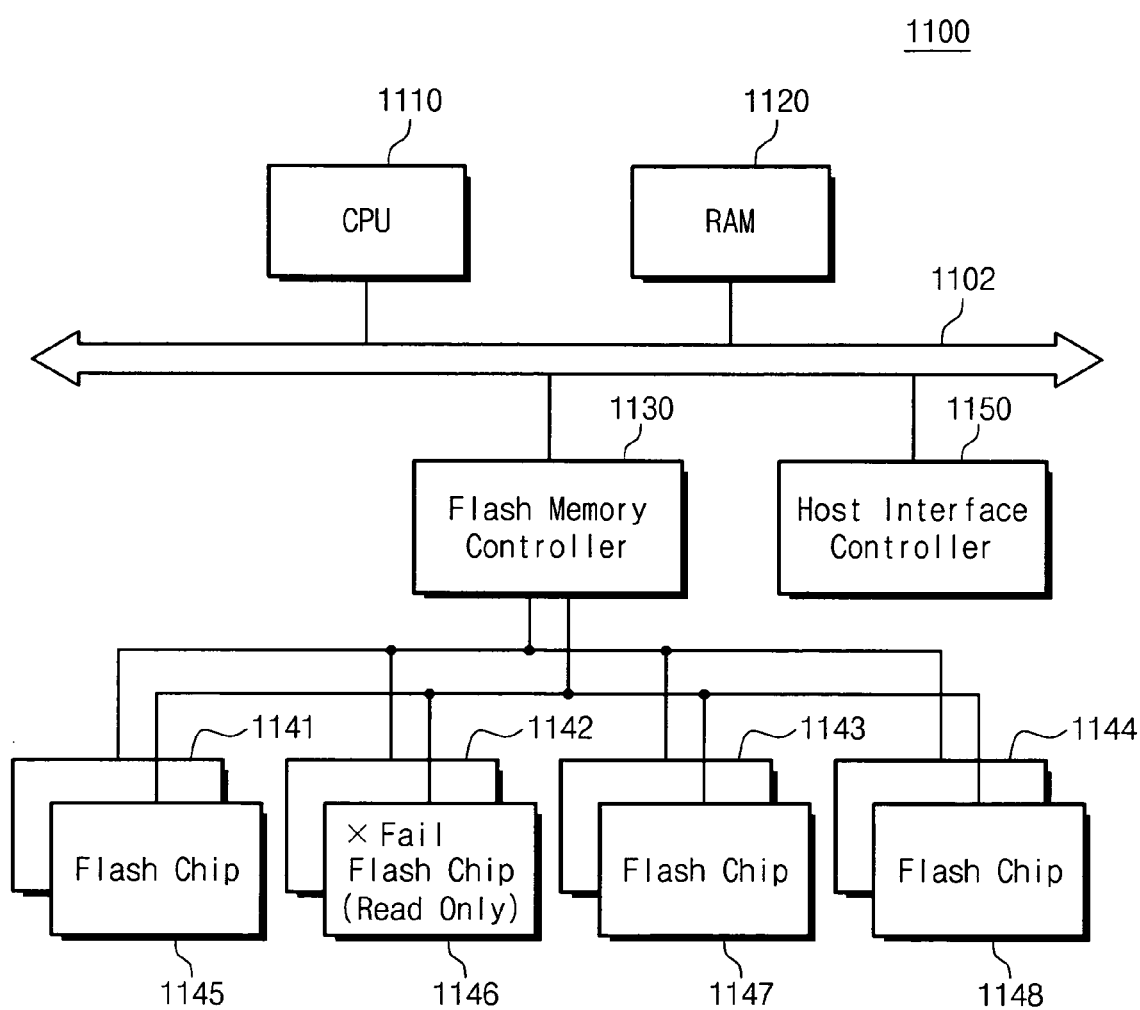
FIG. 11 is a view illustrating a hardware configuration of a memory storage device according to a second embodiment.

FIG. 11 is a view illustrating a hardware configuration of a memory storage device 1100 according to the second embodiment of inventive concepts of the present invention. Referring to FIG. 11, the memory storage device 1100 includes a system bus 1102, a CPU 1110, a RAM 1120, a flash memory controller 1130, memory chips 1141 to 1148, and a host interface controller 1150. The memory storage device 1100 of inventive concepts of the present invention is realized to allow each of a plurality of memory chips 1141 to 1148 to operate in any one of a write/read mode, a read only mode, and an inaccessible mode. Although the memory storage device 1100 of FIG. 11 includes a plurality of the flash memory chips 1141 to 1148, it may not be necessarily constituted by the flash memory chips. The memory storage device of inventive concepts of the present invention may be constituted by volatile chips or nonvolatile memory chips.

The memory storage device 1100 of inventive concepts of the present invention may be a memory card or SSD. The RAM 1120 is a volatile memory device and may be a DRAM or a SRAM.

The flash memory controller 1130 controls the plurality of memory chips 1141 to 1148. The flash memory controller 1130 examines each mode status of the memory chips 1141 to 1148, and according thereto, controls the memory chips 1141 to 1148 upon a read or write request from the host. Additionally, the flash memory controller 1130 includes an ECC engine for correcting errors of the memory chips 1141 to 1148.

The memory chips 1141 to 1148 store data. The memory chips 1141 to 1148 of FIG. 11 are eight, but the number of memory chips may not be necessarily limited thereto. The memory chips 1141 to 1148 may instead be memory packages including two or more memory chips. The reason of using a plurality of memory chips 1141 to 1148 in the memory storage device 1100 is to achieve a high capacity and also improve performance. That is, a read/write request of the host can be processed faster by operating the plurality of memory chips 1141 to 1148 concurrently. Moreover, the memory chips 1141 to 1148 may be configured with various memories other than the flash memory. The memory chips 1141 to 1148 may be realized with volatile memories or non-volatile memories (for example, MRAM, PRAM, and FRAM).

The host interface controller 1150 may be a secure digital (SD) card interface or a multi media card interface in a case of a memory card and may be a PATA, a SATA, or a PCI-express in a case of SSD. This interface defines a communication channel with a host (not shown).

In a typical memory storage device, if any one of memory chips is defective, the entire memory storage device becomes unavailable. However, in the memory storage device 1100, even if any one of the memory chips 1141 to 1148 becomes unavailable for normal read/write service, the memory storage device 1100 still can be available by operating a defective memory chip 1148 in a read only mode. A mode change service of a memory chip is performed in the flash memory controller 1130. For convenience of description, it will be described under the assumption that a memory chip is a flash memory.

Figure 12:
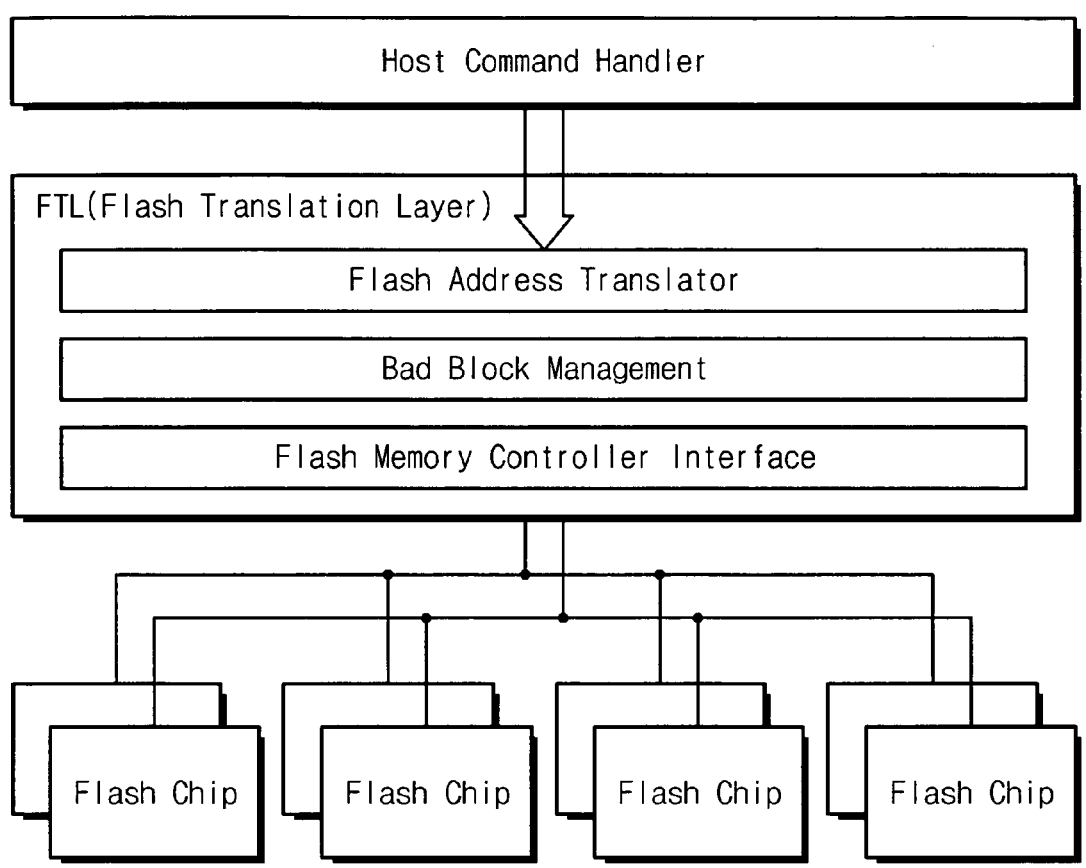
FIG. 12 is a view illustrating s software module structure of the flash memory storage device according to an embodiment.

FIG. 12 is a view illustrating s software module structure of the flash memory storage device 1100 according to an embodiment. A host command handler analyzes a host command and is in charge of buffer management, which will be received from or transmitted into the host. A read or write position that the host requested does not match with a physical address of a flash memory in one to one correspondence. Accordingly, it is necessary to convert a logical address into a physical address of a flash memory. A software module responsible for this conversion is called a flash translation layer (FTL). The FTL includes an address translator and a bad block management module. The address translator converts a logical address to a physical address of the flash memory. The bad block management module registers a bad block where erase fail occurs and is responsible for replacing the bad block.

Additionally, the FTL includes a flash memory controller interface for performing a read, program, or erase operation on each flash memory chip. The FTL uses a software method for managing a situation of when normal services cannot be provided due to a defective specific memory block. This method, for example, includes a service mode setting method for each flash memory.

Figure 13:
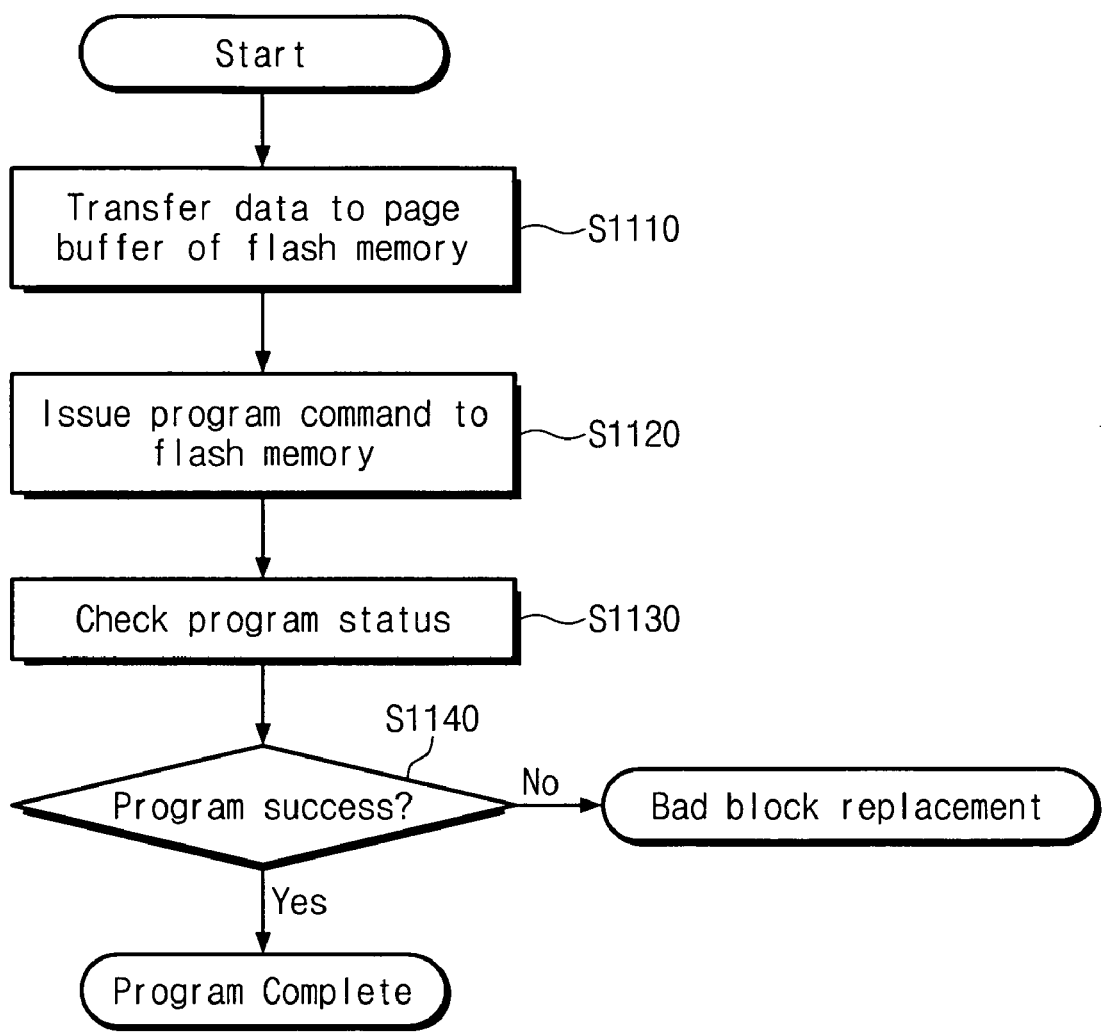
FIG. 13 illustrates a program flowchart of a flash memory according to an embodiment.

FIG. 13 illustrates a program flowchart of a flash memory according to an embodiment of inventive concepts of the present invention. Referring to FIG. 13, a program operation of a flash memory will progress as follows. In operation S1110, data to be programmed will be transmitted to a page buffer of a flash memory. In operation S1120, a program command is issued for the flash memory. Based on the issued program command, a program operation of the flash memory is performed. Next, a program status is checked or verified in operation S1130. Then, it is determined whether the program operation is successful or not through the checked result in operation S1140. At this point, if the program operation is successful, it is terminated. On the contrary, if the program operation is not successful, a bad block replacement operation is performed. A detailed description for the bad block replacement operation will be made with reference to FIG. 15.

Figure 14:
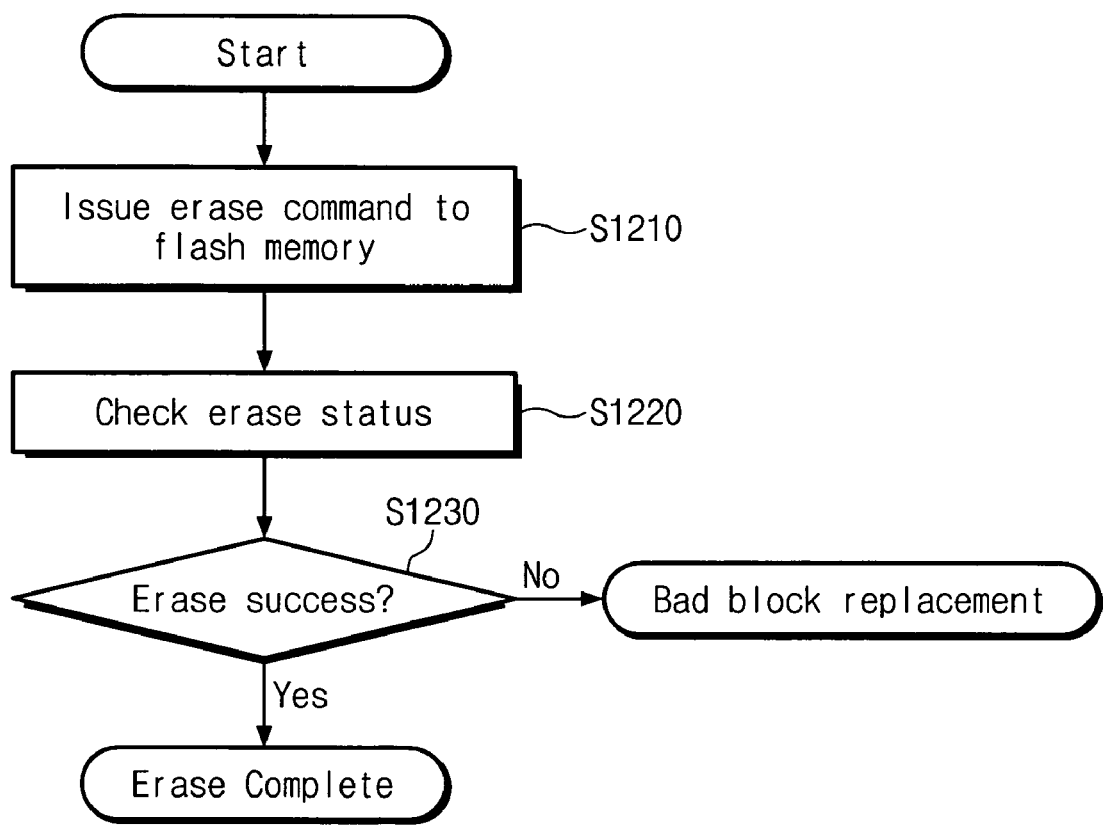
FIG. 14 illustrates an erase flowchart of a flash memory according to an embodiment.

FIG. 14 illustrates an erase flowchart of a flash memory according to inventive concepts of the present invention. Referring to FIG. 14, an erase operation of the flash memory will progress as follows. An erase command is issued to the flash memory in operation S1210. Based on the issued erase command, an erase operation of the flash memory will be performed. Then, an erase operation status is checked or verified in operation S1220. It is determined that the erase operation is successful or not through the checked result in operation S1230. At this point, if the erase operation is successful, it is terminated. On the contrary, if the erase operation is not successful, a bad block replacement operation is performed. A detailed description for the bad block replacement operation will be made with reference to FIG. 15.

Figure 15:
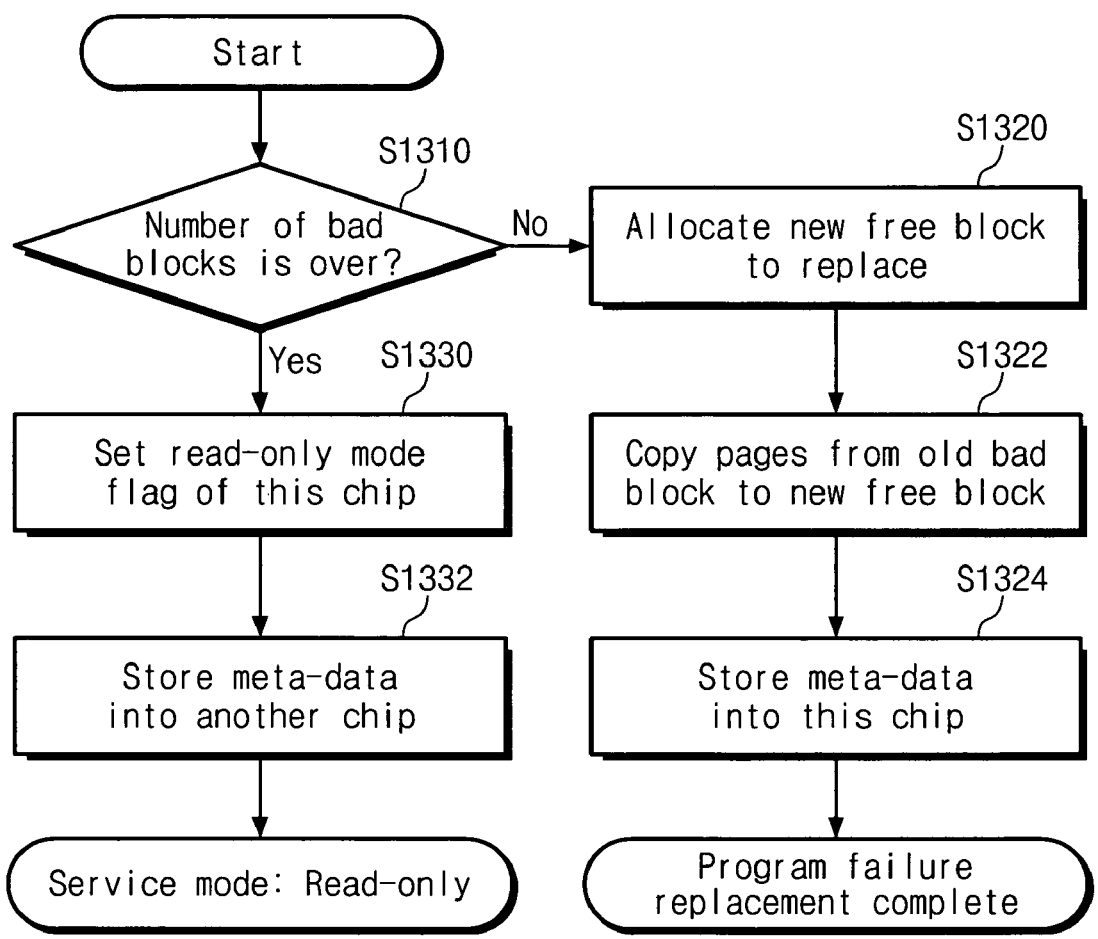
FIG. 15 illustrates a bad block replacement algorithm during a program fail operation according to an embodiment.

FIG. 15 illustrates a bad block replacement algorithm during a program fail operation according to inventive concepts of the present invention. Referring to FIG. 15, a bad block replacement operation will progress as follows. Once program fail occurs, the memory controller 1130 determines whether the number of occurred bad blocks is over that of reserved blocks for replacement or not in operation S1310. If the number of bad blocks does not exceed that of reserved blocks, the memory controller 1130 allocates new free blocks from the reserve blocks to replace the bad blocks in operation S1320. Next, the memory controller 1130 copies previous data from a previous bad block to a new free block in operation S1322, and then updates a block mapping table. The data corresponding to the updated mapping table are stored in the flash memory in operation S1324. Therefore, the block replacement operation is completed during program fail.

On the contrary, if the number of bad blocks exceeds that of reserved bocks, no more block replacement operation is possible. Accordingly, the memory controller 1130 sets a read only flag in meta data for displaying a mapping status of a flash memory that is no longer used for block replacement. This updated meta data cannot be stored in a flash memory where block replacement is impossible. This is because no more write operation can be performed on the flash memory where no block replacement is possible. Accordingly, the updated meta data are stored in another flash memory where block replacement is possible in operation S1332. Therefore, the flash memory where no block placement is possible can be used for a read only mode service.

Figure 16:
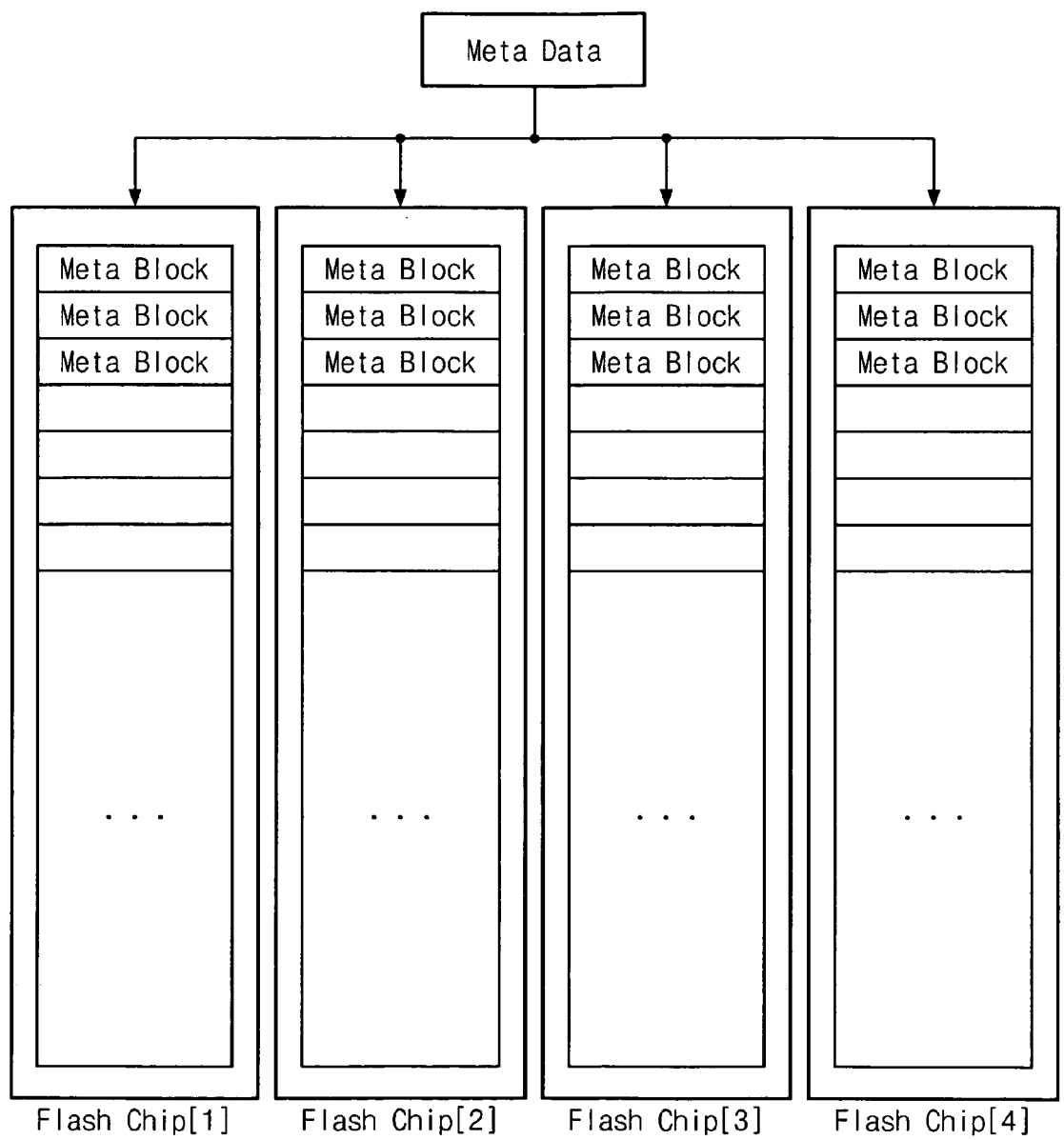
FIG. 16 illustrates a meta block configuration of a flash memory and a method of storing the same.

All the meta data of the flash memories according to inventive concepts of the present invention are realized to be stored in each of the flash memories. FIG. 16 illustrates a meta block configuration of a flash memory and a method of storing the same. Referring to FIG. 16, the meta data of the flash memories are stored in the meta blocks of the flash memories. Therefore, even when any one of the flash memories cannot be read or written due to defect occurrence, a service mode can be adjusted with respect to the defective flash memory by using the meta data stored in another flash memory. For example, if the flash memory 1146 cannot provide a read/write mode service, it can be adjusted to a read only mode service through the meta information of another flash memory.

If the memory storage device of inventive concepts of the present invention is applied to SSD, drive status information such as SMART may be stored and managed in a plurality of chips as illustrated in FIG. 16. Accordingly, since the SMART information is not stored in a specific chip, reporting of bad status information of a drive is possible even when some chips are defective.

An age value is increased in each flash memory each time a meta block is updated. That is, the age value is increased according to the updated number. The memory controller 1130 determines meta data, of which age value is high among a plurality of meta data read from the flash memory, as valid meta data. The reason is that a meta value having the highest age value is the latest updated meta data.

Figure 17:
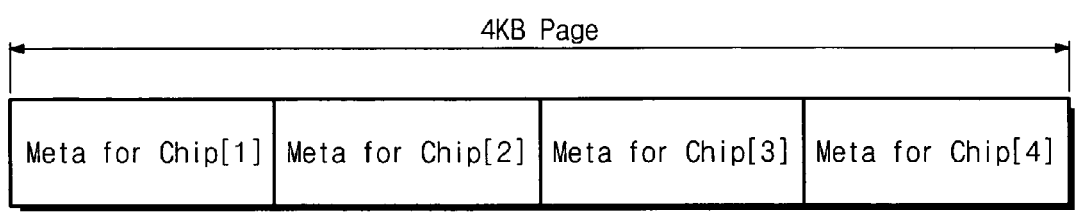
FIG. 17 illustrates a structure of meta data in a page of a flash memory.

FIG. 17 illustrates a structure of meta data in a page of a flash memory. As illustrated in FIG. 17, meta data of four flash memories are stored in a meta block of one flash memory. Here, meta data of each flash memory is stored in a page of 4 KByte.

Meta data are stored in a meta block of each flash memory such that meta data having bad block status information about flash memories can be included. That is, each flash memory has meta data information about itself. Accordingly, later on, even when any one of the flash memories becomes defective, status information of the defective flash memory can be extracted from the meta data of another flash memory.

Figure 18:
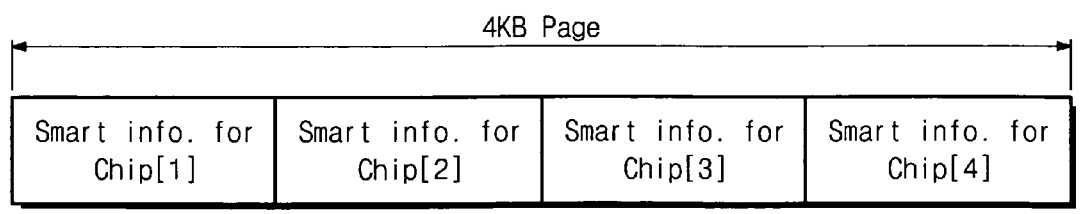
FIG. 18 illustrates a SMART data structure in a page of a flash memory.

FIG. 18 illustrates a SMART data structure in a page of a flash memory. Because the SMART information stores information about a plurality of chips in one page, even when unrecognizable chip occurs, information about the unrecognizable chip can be extracted from another chip.

Figure 19:
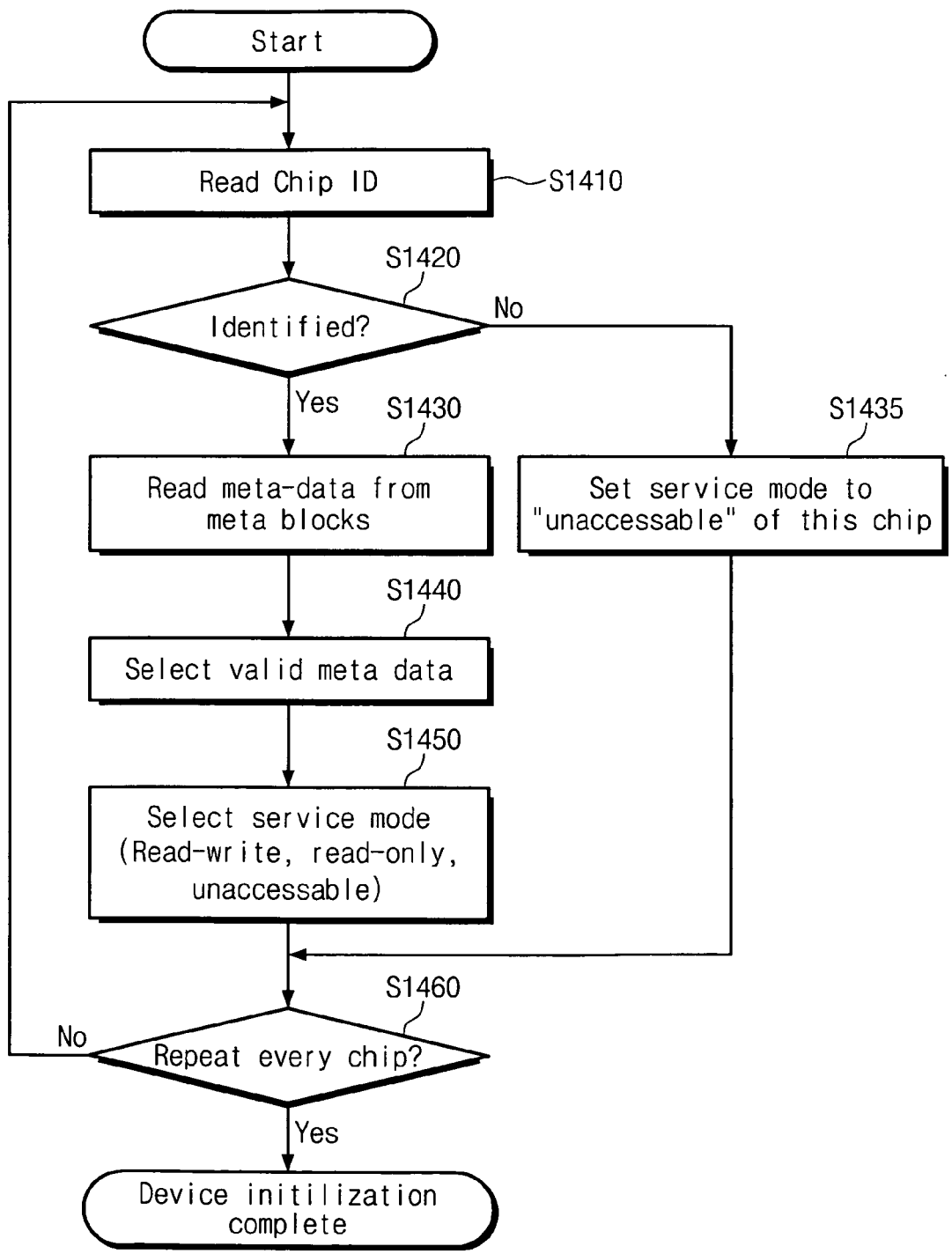
FIG. 19 is a flowchart illustrating an initialization process of the memory storage device of FIG. 11 according to an embodiment.

FIG. 19 is a flowchart illustrating an initialization process of the memory storage device 1100 of FIG. 11 according to inventive concepts of the present invention. Referring to FIG. 19, an initialization operation of the memory storage device 100 is as follows. First, the memory controller 1130 reads an identification (ID) of each of the chips 1141 to 1148 in operation S1410. At this point, the memory controller 1130 determines whether the read chip is identified or not in operation S1420. If the memory chip is not identified, the memory controller 1130 updates meta data to set a corresponding memory chip to be in an inaccessible mode in operation S1435. Then, it proceeds to operation S1460.

If the memory chip is identified, the memory controller 1130 reads meta data from a meta block of a memory chip. The highest age value among the read meta data is determined as valid meta data in operation S1440. Here, the age value of the meta data is increased each time update is performed. A service mode of a memory chip is selected from the valid meta data in operation S1450. The service mode is one of a read/write mode, a read only mode, and an inaccessible mode.

The memory controller 1130 determines whether the initialization process repeats on all the memory chips or not in operation S1460. If the initialization process is not performed on every memory chips, it proceeds to operation S1410. If the initialization process is performed on every memory chips, it is terminated.

Figure 20:
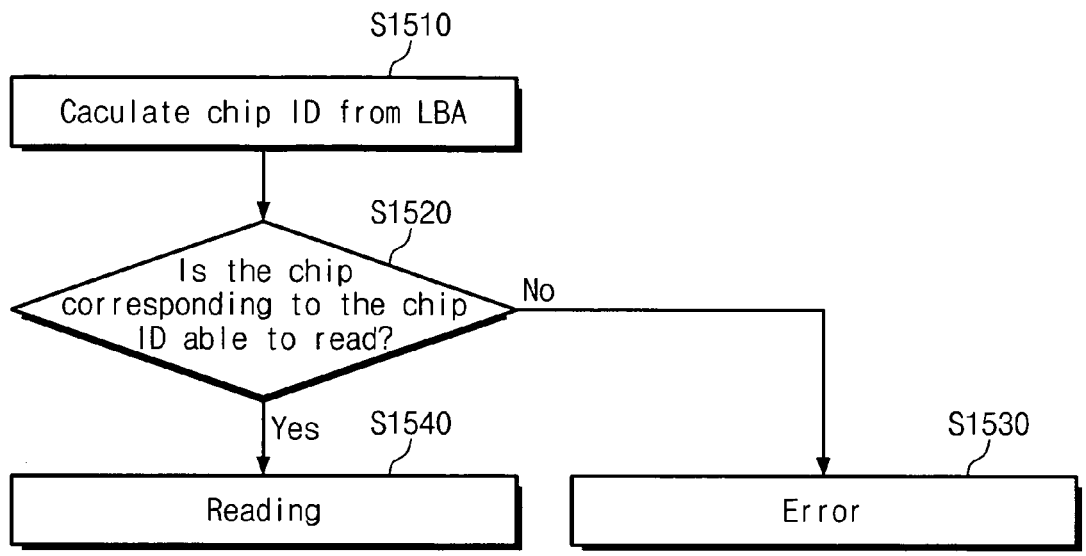
FIG. 20 is a flowchart illustrating a read operation of the flash storage device according to an embodiment.

FIG. 20 is a flowchart illustrating a read operation of the flash storage device 1100 according to inventive concepts of the present invention. Referring to FIG. 20, after the initialization process is performed, a read operation of the flash storage device 1100 is as follows. The memory controller 1130 calculates a corresponding chip ID according to a logical block address (LBA) delivered from the host in operation S1510. The memory controller 1130 determines whether a read operation on the calculated chip ID is possible or not through valid meta data in operation S1420. If a read/write mode service or a read only mode service cannot be provided on the calculated chip ID, the read operation is processed as an error in operation S1530. If a read/write mode service or a read only mode service is provided on the calculated chip ID, the read operation is performed on a corresponding memory chip in operation S1540.

Figure 21:
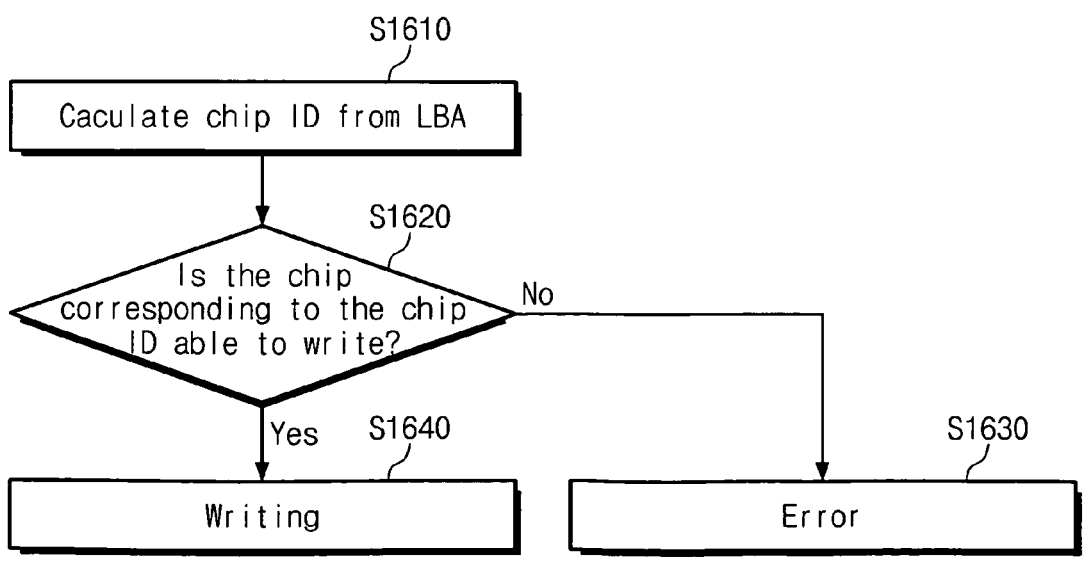
FIG. 21 is a flowchart illustrating a write operation of the flash storage device according to an embodiment.

FIG. 21 is a flowchart illustrating a write operation of the flash storage device 1100. Referring to FIG. 21, after an initialization process is performed, a write operation of the flash storage device 1100 is as follows. The memory controller 1130 calculates a corresponding chip ID according to a logical block address (LBA) delivered from the host in operation S1610. The memory controller 1130 determines whether a write operation on the calculated chip ID is possible or not through valid meta data in operation S1620. If a read/write mode service cannot be provided on the calculated chip ID, the write operation is processed as an error in operation S1630. If a read/write mode service is provided on the calculated chip ID, the write operation is performed on a corresponding memory chip in operation S1640.

Although not illustrated in the drawing, it is apparent to those skilled in the art that an application chipset, a camera image processor (CIS), a mobile DRAM, and so forth may be use the memory storage device of the example embodiments. The memory controller and the flash memory may include SSD for storing data through a non-volatile memory device, for example.

The flash memory and/or the memory controller according to inventive concepts of the present invention may be mounted through various kinds of packages. For example, the flash memory device and/or the memory controller may be mounted through various packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP).

As described above referring to FIG. 11 to FIG. 21, a bad block is set as a read only service mode when any reserved block to be replaced with a bad block does not exist. Thus, data stored in a block can be read even though it is determined as a bad block. That is, reliabilities of a nonvolatile memory device, a memory system including a nonvolatile memory and a computing system including a memory system having a nonvolatile memory device are advanced.

Prediction

Hereinafter, a memory system according to a third embodiment of inventive concepts of the present invention is described referring to FIG. 22 to FIG. 32. A semiconductor disk device will be used as a non-volatile memory system in order to describe features and functions in the third embodiment of inventive concepts of the present invention. Additionally, a read request is mainly described as expected requests in the third embodiment of inventive concepts of the present invention, but the example embodiments are not limited thereto. However, those skilled in the art can easily understand other advantages and performances according to the listed contents. Additionally, a flash memory is described as one example of a storage medium, but other non-volatile memory devices can be also used. For example, PRAM, MRAM, ReRAM, and FRAM may be used as a storage medium, and also different kinds of memory devices may be applied to a hybrid memory system.

Figure 22:
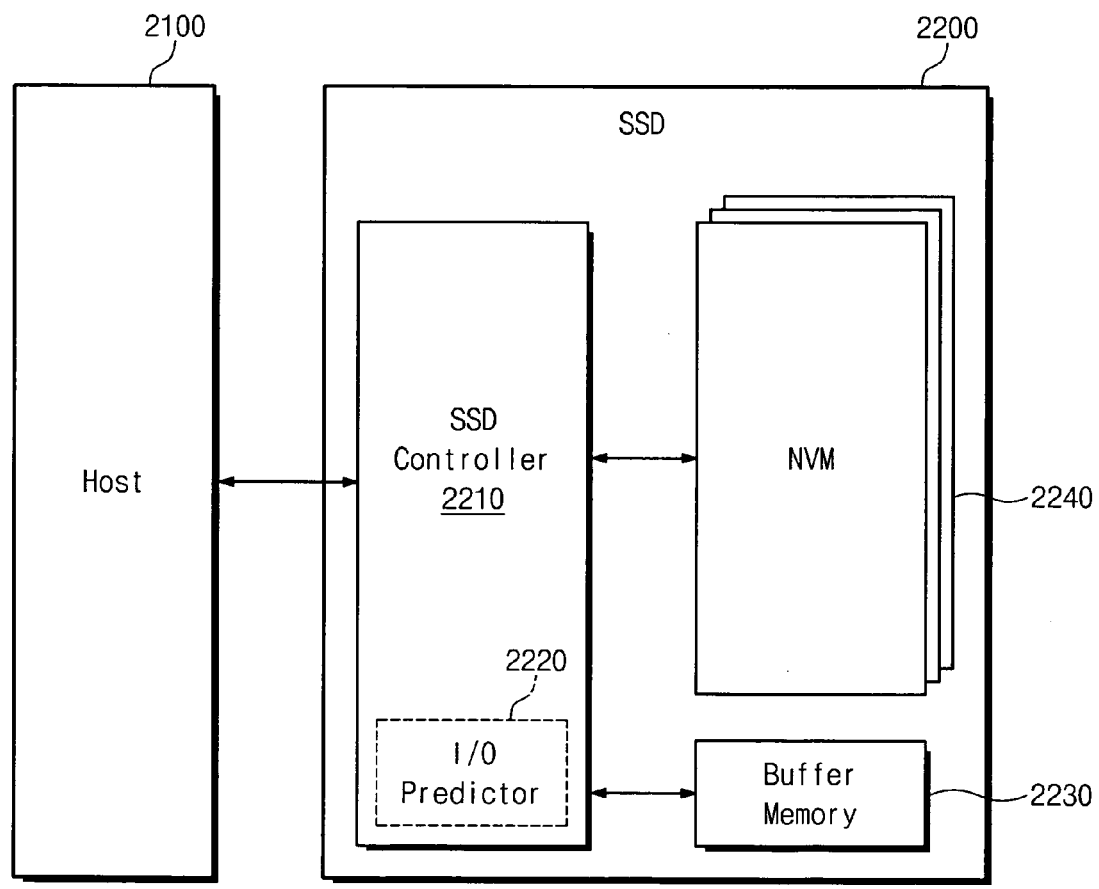
FIG. 22 is a block diagram illustrating technical features of a third embodiment according to inventive concepts of the present invention.

FIG. 22 is a block diagram illustrating technical features of the third embodiment according to inventive concepts of the present invention. Referring to FIG. 22, SSD 2200 of inventive concepts of the present invention exchanges data with an external host 2100 through an input/output port. The SSD 2200 stores or reads data in or from a non-volatile memory 2240 in response to a read/write request from the host 2100. The SSD 2200 of inventive concepts of the present invention predicts a pattern of a request provided from the host 2100. Accordingly, the SSD 2200 can improve a response speed with respect to a read request of the host 2100.

The host 2100 requests the SSD 2200 to write data. The host 2100 provides a corresponding address and data upon a data write request. Additionally, the host 2100 provides a data read request to the SSD 2200. In a computing system, the read request of the host 2100 is typically divided into a sequential request and a random request. The sequential request is for reading data sequentially. During the sequential request, continuous data next to the currently requested data are pre-fetched and then are transmitted to the host 2100, such that a read speed can be improved. On the contrary, in a case of the random request, it is difficult for the host 2100 to predict data for the continuous next read request. However, a pattern may frequently exist in the random request. If the SSD 2200 can recognize the pattern, the next read request associated with a current read request can be predicted. This means that performance of the SSD 2200 can be improved.

The SSD 2200 provides stored data to the non-volatile memory 2240 in response to a read request of the host 2100. The SSD 2200 can predict the next data read request of a current read requested data upon a random request of the host 2100. The SSD 2200 pre-fetches the prediction data and stores the prediction data in the buffer memory 2230 for the next data transmission. Therefore, a response speed can be improved. In a case of a typical HDD, due to seek and rotational latency during the random request, time consumption is increased. Accordingly, there may be severe speed and latency increase when wrongly prediction data are pre-fetched from the HDD upon a random request. However, in the SSD 2200, it is not necessary to consider time consumption such as seek and rotational latency. Since time consumption about wrong prediction is relatively small in the SSD 2200, the SSD 2200 can utilize a pre-fetch operation upon a random request. Upon the random request, the SSD 2200 for predicting the next read request and performing a pre-fetch operation has a following structure.

The SSD controller 2210 provides a physical connection between the host 2100 and the SSD 2200. That is, the SSD controller 2210 provides an interface with the SSD 2200, in response to a bus format of the host 2100. The bus format of the host 2100 may include universal serial bus (USB), PCI express, serial ATA (SATA), parallel ATA (PATA), and so forth. Additionally, the SSD controller 2210 supports a disk emulation function to allow the host 2100 to recognize the SSD 2200 as a HDD. For example, it provides a function like a FTL in order to conceal an erase operation of the non-volatile memory 2240 during address mapping.

Additionally, the SSD controller 2210 includes an input/output (I/O) predictor 2220 in order to provide a prediction function for an input/output request of inventive concepts of the present invention. The input/output predictor 2220 includes a learning function for patterns of a read request provided from the host 2100. The input/output predictor 2220 stores addresses of data inputted from the host 2100 in a database in order to support the learning function. Correlation is given between a data address of a currently inputted read request and a data address of the next read request. That is, the next data address input after the currently inputted data address is stored in the database in order to provide the most frequently occurring next data address as a predicted value. The learning operation of the input/output predictor 2220 corresponds to a process for storing data addresses corresponding to a read request in the database. That is, a random request for requesting a special function of the host 2100. Accordingly, if data for another read request, which are predicted through the data requested by a current read request, are read from the non-volatile memory 2240 and then stored in the buffer memory 2230, a prompt response may be possible upon another read request. The input/output predictor 2220 performs a pre-fetch operation of prediction data with reference to the learning function and learned data. Additionally, the predicted pre-fetched data in the buffer memory 2230 are immediately delivered to the host 2100 upon the next read request. Functions of the input/output predictor 2220 will be described in more detail with reference to FIG. 22.

The write data from the host 2100 are temporarily stored in the buffer memory 2230. Additionally, the data read from the non-volatile memory 2240 are temporarily stored in the buffer memory 2230 in response to a read request. If data in the non-volatile memory 2240 are cached upon a read request of the host 2100, the buffer memory 2230 supports a cache function for providing the cached data to the host 2100 directly. At this point, the non-volatile memory 2240 is not accessed. As mentioned above, a data transmission speed by a bus format (for example, STAT) of the host 2100 is far faster than that of a memory channel of the SSD 2200. That is, if an interface speed of the host 2100 is far faster, the buffer memory 2230 of a high capacity is provided to minimize performance deterioration occurring due to a speed difference. The buffer memory 2230 may include synchronous DRAM in order to provide sufficient buffering in the SSD 2200 that is used as a high-capacity auxiliary memory device. However, it is apparent to those skilled in the art that the buffer memory 2230 is not limited to the above.

The non-volatile memory 2240 is provided as a non-volatile storage medium of the SSD 2200. For example, a NAND-type flash memory having a high capacity storage may be used as the non-volatile memory 2240. Although the flash memory as a storage medium is used as one example, other non-volatile memories may be used as the storage medium. For example, PRAM, MRAM, ReRAM, FRAM, and NOR flash memory may be used as the storage medium, and also may be applied to a hybrid memory system of different kinds of memories.

The SSD 2200 including the above components performs a learning function about sequential read requests inputted from the host 2100. Accordingly, the SSD 2200 reads prediction data (corresponding to the next read request of a currently inputted read request) from the non-volatile memory 2240 in advance through the learned data, and then pre-fetches the prediction data from the buffer memory 2230. Additionally, if it is determined that the pre-fetched prediction data are matched with the next inputted read request, the pre-fetched data are immediately delivered to the host 2100. Accordingly, the SSD 2200 pre-fetches prediction data from the non-volatile memory 2240 through a learning function about requests from the host 2100. The pre-fetch operation is accomplished at an idle time of the non-volatile memory 2240 while the currently request data are transmitted from the buffer memory 2230 to the host 2100. Accordingly, the SSD 2200 can provide the most rapid response upon a request from the host 2100 through data prediction by learning. Here, the next data prediction through the learning and a pre-fetch operation about the prediction data can be applied to both of the sequential request and the random request.

Figure 23:
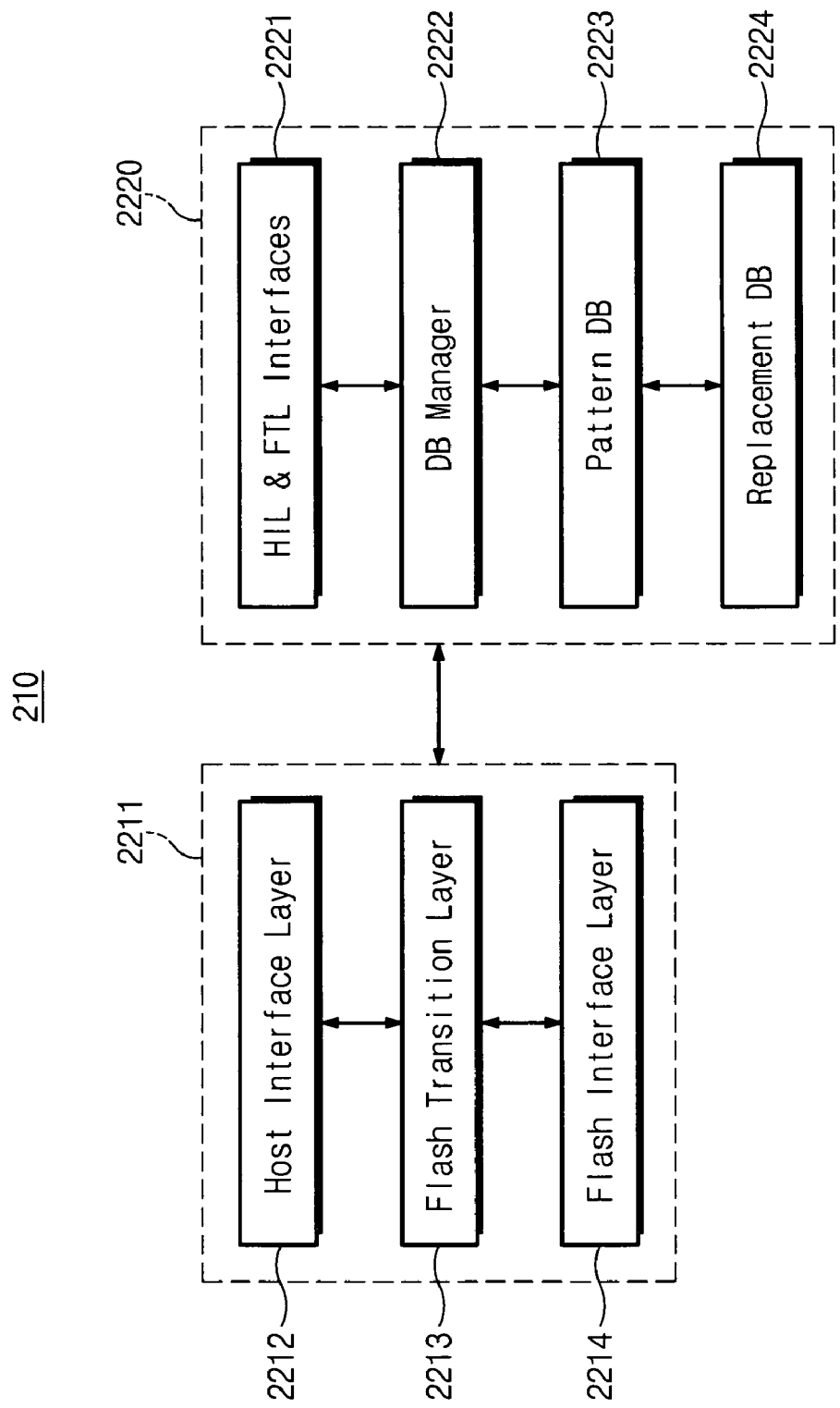
FIG. 23 is a block diagram illustrating a detailed configuration (or, software) of the SSD controller of FIG. 22.

FIG. 23 is a block diagram illustrating a detailed configuration (or, software) of the SSD controller 2210 of FIG. 22. Referring to FIG. 23, the SSD controller 2210 includes an interfacing module 2211 and an input/output predictor 2220. The interfacing module 2211 is used for interfacing between the host 2100 and the non-volatile memory 2240. The input/output predictor 2210 is used for providing a predicting function based on the interfacing module 2211. This will be described in more detail below.

The interfacing module 2211 performs a main interfacing function of the SSD controller 2210. The interfacing module 2211 includes a host interface layer (or, HIL) 2212 for an interface with the host and an internal cache function of the SSD 2200. The host interface layer 2212 provides an internal command to the SSD controller 2210, which corresponds to a read or write request from the host 2100. The host interface layer 2212 provides a cache function for data that will be transmitted to the host 2100. That is, if currently existing data of the buffer memory 2230 matches with data of a read request, the host interface layer 2212 delivers the data stored in the buffer memory 2230 to the host 2100 without accessing of the non-volatile memory 2240.

The flash translation layer 2213 converts a logical address from the host into a physical address of the non-volatile memory 2240. Besides that, the flash translation layer 2213 performs an erase count for performing a wear leveling operation. Additionally, the flash translation layer 2213 collects valid data scattered in each block of the non-volatile memory 2240 and supports a garbage collection operation for filling one block. Namely, valid data partially filling blocks are combined into one or more complete blocks to free up the partially filled or partially valid blocks. The flash translation layer 2213 performs address mapping, erase leveling, and garbage collection in response to a read/write request of a file system in the host 2100.

The flash interface layer 2214 performs a low level operation for interfacing with the non-volatile memory 2240 and the SSD controller 2210. For example, the flash interface layer 2214 includes a low level driver for controlling hardware of the non-volatile memory 2240, an error correction code (ECC) for correcting errors of the data read from the non-volatile memory 2240, and a bad block management (BBM) module. That is, according to a control of the flash translation layer 2213, the flash interface layer 2214 is responsible for data exchange between the SSD controller 2210 and the non-volatile memory 2240.

Based on the interfacing module 2211, the input/output predictor 2210 performs a learning operation on a random request of the host 2100 and also a prediction operation using the learned data. A HIL & FTL interface 2221, a database (or, DB) manager 2222, a pattern database 2223 and optionally a replacement database 2224 constituting the input/output predictor 2210 and will be described in more detail below.

The HIL & FTL interface 2221 provides an interface between the input/output predictor 2210 and the interfacing module 2211. Especially, the HIL & FTL interface 2221 communicates with the interfacing module 2211 in order to perform a pre-read operation on a read pattern which is predicted through the database manager 2222 and the pattern database 2223. The HIL & FTL interface 2221 communicates with the flash interface layer 2214 in order to pre-fetch the prediction data from the non-volatile memory 2240 to the buffer memory 2230. Also, once the predicted read request is inputted, the HIL & FTL interface 2221 will communicate with the host interface layer 2212 in order to transmit the pre-read data (which are pre-fetched in the buffer memory 2230) to the host 2100.

The database manager 2222 performs a learning function for updating the pattern database 2223 with respect to an input/output pattern corresponding to a random request. Additionally, the database manager 2222 refers to the learned pattern database 2223 to predict the next read request of a current read request. That is, the database manager 2222 predicts an address of the next read request through an address provided upon a current read request in order to control the HIL & FTL interface 2221 and to perform a pre-read operation. By referring and information accumulated by the learning, the database manager 2222 can perform a pre-fetch operation during a random request.

The pattern database 2223 stores pattern information about requests from the host 2100. That is, the pattern database 2223 is stored in a memory of the memory controller 2210, and stores learned patterns of a plurality of read requests that are provided to perform a specific function. The database manager 2222 updates read patterns in real time in the pattern database 2223. According to these settings, the pattern database 2223 can provide prediction data in order to predict the next read request of one read request, based on the learned data. The replacement database 2224 stores some pattern information that the DB manager 2222 may use to replace pattern information in the pattern database 2223.

According to the above-mentioned SSD controller 2210 and the input/output predictor 2220, included are the pattern database 2223 for storing a data input/output pattern from the host 2100, the database manager 2222 having a learning function and prediction function, and the HIL & FTL interface 2221 for pre-fetching prediction data. According to this learning and prediction, the SSD controller 2210 of inventive concepts of the present invention can deal with random requests immediately such that high response speed can be provided.

The most frequently occurring patterns of read requests are learned by the pattern database 2223. A read request includes a current read address and a sector count nSC. The sector count nSC indicates the number of sectors of data (i.e., the amount of data) to read starting from the current read address. Under the assumption that there are patterns of read requests a method of updating/creating the pattern database 2223 when read requests sequences are provided sequentially will be described below. FIG. 24A illustrates request sequences and will be used to explain the method of creating and updating the pattern database 2223.

FIG. 24A shows a first read request sequence RS1 where the four read addresses of the four read requests in order of the read requests are: LBA_0, LBA_1, LBA_2 and LBA_3. FIG. 24A shows second, third and fourth read request sequences RS2, RS3 and RS4 having the following orders of read addresses:

RS2: LBA_0, LBA_b
RS3: LBA_x
RS4: LBA_0, LBA_1, LBA_2

FIG. 24B illustrates an entry 2260 in the pattern database 2230. The entry 2260 includes the fields: nAddr, nCnt, Next nAddr1, nCnt1, NextnAddr2, nCnt2, NextnAddr3, nCnt3. These fields will be described in detail below.

Assuming the first read request sequence RS1 is received, the first read address is LBA_0. The DB manager 2222 determines a key value nAddr associated with the first read address LBA_0. The key value nAddr is determined as: the read address LBA_0 plus the sector count nSC minus 1. If no entry 2260 having this key value nAddr exists, the DB manager 2222 creates a new entry with the determined key value nAddr and an initial count value nCnt of, for example, 1. This count value a nCnt indicates the number of times the entry 2260 has been undated.

Furthermore, the DB manager 2222 enters the next read address LBA_1 following the current address LBA_0 in the Next nAddr1 field and sets an initial count value nCnt1 for this address to an initial count value (e.g. 1).

As will be appreciated the fields Next nAddr 1, Next Addr2 and Next Addr3 store read addresses that have occurred as next read addresses after the read address associated with the key value nAddr. It will also be appreciated that the respective count values nCnt1, nCnt2, and nCnt3 represent the number of times the associated read addresses Next Addr1-Next Addr3 have occurred as next read addresses after the read address corresponding to the key value nAddr.

Assuming the second read sequence RS2 occurs after the first read sequence RS1, then here, the DB manager 2222 will determine that an entry associated with the read address LBA_0 already exists. Namely, the DB manager 2222 will have determined the key value nAddr associated with the read address LBA_0 and find an entry 2260 including that key value. Next, the DB manager 2222 determines if next read address LBA_b exists as a next read address in the entry 2260. For example, the DB manager 2222 determines if the read address LBA_b is one of the Next nAddr1 to Next nAddr3. If not, the DB manager updates the entry 2260 by adding the read address LBA_b to the first empty one of the Next nAddr1 to Next nAddr3. In the example of FIG. 24A, the Next nAddr2 field is the first empty field. The DB manager 2222 also enters an initial count value in the associated count value field nCnt2.

Continuing with the example read request sequences of FIG. 24A, when the fourth read sequence RS4 is received, the DB manager 2222 will determine that an entry 2260 already exists for the read address LBA_0, and will determine that the next read address LBA_1 already exists in the Next nAddr1 field. Accordingly, the DB manager 2222 updates the entry by incrementing the associated count value nCnt1. For example, the count value nCnt1 is incremented by an increment value (e.g., 1).

As will be appreciated, the process described above is repeated fully for each read sequence. Namely, the DB manager 2222 treats the read address LBA_1 of the first read sequence RS1 as the current read address and the read address LBA_2 as the next read address and creates/updates another entry in the pattern database 2223 accordingly.

Accordingly, after the four read request sequences of FIG. 24A, the DB element 2260 corresponding to the address LBA_0 will be as shown in Table 1 below.

TABLE 1

| LBA_0 + nSC − 1 | 3 | LBA_1 | 2 | LBA_b | 1 | x | x |
|---|---|---|---|---|---|---|---|

According to the DB element 2260 expressed in Table 1, a key value nAddr in the current request information 2261 may be provided as the last sector address LBA_0+nSC-1 of the current request. The requested frequency count nCnt will be updated to three in the current request information 2261. An address of a first prediction candidate Next1 2262 is updated to LBA_1 and its frequency count nCnt1 is updated to two. An address of a second prediction candidate Next2 2263 is updated to LBA_b and its frequency count nCnt2 is updated to one. Since a value corresponding to the third prediction candidate Next3 2264 is not inputted, a specific value is not stored. Through this method, a repeating request sequence from the host 2100 will have a prediction candidate with a high frequency count. The prediction candidate corresponding to the highest frequency count may be provided as a prediction value such that a pre-fetch operation becomes possible. If the leaning of the patterns is performed repeatedly, a large number of DB elements will be generated. Through the large number of DB elements, a prediction value having a high accuracy with respect to various requests from the host can be provided.

Through the above update process, read patterns requested to the SSD 2200 are learned using a plurality of DB elements. That is, since the highest one among frequency counts nCnt1, nCnt2, nCnt3 of prediction candidates corresponding to the current request information 2261 is provided as prediction data, a pre-fetch operation is possible. Here, for convenience of description, a plurality of candidates is illustrated as three, but the embodiments are not limited thereto. Additionally, in order to provide a threshold value for learning, the frequency count nCnt in the current request information 2261 of the DB elements may be used. That is, after the frequency count nCnt of the read request reaches a specific value, it may be set to pre-fetch the prediction data. Additionally, the frequency counts nCnt1, nCnt2, and nCnt3 of the mentioned candidates are continuously updated after the prediction data are provided. Also, pre-fetching may be limited to those candidate next read addresses having count values exceeding a threshold. As such only the data at the candidate read address having the highest count value exceeding the threshold may be fetched, or the data at each candidate next read address exceeding the threshold may be fetched. If there is a change in a program environment of a system, the actively-changing optimized prediction value can be continuously provided.

In one embodiment, the DB manager 2222 manages the entries 2260 of the pattern database 2223 such that the candidate read addresses nAddr1 to nAddr3 and associated count values nCnt1 to nCnt3 are ordered by decreasing count value. Namely, if the third count value nCnt3 exceeds, for example, the second count value nCnt2, the DB manager 2222 swaps the second and third candidate read addresses nAddr2 and nAddr3, and the associated count values nCnt2 and nCnt3, in the entry 2260. Thus, the third candidate address nAddr3 becomes the second candidate address nAddr2 and vice versa. The same is true of the respective count values.

Figure 25:
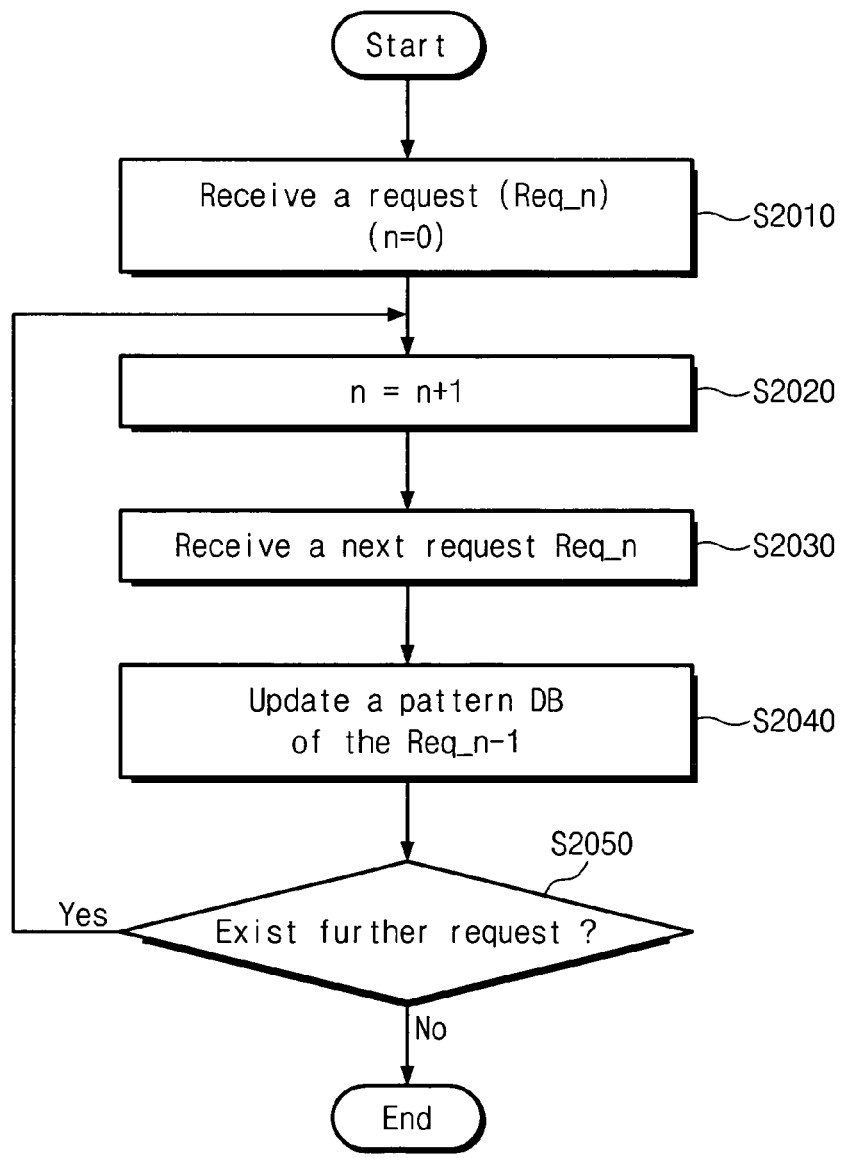
FIG. 25 is a flowchart illustrating a learning operation.

FIG. 25 is a flowchart illustrating a learning operation. Referring to FIG. 25, an update operation of the pattern database 2223 starts in the input/output predictor 2220 of FIG. 23.

Once the learning operation through an update of the pattern database 2223 starts, the SSD controller 2210 receives a read request (Req_n, n=0). Here, a key value nAddr of a DB element is obtained through an address LBA and a sector count nSC, which are received using the first read request Req_0 in operation S2010. Next, in order to receive the next read request, n (n is a natural number) is counted up in operation S2020. Then, the next read request Req_1 of the first read request Req_0 will be received in operation S2030. The database manager 2222 refers to the continuous read requests Req_0 and Req_1 to update the pattern database 2223. That is, an address provided by the read request Req_1 is registered in the DB element of the pattern database 2223 as a prediction candidate about the read request Req_0 in operation S2040. If there is a continuous read request of the read request Req_n, a procedure returns to operation S2020 to continuously update the pattern database 2223. However, if there is no continuous read request, a learning operation about the pattern database 2223 is terminated in operation S2050.

As may be appreciated, an entry 2260 may become full, and yet a pattern may develop that exceeds the frequency of a pattern set in the entry 2260. Accordingly, the SSD controller 2210 also maintains a replacement database 2224 that is stored along with the pattern database 2223 as shown in FIG. 23. The DB manager 2222 updates the replacement database 2224 if a received next read address does not match one of the candidate read addresses nAddr1 to nAddr3 in the entry 2260 for the current read address in the pattern database 2223 and the entry 2260 for the current read address in the pattern database 2223 is full. The updating of the replacement database 2224 may include adding a record for the current read address to the replacement database 2224 if the replacement database 2224 does not include a record for the current read address. The record may have the format shown in FIG. 24C. As shown, the record includes the same key value field nAddr as in the pattern database 2223 for the current read address. The record further includes a replacement read address field RplAddr and an associated count value field rnCnt. Accordingly, the received next read address is placed in the replacement read address field RplAddr and an initial count value (e.g., 1) is stored in the associated count value field.

If a record already exists in the replacement database 2224, then updating the replacement database 2224 includes one of: (1) incrementing the count value rnCnt if the received next read address matches the read address in the replacement read address field RplAddr (e.g., incrementing by 1); and (2) replacing the read address and count value in the replacement read address field RplAddr and the count value field rnCnt, respectively, if the received next read address does not match the read address currently in the replacement read address field RplAddr.

Figure 24C:
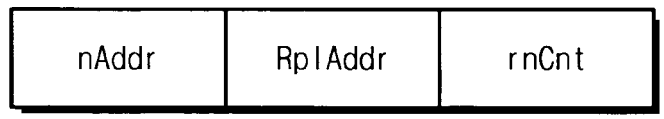
FIG. 24C illustrates a record in a replacement database.

As will be appreciated, although the embodiment illustrated in FIG. 24C includes a single replacement address, more than one replacement read address may be maintained.

The DB manager 2222 selectively updates the pattern database 2223 based on the replacement database 2224. In particular, the DB manager 2222 replaces a candidate address and associated count value (e.g., nAddr3 and nCnt3) in the entry 2260 for a read address with the replacement read address RplAddr and associated count value rnCnt in the record for the read address from the replacement database 2224 if the replacement count value rnCnt becomes greater than the count value associated with the candidate address in the entry 2260 of the pattern database 2223.

Figure 26:
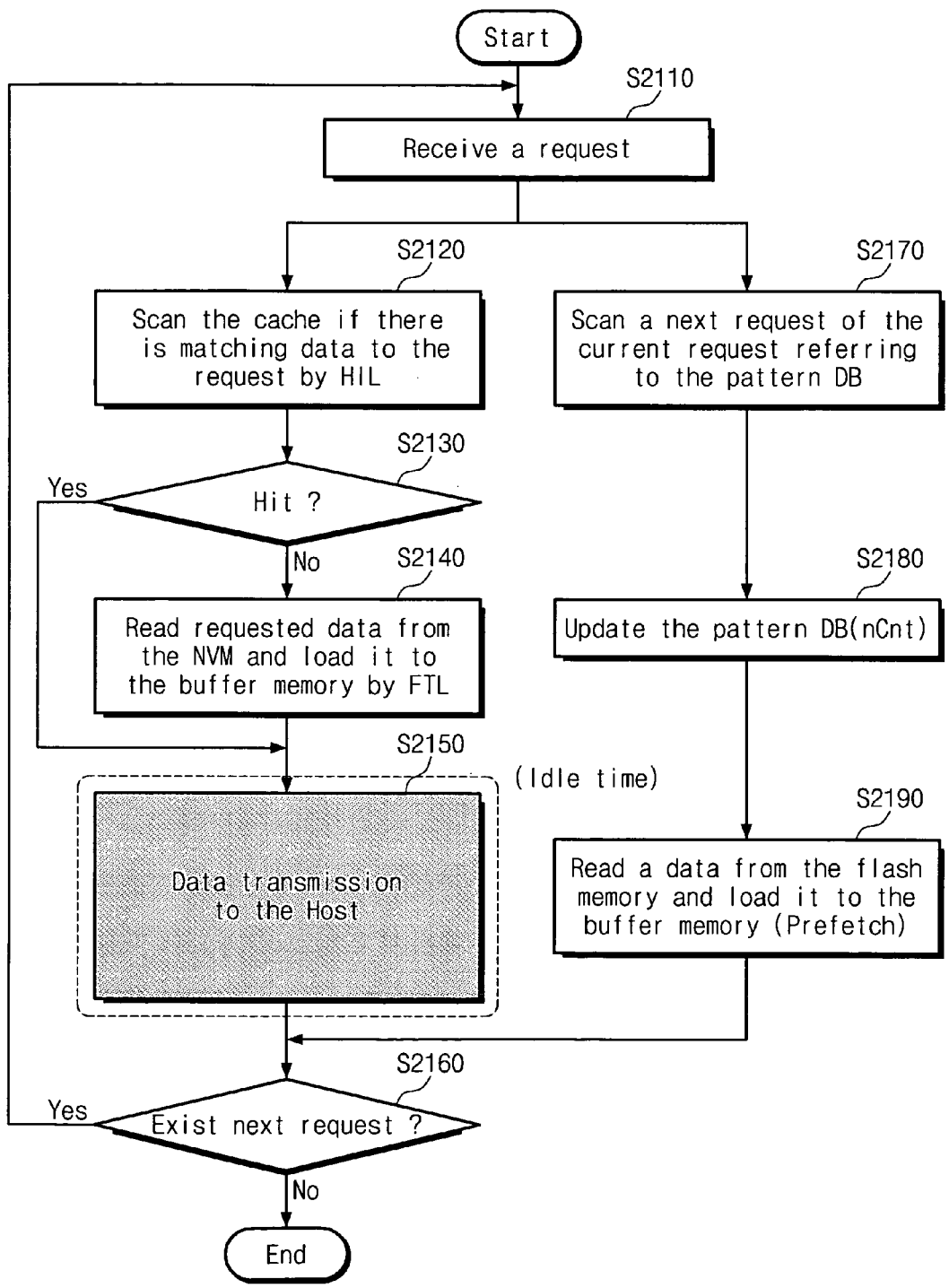
FIG. 26 is a flowchart illustrating a prediction and a pre-fetch operation with reference to a pattern database accumulated through the learning operation of FIG. 25.

FIG. 26 is a flowchart illustrating prediction of the next request of a current read request and a pre-fetch operation with reference to a pattern database accumulated through the learning operation of FIG. 25. In this embodiment, the prediction and pre-fetch operations of FIG. 26 and a process for processing a current request are performed concurrently. This will be described in more detail below.

Once the pattern prediction operation is activated, the input/output predictor 2210 monitors whether a read request is received from the host 2100 of FIG. 22. If there is a read request, a command and an address (LBA and nSC) corresponding to the read request are received in operation S2110. According to the reception of the read request, operations S2120 to S2150 for transmitting the currently read requested data to the host and operations S2170 to S2190 for pre-fetching the predicted read data are performed concurrently. That is, if the SSD 2200 is supported by a processing unit capable of performing parallel processing, host transmission of the currently read requested data and a pre-fetch operation of the predicted read data can be performed concurrently.

First, when examining operations S2120 to S2150 for transmitting the currently read requested data, a scan operation is performed by the host interface layer 2212 in order to determine whether the currently read requested data are cached in the buffer memory 2230 in operation S2120. If there is the current read requested data in the buffer memory 2230 (i.e., Hit), it proceeds to operation S2150 for transmitting the data cached in the buffer memory 2230 to the host without accessing the non-volatile memory 2240. On the contrary, if there is no current read requested data cached in the buffer memory 2230 (i.e., No Hit), it proceeds to operation S2140 for accessing the non-volatile memory 2240 to read requested data. Whether the currently read requested data are cached or not in the buffer memory 2230 can be determined through comparison between a command and an address in operation S2130. In order to access the non-volatile memory 2240 to read the requested data, the FTL 2213 converts a command and an address provided from the host 2100 into a command and an address of the non-volatile memory 2240. Additionally, the requested data are read by providing the converted command and address to the non-volatile memory 2240 and then loaded into the buffer memory 2230 in operation S2140. Next, the read data stored in the buffer memory 2230 are transmitted to the host 2100 in operation S2150.

Additionally, operations S2170 to S2190 for pre-fetching the predicted read data and an operation for transmitting the read requested data may be performed concurrently. The database manager 2222 scans the next request data predicted from the currently read requested address (=a key value) with reference to the pattern database 2223 in operation S2170. Then, an update for the current request is performed. That is, The DB element or entry corresponding to the current read request is updated in operation S2180. The prediction data searched by the database manager 2222 are pre-fetched from the non-volatile memory 2240 to the buffer memory 2230 through the HIL & FTL interface 2221.

Namely, data beginning at the predicted read address is read. The amount of data read may be fixed. For example, 128 sectors are read during each pre-fetch. Alternatively, the entries 2260 may store the largest sector count nSC received in association with the candidate read address, and this number of sectors may be read. As a still further alternative, each nAddr1 to nAddr3 field may store a unique pair of the read address and the sector count such that the amount of sectors in the sector count are fetched beginning at the read address. In this embodiment, the Next1 2262 and the Next2 2263 candidates may include the same read address, but different sector counts. Pre-fetching requires matching both the read address and sector count, with the number of sectors indicated by the matching sector count being pre-fetched. In this embodiment, the replacement database 2224 would likewise store a read address and sector count pair.

If transmitting of the currently read requested data to the host 2100 and the pre-fetch operation of the predicted next read request of a current read request are completed, it proceeds to operation S2160 for determining whether there is the next read request or not. If the there is no next read request, a procedure is terminated. If there is the next read request, it returns to operation S2110 for receiving the read request in operation S2160. It will be appreciated that after step S2180, the operation of steps S2120 to S2140 may be performed with respect to the candidate next read address obtained from the pattern database 2223. Namely, if the data associated with the candidate next read address already exists in the buffer or cache memory 2230, the pre-fetch operation of step S2150 may be avoided.

An operation of the SSD controller 2210 according to an embodiment of inventive concepts of the present invention was described, where an operation for performing a current read request and operations for predicting the next read request of a current read request and performing a pre-fetch operation are performed concurrently. If this prediction and pre-fetch operation are used, the predicted data are pre-fetched from the non-volatile memory 2240 to the buffer memory 2230 during an idle time for transmitting the currently requested data to the host 2100. Accordingly, if the next inputted read request corresponds to the pre-fetched prediction data, the prediction data cached in the buffer memory 2230 are transmitted to the host. Therefore, a response speed of the SSD 2200 can be improved. Here, the idle time is a term for describing a channel operation of the non-volatile memory 2240. That is, while data are transmitted from the buffer memory 2230 to the host 2100, it means that a channel of the non-volatile memory 2240 is not responsible for additional data transmission. Here, whether the data cached in the buffer memory correspond to the read requested data or not is described with terms such as Hit or No Hit. However, it also can be expressed with a term Match or No Match through comparison between an address of the read requested data and an address of the cached data.

Figure 27:
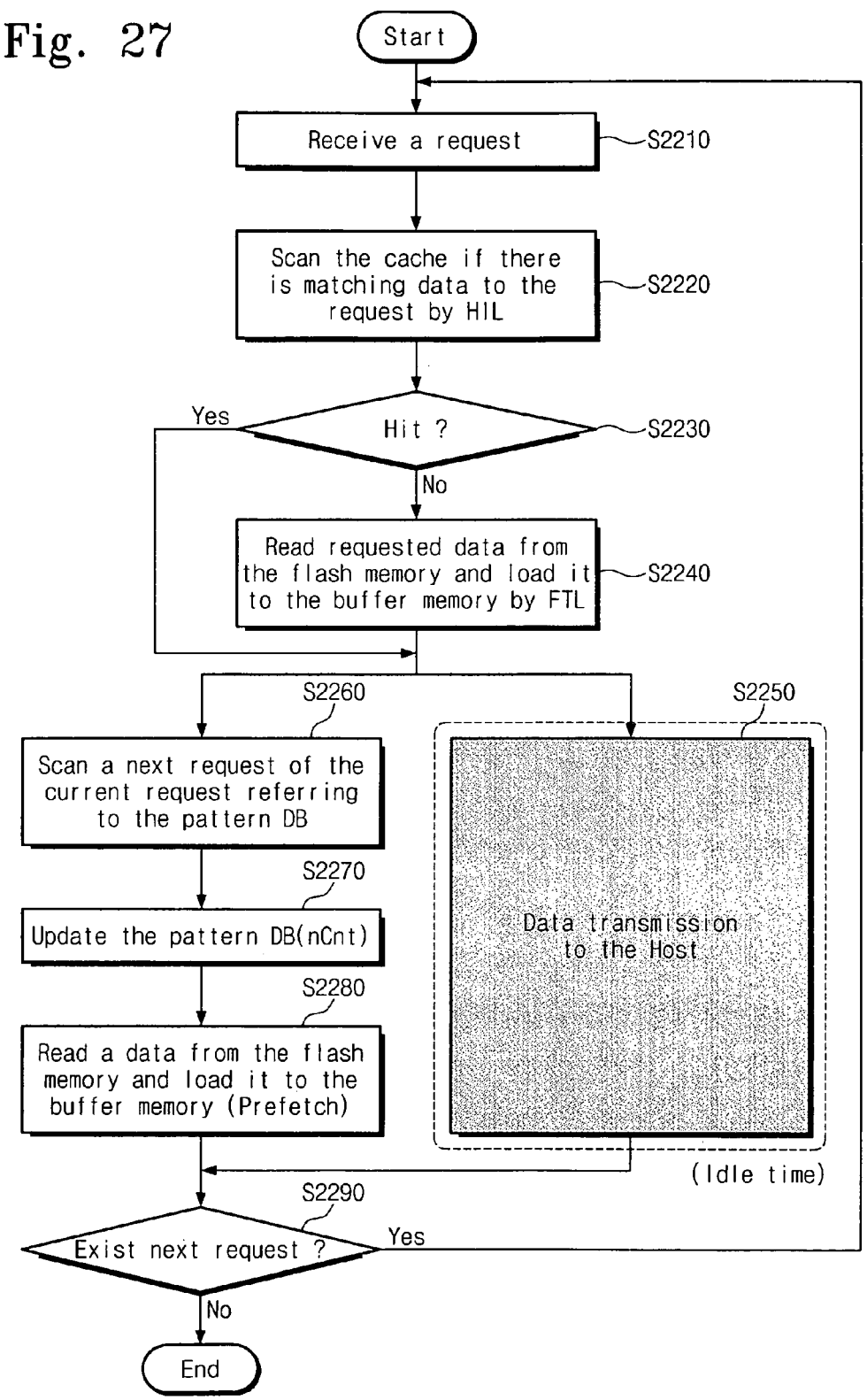
FIG. 27 is a flowchart illustrating a prediction operation and a pre-fetch operation according to another embodiment.

FIG. 27 is a flowchart illustrating a prediction operation of the next request of a current read request and a pre-fetch operation according to another embodiment. Referring to FIG. 27, a cache search of a currently read requested data, prediction of the next read request, and a pre-fetch operation are sequentially performed according to the embodiment. More detailed description will be made below.

Once a pattern prediction operation is activated, an input/output predictor 2210 monitors whether a read request is received from the host 2100 of FIG. 22 or not. Then, if there is the read request, the input/output predictor 2210 receives a command and an address (LBA and nSC) corresponding to the read request in operation S2210. In operation S2220, a scan operation is performed in order to confirm that currently read requested data are cached in the buffer memory 2230 through the host interface layer2 212. If there are the currently read requested data in the buffer memory 2230 (i.e., Hit), a procedure is set to skip an operation for accessing the non-volatile memory 2240. However, if there is no currently read requested data cached in the buffer memory 2230 (i.e., No Hit), it proceeds to operation S2240 for accessing the on-volatile memory 2240 to read the requested data.

Next, the currently read requested data in the buffer memory 2230 are transmitted to the host 2100 in operation S2250. Together with the transmitting of the currently requested data to the host 2100, general operations S2260 to S2280 for predicting the next read request of the currently read request and performing a pre-fetch operation are performed. The database manager 2222 scans the next read requested data, which are predicted from the currently read requested address, with reference to the pattern database 2223 in operation S2260. Next, an update for the current request is performed. That is, a DB element corresponding to the current read request is updated in operation S2270. The prediction data scanned by the database manager 2222 are pre-fetched from the non-volatile memory 2240 to the buffer memory 2230 through the HIL & FTL interface 2221 in operation S2280. Namely, data beginning at the predicted read address is read. The amount of data read may be fixed. For example, 128 sectors are read during each pre-fetch. Alternatively, the entries 2260 may store the largest sector count nSC received in association with the candidate read address, and this number of sectors may be read. As a still further alternative, each nAddr1 to nAddr3 field may store a unique pair of the read address and the sector count such that the amount of sectors in the sector count are fetched beginning at the read address. In this embodiment, the Next1 2262 and the Next2 2263 candidates may include the same read address, but different sector counts. Pre-fetching requires matching both the read address and sector count, with the number of sectors indicated by the matching sector count being pre-fetched. In this embodiment, the replacement database 2224 would likewise store a read address and sector count pair.

Once the transmitting of the currently read requested data to the host 2100 and the pre-fetch operation of the prediction data are completed, it proceeds to operation S2290 for determining there is the next read request or not. If there is no read request, it is terminated. If there is a read request, it returns to operation S2210 for reception. As with the embodiment of FIG. 26, it will be appreciated that after step S2280, the operation of step S2120 to S2140 may be performed with respect to the candidate next read address obtained from the pattern database 2223. Namely, if the data associated with the candidate next read address already exists in the buffer or cache memory 2230, the pre-fetch operation of step S2250 may be avoided.

An operation of the SSD controller 2210 according to an embodiment of inventive concepts of the present invention was described, where an operation for performing a current read request and operations for predicting the next read request of a current read request and performing a pre-fetch operation are performed concurrently. If this prediction and pre-fetch operation are used, the predicted data are pre-fetched from the non-volatile memory 2240 to the buffer memory 2230 during an idle time for transmitting the currently requested data to the host 2100. Accordingly, if the next inputted read request corresponds to the pre-fetched prediction data, the prediction data cached in the buffer memory 2230 are transmitted to the host. Therefore, a response speed of the SSD 2200 can be improved.

Figure 28:
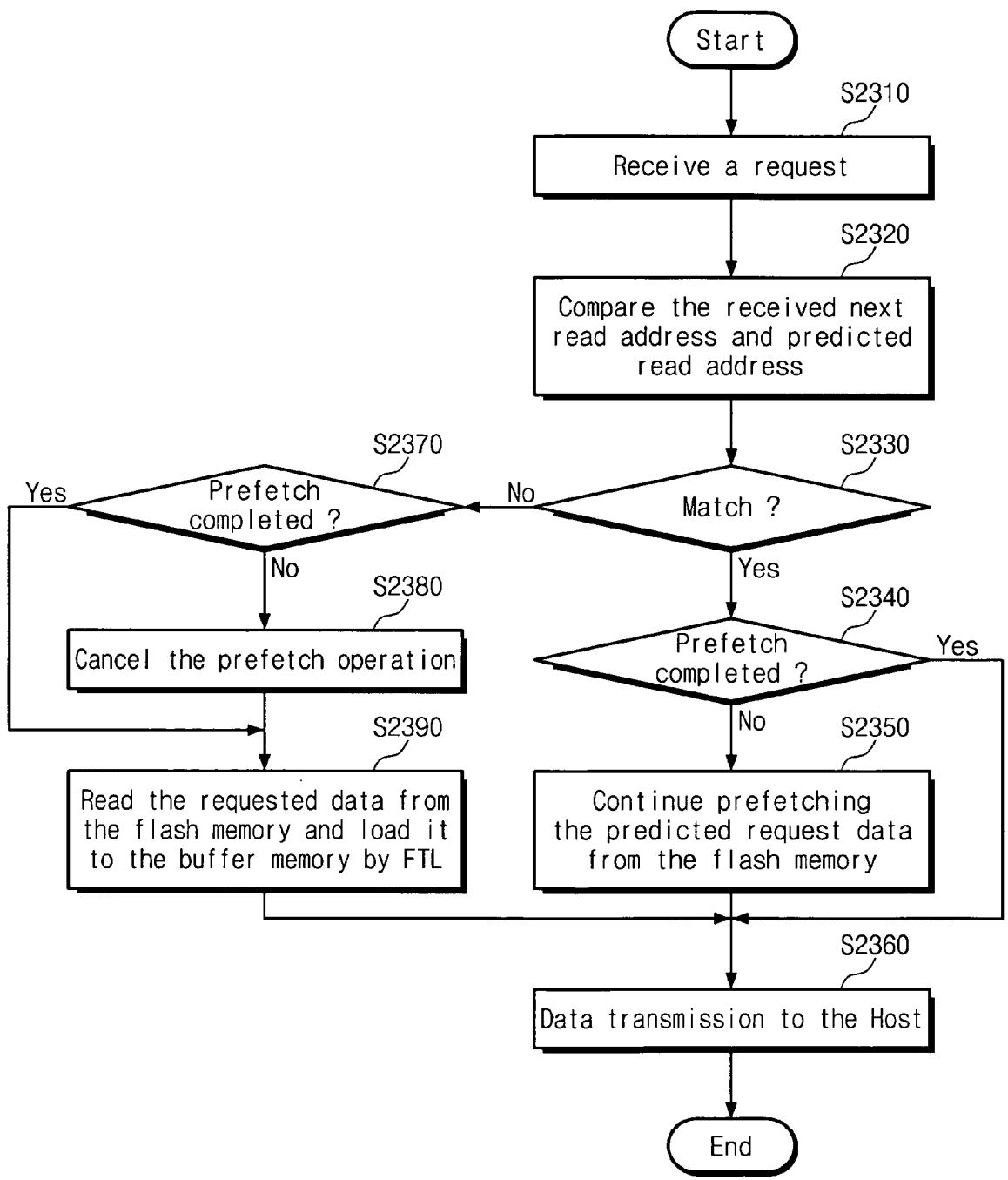
FIG. 28 is a flowchart illustrating handling of a next read request based on the prediction and pre-fetch operation according to an embodiment.

FIG. 28 is a flowchart illustrating a pre-fetch operation of the prediction data and an operation for comparing the predicted read address and a next read address according to an embodiment. Referring to FIG. 28, operational procedures about whether a predicted read address and a received next read address are identical or not will be disclosed.

Once the next read request is provided from the host, the SSD controller 2210 receives the next read address in operation S2310. In response to the received next read request, the SSD controller 2210 performs a comparison operation in order to detect whether the predicted read address and the received next read address are identical or not. According to the result of the comparison operation between the predicted read address and the received next read address in operation S2330, procedures are divided into operation S2340 when they are identical and operation S2370 when they are not identical.

If the predicted read address and the received next read address are identical, it is determined whether a pre-fetch operation corresponding to the predicted read address is in progress or is completed in operation S340. For example, if the ready/busy (r/B) control signal line of the non-volatile memory 2240 indicates ready, the pre-fetch is completed. If the data pre-fetch operation corresponding to the predicted read address is completed, it skips to operation S2360 for transmitting the pre-fetched data to the host. On the contrary, if the data pre-fetch operation corresponding to the predicted read request is still in progress, it proceeds to operation S2350 for maintaining the pre-fetch operation. Once the pre-fetch operation is completed, the pre-fetched data will be transmitted to the host in operation S2360.

If the predicted read address is not identical to the received next read address, the SSD controller 2210 determines whether a pre-fetch operation corresponding to the predicted first request is in progress or is completed in operation S2370. If the pre-fetch operation corresponding to the predicted read address is completed, the SSD controller 2210 discards the pre-fetched data and skips to operation S2390 for accessing the non-volatile memory 2240 to read data corresponding to the current read request. On the contrary, if the pre-fetch operation corresponding to the predicted read address is still in progress, it proceeds to operation S2380 for controlling the non-volatile memory device 2240 to stop the pre-fetch operation. Here, the SSD controller 2210 stops the operation for pre-fetching wrong prediction data and the SSD controller 2210 reads data corresponding to the current read request from the non-volatile memory 2240 and then stores the data in the buffer memory 2230. Next, the data corresponding to the current read request stored in the buffer memory 2230 will be transmitted to the host.

According to the embodiment described referring to FIG. 28, a case where the predicted read address corresponding to the current read address is not the same was described in more detail. This embodiment may be usefully applied to a case where the next read request is provided from the host when a data pre-fetch operation corresponding to a predicted read address is in progress. Here, whether the currently inputted read address is identical to the pre-fetch operation is described with the term 'Match", but the term 'Match' has the same meaning as the term 'Hit' of FIGS. 26 and 27. The same process may be applied to the other embodiments such as where the prediction is both a read address and a number of sectors to be read. In this case, the next read address and the number of sector must both match their predicted counter parts to maintain the pre-fetch operation.

Figure 29:
FIG. 29 is a view illustrating patterns of read requests inputted into SSD.

FIG. 29 is a view illustrating patterns of read requests inputted into SSD 2200 of inventive concepts of the present invention. Referring to FIG. 29, the read request inputs a sector count nSC continuous from an address corresponding to an address LBA. These read requests can be described with a booting process of a computing system to which a specific application or an operating system (OS) such as Windows is installed. The above mentioned system booting or application program execution has many portions identical to the data input/output pattern. Accordingly, through pre-fetching the prediction data by learning the same repeating input/output patterns, a response speed of the SSD 2200 with respect to the system can be improved.

Figure 30:
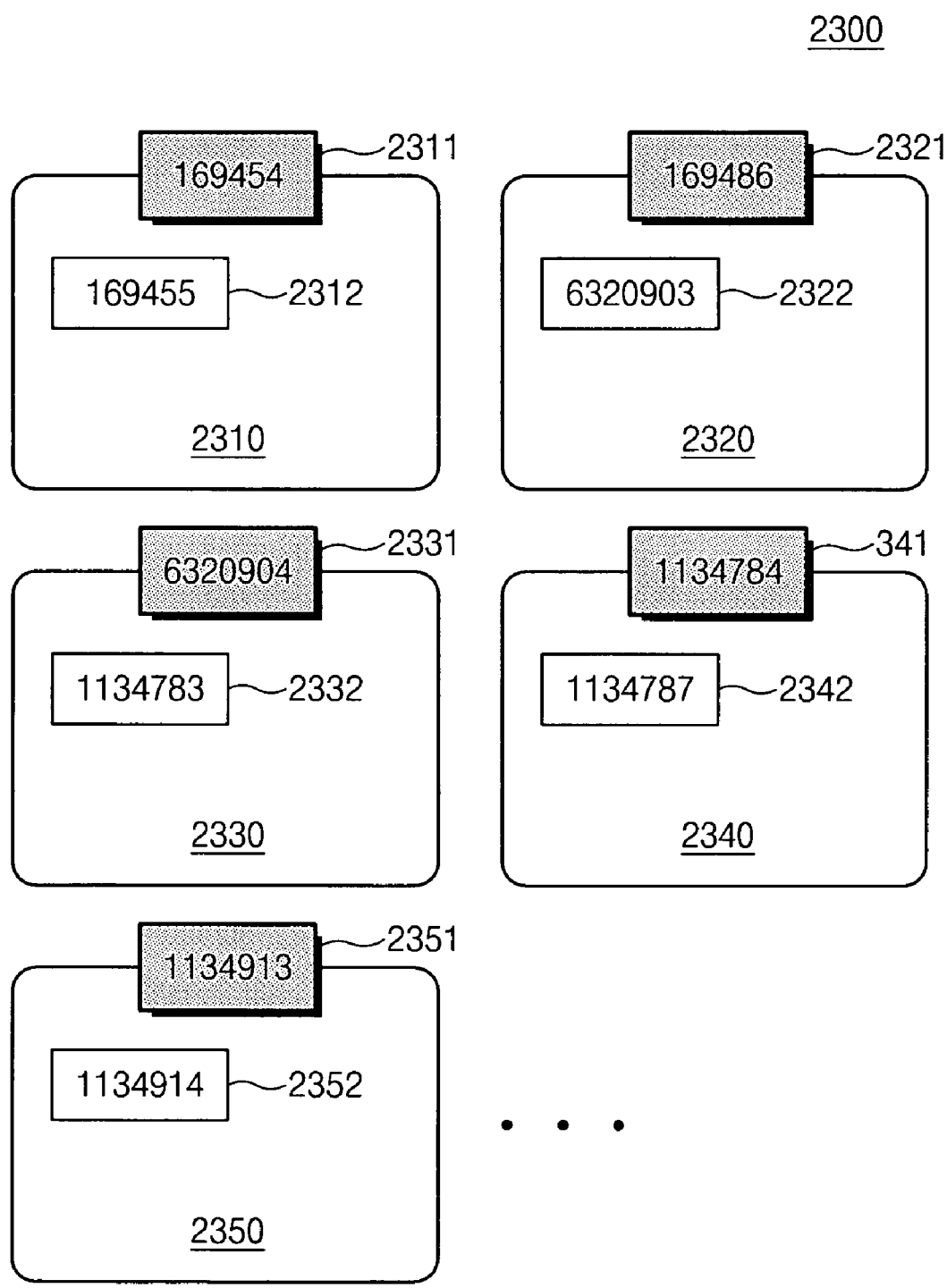
FIG. 30 is a view illustrating a pattern database configured based on a learning operation when the read requests of FIG. 29 are repeatedly inputted (for example, during a booting operation).

FIG. 30 is a view illustrating a pattern database 300 configured based on a learning operation when the read requests of FIG. 29 are repeatedly inputted (for example, during a booting operation). Referring to FIG. 30, an address and a sector count corresponding to each of the read requests constitutes one DB entry of the pattern database 300. Additionally, through sequential combination of DB entries 310, 320, 330, 340, 350, . . . , when the read request patterns of FIG. 28 are inputted without a change, continuous prediction and pre-fetch operations are possible. More detailed description will be made below.

In order to constitute the DB element or entry 2310 corresponding to a first inputted read request (LBA=169439, nSC=16), the database manager 2222 generates a key value 2311. The key value 2311 is defined as a position (LBA+nSC−1) of the last sector among data of the read request (LBA=169439, nSC=16). Accordingly, the key value 2311 of the DB element 2310 corresponding to the read request (LBA=169439, nSC=16) is set as 169454. Additionally, the prediction value 2312 of the next read request about the read request (LBA=169439, nSC=16) is defined as a first address LBA (LBA=169455). Here, the predicted other candidates will not be mentioned.

Although not illustrated, a DB element or entry for a second read request (LBA=169455, nSC=16) may have a key value of 169470(=169455+16−1) and a prediction value 169471. A DB element 320 for a third read request (LBA=169471, nSC=16) may have a key value 321 of 169486 (=169471+16−1) and a prediction value 2322 of 6320903. A DB element 2330 for a fourth read request (LBA=6320903, nSC=2) may have a key value 2331 of 6320904(=6320903+

2-1) and a prediction value 2332 of 1134783. A DB element 2340 for a fifth read request (LBA=1134783, nSC=2) may have a key value 2341 of 1134784(=1134783+2−1) and a prediction value 2342 of 1134787. A DB element 2350 for a sixth read request (LBA=1134787, nSC=127) may have a key value 2351 of 1134913(=1134787+127−1) and a prediction value 2352 of 1134914. Continuously, DB elements for each read request of FIG. 28 are generated to build the pattern database 2300.

Based on the pattern database 2300 configured according to the above operations, the prediction and pre-fetch operations of the next read request corresponding the inputted read request will be described briefly. If the current read request (LBA=6320903, nSC=2) is inputted, the database manager 2222 generates a key value 6320904 and searches the pattern database 2223. At this point, the DB element 2330 will be scanned and 1134783 is obtained as the prediction value 2332. Then, data of the next read request corresponding to the prediction value 332 of 1134783 will be pre-fetched from the non-volatile memory 240 to the buffer memory 230 in advance.

Based on the above pattern database, even if read requests are random, the next read request can be predicted. Accordingly, a response speed of a semiconductor disk device can be drastically improved.

Figure 31:
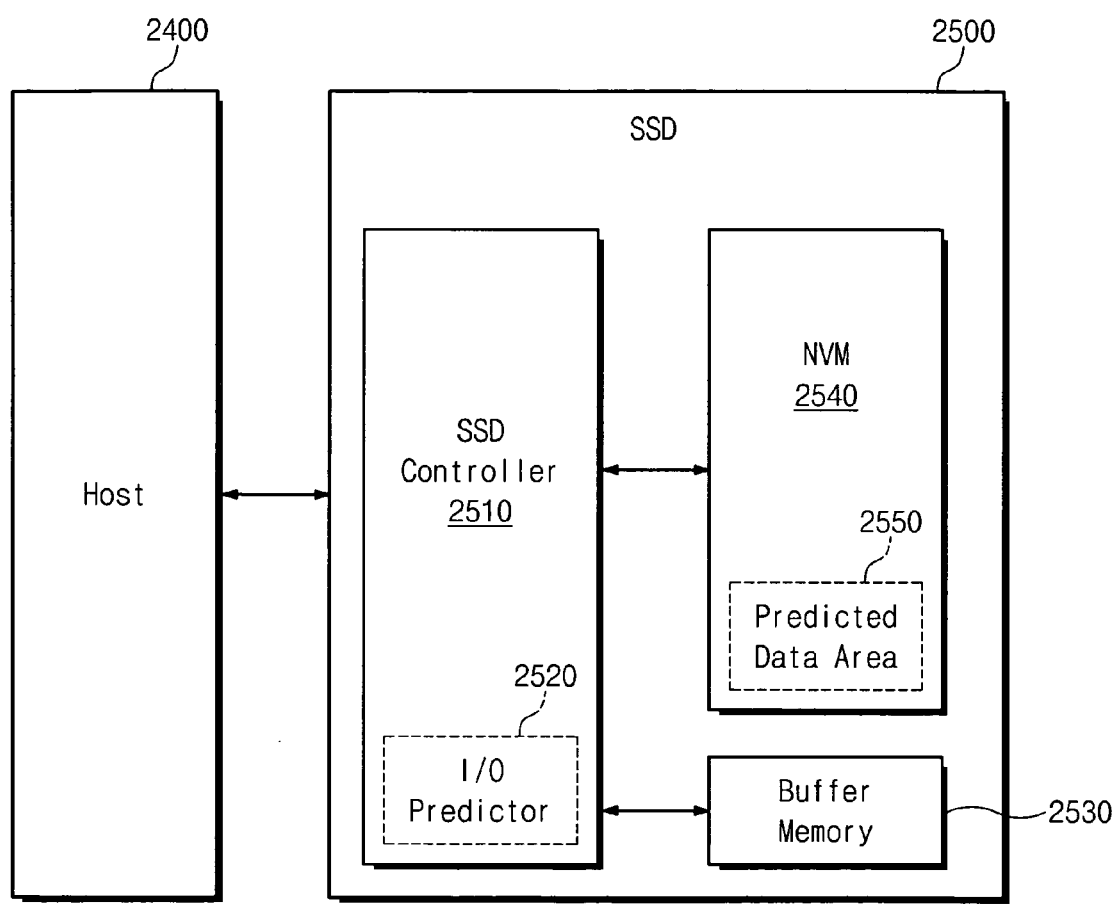
FIG. 31 is a block diagram illustrating SSD according to another embodiment.

FIG. 31 is a block diagram illustrating SSD 2500 according to another embodiment of inventive concepts of the present invention. Referring to FIG. 31, the SSD 2500 stores or reads data in or from a non-volatile memory 2540 in response to a read/write request from a host 2400. The SSD 2500 predicts a pattern of a request provided from the host 2400. While the currently requested data are transmitted from the buffer memory 2530 to the host 2400, the predicted next data are pre-fetched from the non-volatile memory 2540 to the buffer memory 2530. Unlike the embodiment of FIG. 22, the SSD 2500 of FIG. 31 stores predicted data in a predicted data area 2550 of the non-volatile memory 2540. Otherwise, the pattern database creation, prediction, and pre-fetching take place as described in detail above. Data satisfying the above specific standard are programmed in the predicted data area 2550 of the non-volatile memory 2540 through the input/output predictor 2520. The predicted data area 2550 may be one memory area allocated from the non-volatile memory 2540. Or, the predicted data area 2550 may be an area for providing the highest pre-fetch speed from the non-volatile memory 2540 to the buffer memory 2530. For example, a predicted data area 2550 may be allocated from an area including a single level cell (SLC). A single level cell (SLC) stores a single bit ('0' or '1') based on a single threshold for a storage transistor. As discussed previously, a multi-level cell (MLC) stores more than one bit based on multiple thresholds for a storage transistor. The non-volatile memory 2540 may include both SLC and MLC cells in respective section, and the predicted data is stored in the SLC section.

Similarly, instead of storing the pattern database 2223 and replacement database 2224 in the memory controller 2210, or in addition to (e.g., for back-up purposes), the pattern database 2223 and replacement database 2224 may be stored in the SLC section.

The SSD 2500 including the above components performs a learning function about a sequence of read requests inputted from the host 2400, a prediction function, and a pre-fetch function about the prediction data. Especially, as the predicted data area 2550 is provided, a prompt response to the host 2400 and a high pre-fetch speed about the learned data can be provided. The pre-fetch operation is performed during an idle time of the non-volatile memory 2540, at which the currently requested data are transmitted from the buffer memory 2530 to the host 2400. Accordingly, a channel performance between the non-volatile memory 2540 and the buffer memory 2530 is optimized to provide a more prompt response to a request from the host 2400.

Figure 32:
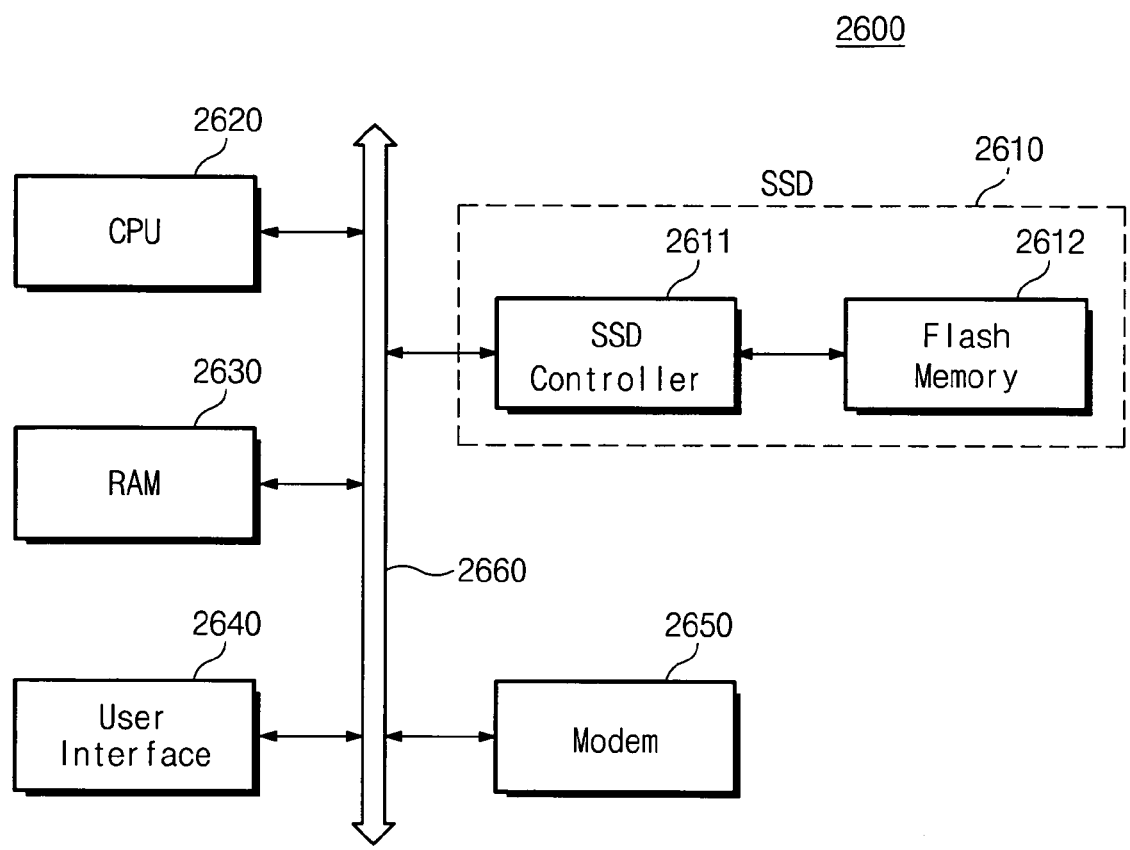
FIG. 32 is a view illustrating a computing system including a SSD according to an embodiment.

FIG. 32 is a view illustrating a computing system 2600 including SSD according to an embodiment. The computing system 2600 includes SSD 2610, a CPU 2620, a RAM 2630, a user interface 2640, a modem 2650 such as a baseband chipset, all of which are electrically connected through a bus. The SSD 2610 includes SSD controller 2611 and a flash memory device 2612. The flash memory device 2612 stores N-bit data (N is an integer equal to or greater than 1) through the SSD controller 2611, which were processed/will be processed by the CPU 2620. Here, the SSD 2610 may be substantially identical to the SSD 2200 or 2500 of FIG. 22 or FIG. 30. If the computing system is a mobile device, a battery (not shown) is additionally provided in order to supply an operating voltage of the computing system. Although not illustrated, it is apparent to those skilled in the art that the computing system 2600 may further include an application chipset, a camera image processor (CIS), and a mobile DRAM. The computing system 2600 can access the SSD 2610 at a high speed. Additionally, the computing system 2600 having a high speed booting can be realized as described with respect to the previous embodiments.

The flash memory device and/or the SSD controller may be mounted through various kinds of packages. For example, the flash memory device and/or the SSD controller may be mounted through various packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP).

It will be appreciated that the embodiments of FIGS. 22-32 may be implemented in combination with any of the I/O restriction embodiment of FIGS. 11-21 and/or the status monitoring embodiments of FIGS. 1-10.

As described above referring to FIG. 22 to FIG. 32, the third embodiment of inventive concepts of the present invention provides a function of predicting a next read request. Based on the prediction result, a data pre-fetch is performed. Thus, operating speeds of a nonvolatile memory device, a memory system including a nonvolatile memory device and a computing system including a memory system having a nonvolatile memory device are advanced.

Obtaining Reserved Blocks

Hereinafter, referring to FIG. 33 to FIG. 41, a fourth embodiment according to inventive concepts of the present invention is described.

Figure 33:
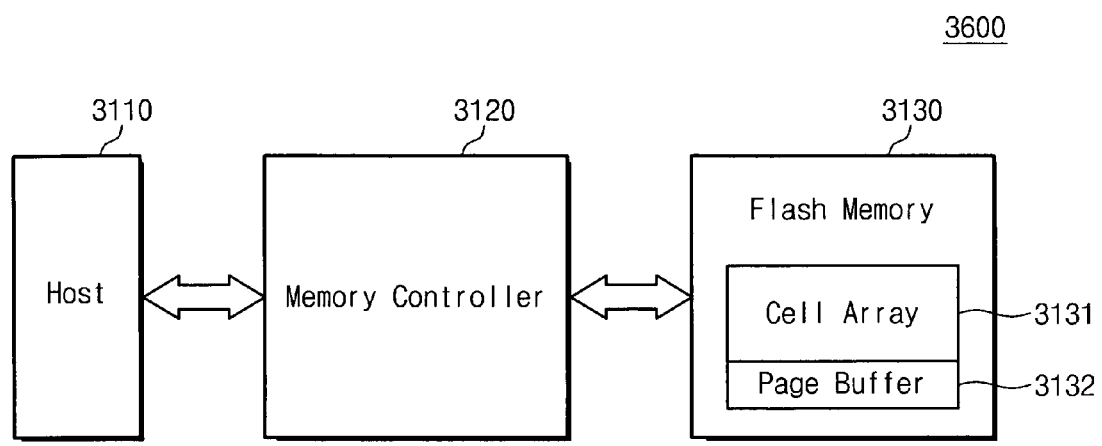
FIG. 33 is a view illustrating a memory system according to a fourth embodiment according to inventive concepts of the present invention.

FIG. 33 is a view illustrating a memory system according to the fourth embodiment according to inventive concepts of the present invention. The memory system 3100 includes a host 3110, a memory controller 3120, and a flash memory 3130. The memory controller 3120 and the flash memory 3130 may be a memory card or an SSD.

The flash memory 3130 includes a memory cell array 3131 and a page buffer 3132. Although not illustrated in FIG. 33, the flash memory 3130 may further include a decoder, a data buffer, and a control unit. The memory controller 3120 controls the flash memory 3130 in order to write data in the memory cell array 3131 in response to data and a write command inputted from the host 3110. Additionally, the memory controller 3120 controls the flash memory 3130 in order to read data stored in the memory cell array 3131 in response to a read command inputted from the host 3110.

The memory cell array 3131 of the flash memory 3130 includes a plurality of memory cells. The memory cell is non-volatile and thus retains data even when there is no power supply after storing the data. The page buffer 3132 is a buffer in which data that will be written in a selected page of the memory cell array 3131 are stored or data read from a selected page are stored.

However, unlike a hard disk capable of performing a data overwrite operation, the flash memory 3130 may have some restriction in overwriting data. In order to overwrite data in the flash memory 3130, data must be erased first. This is called erase-before-write. That is, the flash memory 3130 needs to restore an initial status or an erase status before writing data.

An erase operation of the flash memory 3130 typically takes a longer time than a write operation. Additionally, since an erase unit (i.e., a block unit) of the flash memory 3130 is larger than a write unit (i.e., a page unit) thereof, areas that do not need to be erased also are erased. The unintentionally erased areas must be restored by performing a write operation again. That is, since the flash memory has a different erase unit from a write unit, performance of the write operation is less than that of the read operation. Additionally, if the flash memory 3130 performs an erase operation about 10,000 times on the same block, it may not be available any more. In order to prevent performing of erase operations repeatedly on a specific block of the flash memory 3130, a wear leveling operation is performed.

Figure 34:
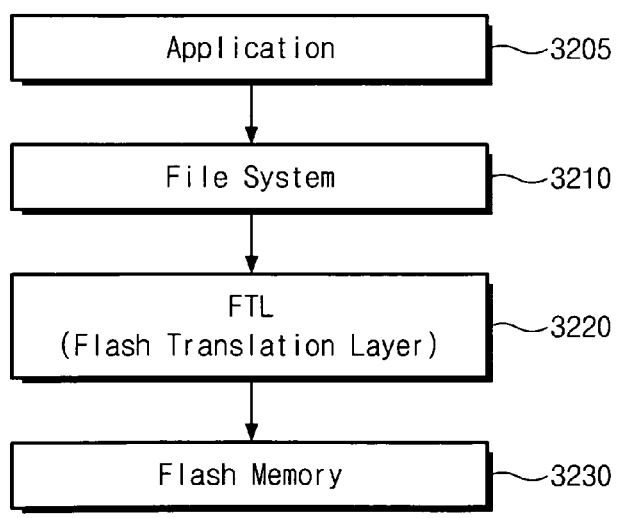
FIG. 34 is a block diagram illustrating a software configuration of the memory system of FIG. 33.

FIG. 34 is a block diagram illustrating a software configuration of the memory system of FIG. 33. Referring to FIG. 34, the memory system has a software layer structure in which an application 3205, a file system 3210, a FTL 3220, and a flash memory 3230 are sequentially arranged.

The FTL 3220 is software that overcomes disadvantages of the above mentioned flash memory and effectively manages the flash memory 3230. The FTL 3220 receives a logical address LA from the application 3205 or the file system 3210. The FTL 3220 receives the logical address LA and then converts it to a physical address PA. The physical address PA is provided into the flash memory 3230.

The FTL 3220 includes an address mapping table for managing an address mapping operation. A logical address and a corresponding physical address are written in the address mapping table. According to a mapping unit, the address mapping table may have different sizes and also may have various mapping methods. The address mapping table is driven by the memory controller 3120 of FIG. 33.

A typical method includes a page mapping method, a block mapping method, and a hybrid mapping method. The page mapping method uses a page mapping table. The page mapping table performs a mapping operation by a page unit and stores a logical page and a corresponding physical page. The block mapping method uses a block mapping table. The block mapping table performs a mapping operation by a block unit and stores a logical block and a corresponding physical block. The hybrid mapping method uses the page mapping method and the block mapping method simultaneously.

However, a memory block of the flash memory 3230 may be defective. The defective block is called a bad block. The bad block may occur because of various factors. For example, due to a column fail, disturbance, and wear-out, a normal block becomes a bad block. Bad block determination may be performed according to any of the above described embodiments.

Since data cannot be stored in the bad block, the bad block must be replaced with a normal block. Accordingly, the flash memory 3230 includes a reserved block that is used for replacing the bad block. According to an embodiment, reserved blocks for replacing bad blocks constitute a reserved area. Additionally, the memory cell array of the flash memory 3230 is divided into a user area and a reserved area. Reserved blocks in the reserved area are provided when a data block in a user area becomes a bad block. The reserved area is not recognized by a user, only the user area is available for storing data.

Figure 35:
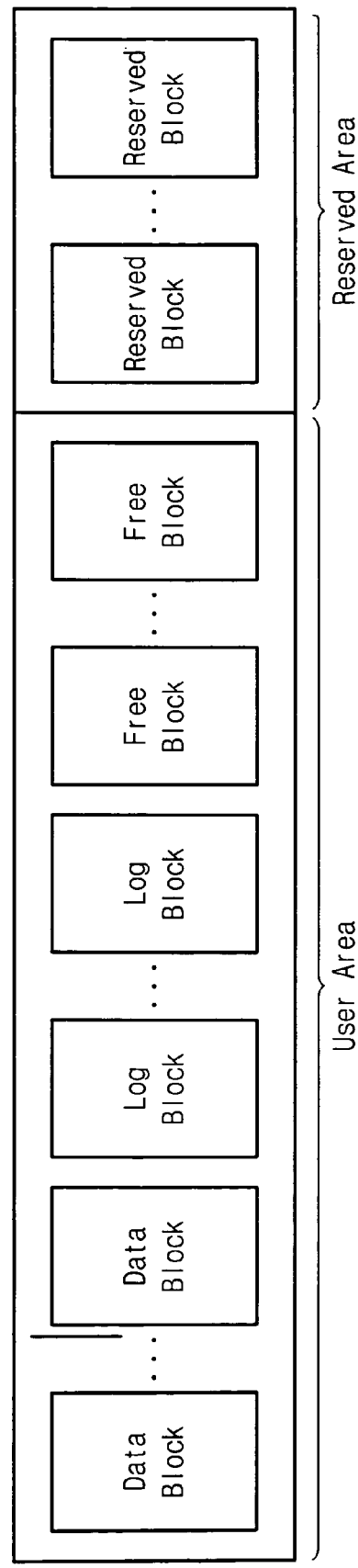
FIG. 35 is a view illustrating the memory cell array of FIG. 33.

FIG. 35 is a view illustrating the memory cell array 3131 of FIG. 33. Referring to FIG. 35, the memory cell array 3131 is divided into a user area and a reserved area. The user area includes at least one memory block. Memory blocks in the user area can be classified according to a purpose. For example, in a case of a hybrid mapping scheme, memory blocks may be divided into a data block, a log block, and a free block. User data are stored in the data block. The log block is used to modify the data stored in the data block. A part of a free block is allocated as the log block.

However, defects may occur due to various factors in the data block, the log block, and the free block. For example, defects may occur because of column fail, disturbance, and wear-out. The reserved area is provided to replace defective memory block in the user area. The reserved area includes at least one reserved block. The reserved area is configured to account for a desired (or, alternatively a predetermined) ratio of the memory cell array. For example, the reserved area may account for about 5 percent of the memory cell array.

Figure 36:
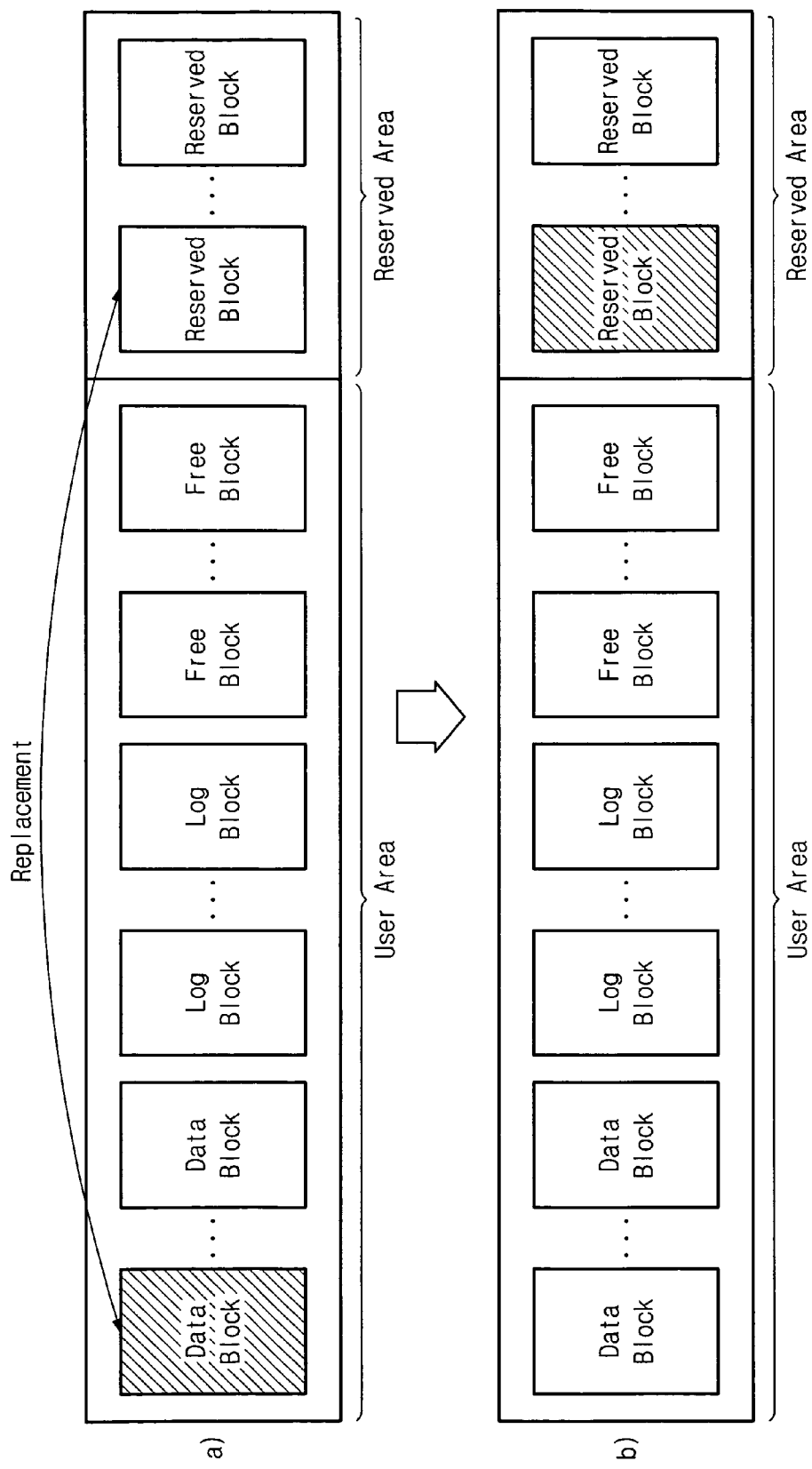
FIG. 36 is a view illustrating a method of replacing a defective memory block with a reserved block when there is a defective memory block in a user area.

FIG. 36 is a view illustrating a method of replacing a defective memory block with a reserved block when there is a defective memory block in a user area. Referring to FIG. 36(a), it is assumed that there is a defective data block in a user area. If there is a defective data block, data stored therein may be lost. In order to prevent the loss of the data, the data stored in the defective data block are stored in a reserved block in the reserved area.

Next, the reserved block is changed into the data block, and the data block is changed into the reserved block (See FIG. 36(b)). This change is performed by updating a correspondence relationship between a logical address and a physical address at the FTL 3220. The updating of the correspondence relationship is performed by updating a mapping table. That is, a logical address corresponding to a defective data block is changed to correspond to a normal data block. The normal data block may be an available free data block designated as a reserved block. In this case, the designation of the available reserved block is changed to a user area block. Also, the designation of the defective data block may be changed to the reserved area. In particular, an indicator indicating the type of block associated with a physical address is stored in association with each physical address. For example, the indicator indicates if the block is a user area block or a reserved block. The indicator or additional indicators may also indicate the amount of valid and invalid data stored by the block (usually on a page basis). Accordingly, from this it can be determined whether a block is free, partially stores valid data, partially stores invalid data, etc.

Accordingly, if there is an access request from the external (e.g., a host), the FTL 3220 refers to the mapping table to provide the normal physical block address corresponding to the requested logical block address to the flash memory.

As the defective memory block is replaced with the reserved block, the number of available reserved blocks is reduced. Additionally, a reserved block itself may also have defects. If all the reserved blocks become the bad blocks, the flash memory may not be able to deal with a write request form the host. Finally, the semiconductor memory device becomes unavailable. This deteriorates the reliability and life cycle of the semiconductor memory device. Therefore, it is important to obtain the appropriate number of reserved blocks.

According to an embodiment, if the number of available reserved blocks is less than a reference number, the memory controller 3120 diverts memory blocks in a user area into reserved blocks. Accordingly, the available reserved blocks maintain a desired (or, alternatively a predetermined) number. An available reserve block is one that may be used as a normal data block. For example, a free block designated as a reserved block is an available reserved block while a bad or defect block designated as a reserved block is not available. This improves the reliability and life cycle of the semiconductor memory device. Hereinafter, a method of obtaining a desired reserved area will be described in more detail with reference to the drawings.

Figure 37:
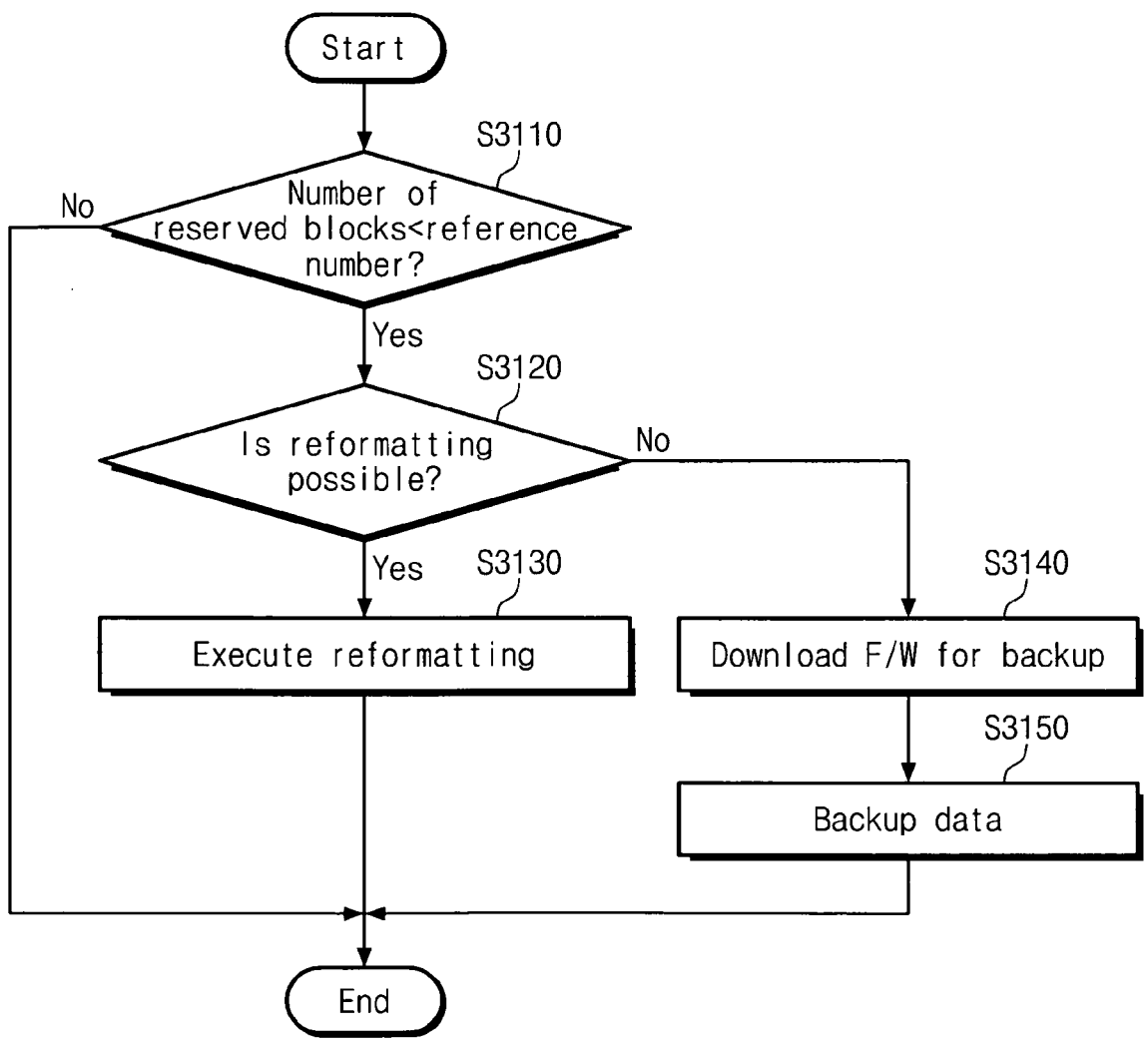
FIG. 37 is a flowchart illustrating a method of obtaining a reserved area according to an embodiment.

FIG. 37 is a flowchart illustrating a method of obtaining a reserved area according to an embodiment. According to this embodiment, if the number of available reserved blocks is less than a reference number, an operation is performed to obtain reserved blocks. However, if there is no available memory blocks in the user area, it is difficult to obtain reserved blocks. In this embodiment, if there are limitations in obtaining a reserved block, an operation is performed to backup data stored in the flash memory in another storage medium. The method of FIG. 37 may be performed periodically, after each write operation, after each determination of a bad block, after each reporting of status parameters, or after any other triggering event.

Referring to FIG. 37, the memory controller 3120 or host 3100 determines whether the number of available reserved blocks is less than a reference number in operation S3110. For example, the number of available reserved blocks may be a parameter monitored by the status checking module 125 discussed above with respect to FIG. 1. Accordingly, the status checking module 125 may supply the memory controller 3120 or the host 3100 with this information. The reference number may be set with an arbitrary number. For example, as the reference number is larger, the number of reserved blocks is increased, and as the reference number is smaller, the number of reserved blocks is decreased. As mentioned above, the number of reserved blocks is decreased as they are used to replace bad blocks.

This determination operation may be performed by the memory controller 3120 or the host 3110. The memory controller 3120 may perform the determination operation after receiving information about the number of available reserved blocks from the status checking module, the flash memory or based on the FTL 3210. Or, the host 3110 may perform the determination operation after receiving information about the number of available reserved blocks from the status checking module and/or the memory controller 3120. If the number of available reserved blocks is more than the reference number according to the determination result, an operation for obtaining reserved blocks is unnecessary. Accordingly, the operation for obtaining reserved blocks is terminated. On the contrary, if the number of available reserved blocks is less than the reference number, processing proceeds to operation S3120.

In operation S3120, it is determined whether a reserved block obtaining operation is performed or not. In this embodiment, the reserved block obtaining operation may be called a reformatting operation, a conversion operation, a change operation or an increasing reserved block operation. Because of the reformatting operation, memory blocks in a user area and reserved blocks in a reserved area are converted or changed. However, the reformatting operation can be performed only when there are available memory blocks in the user area. In this embodiment, the available memory block refers to a memory block where data are not stored (e.g., free blocks) or invalid data are stored.

In particular, the user area may include free blocks in which no data is stored, but data may be readily stored. For example, for a flash memory, a free block is an erased block. Also, the user area may include blocks at least partially filled or completely filled with invalid data. Blocks completely filled with invalid data may be erased to become free blocks. Partially invalid or partially valid blocks may be erased after having any valid data portions thereof copied to a free block. For example, several partially invalid blocks may become free blocks through this process while using a much smaller number of free blocks such that the total number of free blocks increases. If the number of free blocks or creatable free blocks is greater than the number of reserved blocks needed to once again exceed the reference number, it is determined that reformatting is possible.

According to the determination result, only if the reformatting operation can be performed, the reformatting operation is performed in step S3130. In order to obtain a reserved block, available memory blocks are selected in the user area. First, memory blocks in the user area, which do no store data or store invalid data, can be selected for memory block replacement. The reformatting operation will be described in more detail with reference to the drawing.

If the reformatting operation cannot be performed, the data stored in the semiconductor memory device need backup. The data stored in a defective memory block may be lost. In order for data backup, firmware (or, F/W) is required. In operation S3140, firmware for backup is downloaded from the host to the flash memory. For example, the firmware for backup may be stored in BIOS of the host. In general, the BIOS is stored in the non-volatile memory device. Accordingly, BIOS information is maintained even when there is no power supply. If there is a firmware for backup in the flash memory, additional firmware download is not required. Accordingly, operation S3140 may be omitted. For example, firmware may be stored in the memory controller. Or, firmware may be stored in the flash memory.

Especially, the firmware for backup may be stored in a host protected area (HPA) of the flash memory. The HPA is also called a hidden protected area. The HPA is introduced first in the ATA-4 standard. A hard disk informs the host of a capacity excluding the HPA in response to an identify device command from OS. Additionally, a read native max address command provides the size including the HPA. As a result, it can be determined whether there exits the HPA or not through the above commands.

Generally, the HPA is combined with the BIOS to be used for booting and diagnosis. Additionally, the HPA may be used against data loss. If a hard disk is formatted, data in the HPA can be maintained.

According to an embodiment, the flash memory includes a HPA. Additionally, firmware for backup is stored in the HPA in advance. Accordingly, the firmware for backup of a flash memory does not need to be loaded from the host or the memory controller. The data stored in the flash memory by driving the firmware for backup can be stored in another storage medium. As the storage medium for backup, another normal flash memory or hard disk can be used.

Additionally, a booting image can be stored in the HPA. If there is something abnormal in the booting image stored in the flash memory, a system may not be booted. Therefore, if the memory system is not booted, a system can be booted using the booting image of the HPA.

The data may then be backed-up in operation S3150.

Next, the reformatting operation S3130 will be described in greater detail with respect to FIGS. 38 and 39 below.

Figure 38:
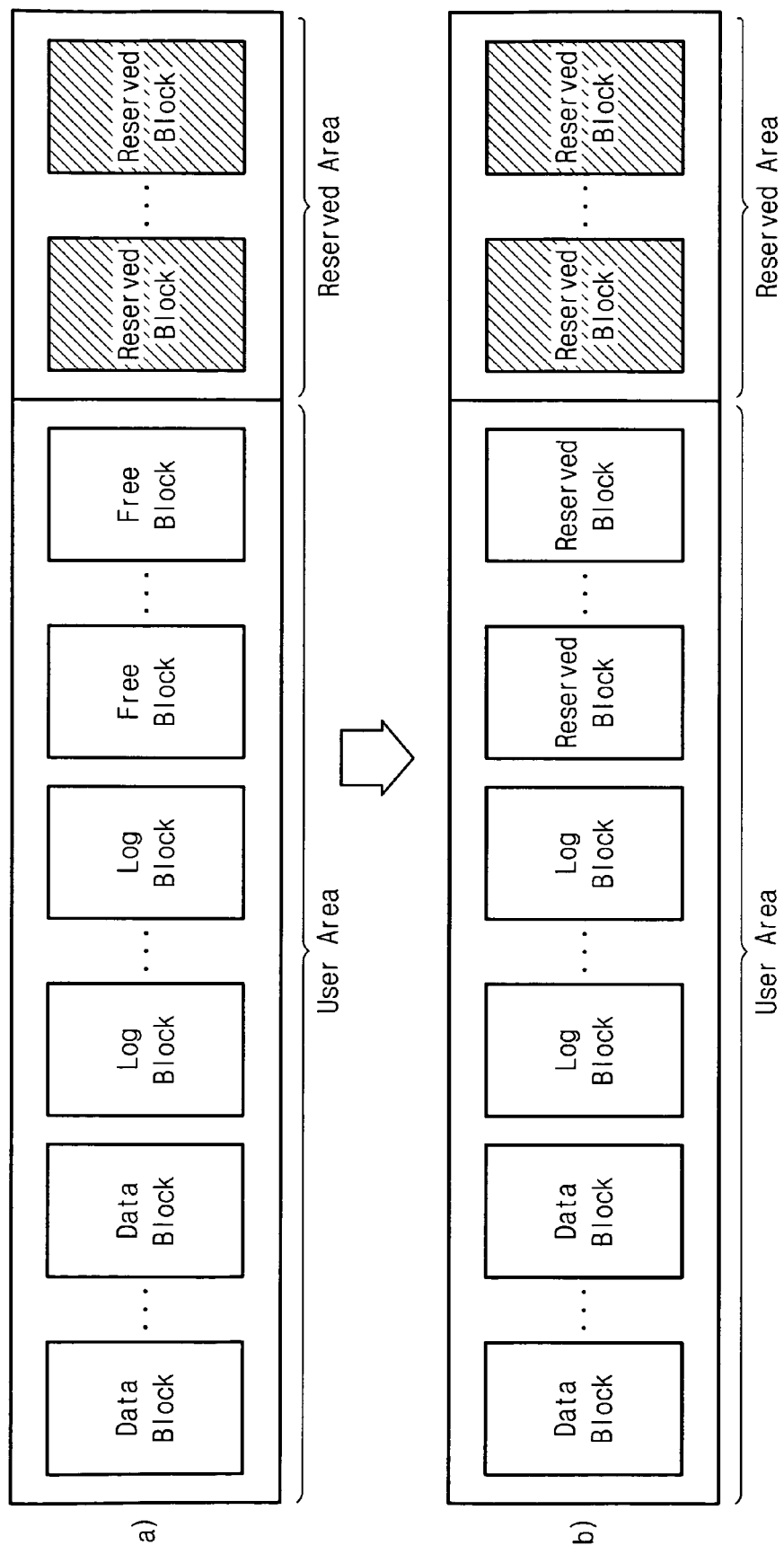
FIG. 38 is a view illustrating a method of obtaining a reserved area according another embodiment.

FIG. 38 is a view illustrating a method of obtaining a reserved area according to one embodiment. Referring to FIG. 38(a), it is assumed that all reserved blocks in a reserved area are bad blocks. The bad blocks are indicated with hashing. A reserved block may be a bad block due to a bad block replacement in a user area or its own defect. If all the reserved blocks are used as bad blocks, the flash memory 3130 may not be able to deal with a write request (e.g., from a host). Accordingly, the available number of reserved blocks needs to be increased above the reference number. According to an embodiment, memory blocks in a user area are used as reserved bocks. Especially, memory blocks where data are not stored (e.g., free blocks) or invalid data are stored may be used as available reserved blocks first.

Referring to FIG. 38(b), some memory blocks in a user area are changed into reserved blocks. As discussed above, in the FTL 3210, an indicator associated with the physical address of the memory blocks may be changed from indicating association with the user area to association with the reserved area. The reserved block will be used for replacing a memory block in the user area. In this embodiment, a free block is changed into a reserved block, but the embodiments are not limited thereto. For example, a data block or a log block may be converted into free block and then converted into a reserved block as described below.

Figure 39:
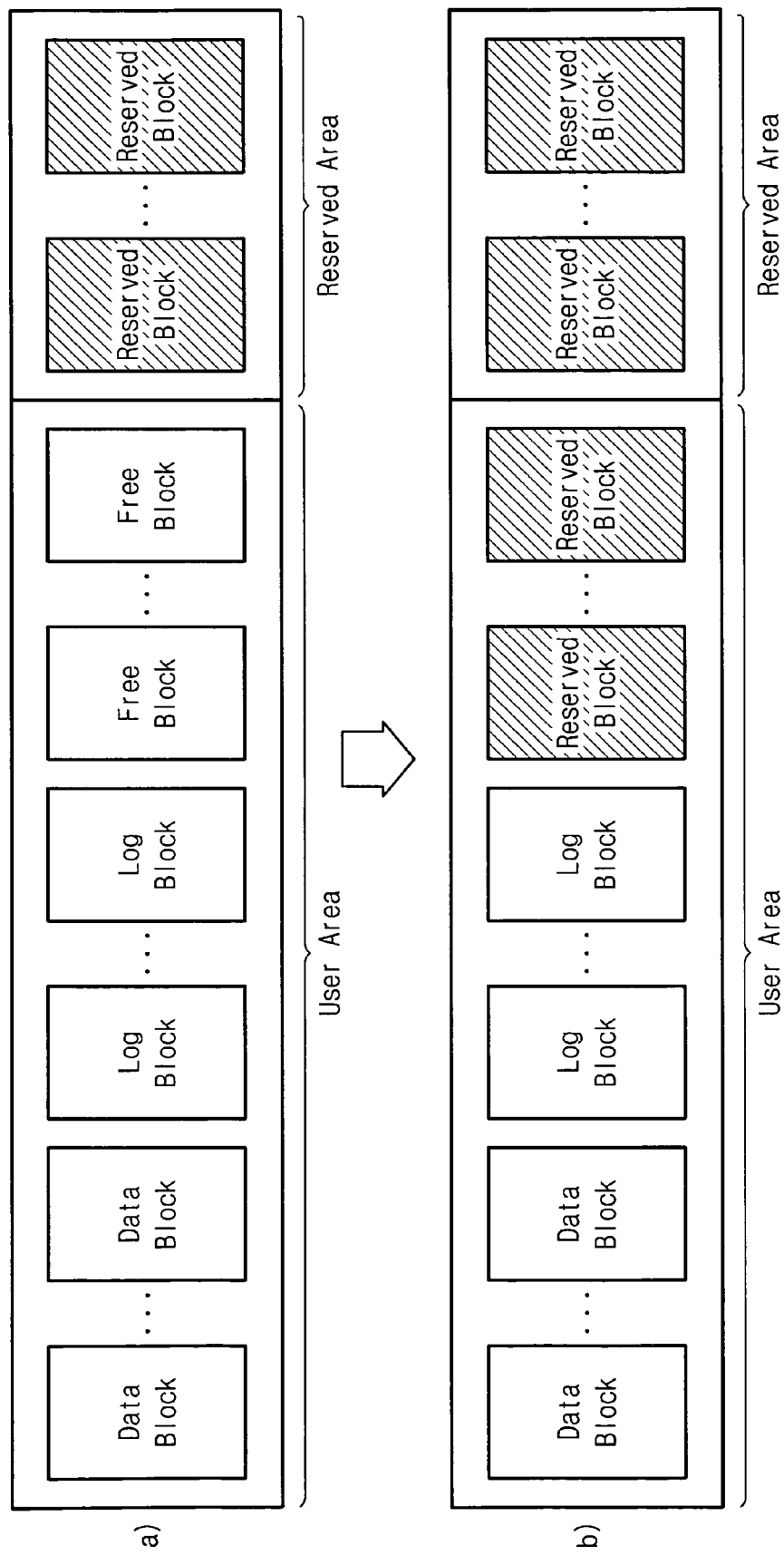
FIG. 39 is a view illustrating a method of obtaining a reserved area according to a further embodiment.

FIG. 39 is a view illustrating a method of reformatting according to another embodiment. As mentioned above, the reserved area is not recognized by an OS (or, a user). Accordingly, as some memory blocks in the user area are changed into reserved blocks, this is recognized by a user because a capacity of the user area is decreased. In order to resolve this limitation, in this embodiment, memory blocks in the user area, used as reserved blocks, are indicated to the OS (e.g., at the host) as bad blocks. Since the memory blocks indicated as the bad blocks are recognized by the OS, the capacity of a user area is not decreased. In particular, a new indicator is used in the FTL 3210 to indicate a hybrid state. The hybrid state results in the OS or host 3110 recognizing the block as a bad block, but the memory controller 3120 recognizes the block as an available reserved block.

Referring to FIG. 39(a), it is assumed that all reserved blocks in a reserved area are bad blocks. The reserved block may be a bad block because of being replaced with a bad block in a user area or its own defects. If all the reserved blocks are bad blocks, the flash memory may not be able to deal with a write request (e.g., from a host). Accordingly, in this embodiment, a memory block in the user area is used as a reserved block. Especially, a memory block that does not store data or stores invalid data (and becomes erased) is used as a reserved block by being set to the hybrid state. Also, partially invalid blocks may be converted to free blocks and used as reserved blocks by being set to the hybrid state.

Referring to FIG. 39(b), it is shown that some memory blocks in a user area are changed into reserved blocks via the hybrid state. In this embodiment, memory blocks diverted into reserved blocks are set as bad blocks with respect to the host or OS. Since reserved blocks in the user area are indicated as bad blocks, the capacity of the user area is not decreased from the viewpoint of the host or OS. These hybrid state reserved block may be used to replace a memory block in a user area. In this embodiment, although a free block is changed into a reserved block, the embodiments are not limited thereto. For example, a data block or a log block may be changed into a reserved block.

Figure 40:
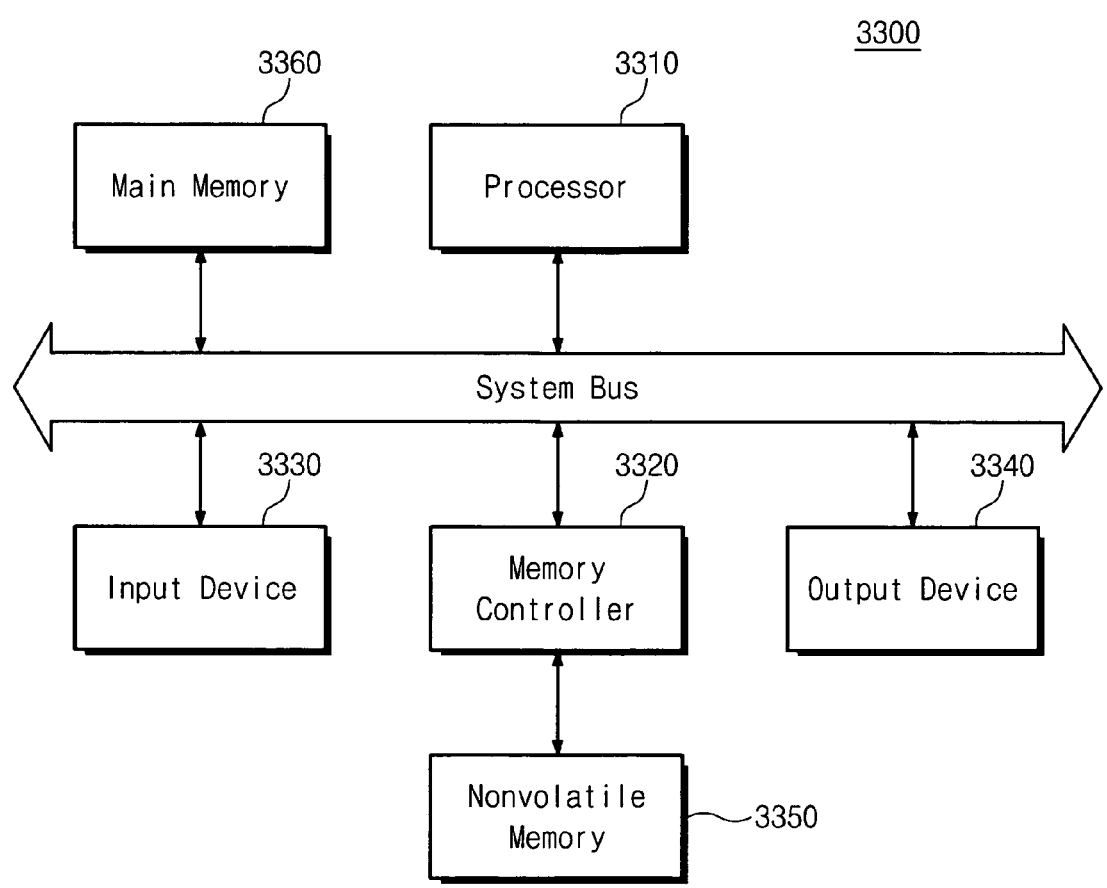
FIG. 40 is a block diagram illustrating a computing system including a flash memory according to an embodiment.

FIG. 40 is a block diagram illustrating a computing system 3300 including a flash memory according to an embodiment. Referring to FIG. 40, the computing system 3300 includes a processor 3310, a memory controller 3320, an input device 3330, an output device 3340, a non-volatile memory 3350, and a main memory 3360. The solid line in the drawing represents a system bus through which data or commands are transmitted.

The memory controller 3320 and the non-volatile memory 3350 may constitute a memory card. Additionally, the processor 3310, the input device 3330, the output device 3340, and the main memory 3360 may constitute a host using the memory card as a memory device. The computing system 3300 receives data from the external through the input device 3330 (e.g., a keyboard, or a camera). The inputted data may be commands by a user or multi-media data such as image data by a camera.

The processing result by the processor 3310 is stored in the non-volatile memory 3350 or the main memory 3360. The output device 3340 outputs data stored in the non-volatile memory 3350 or the main memory 3360. The output device 3340 outputs digital data in a form that human can recognize. For example, the output device 3340 includes a display or a speaker. The reserved block obtaining method according to one of the above described embodiments will be applied to the non-volatile memory 3350. As the reliability and life cycle of the non-volatile memory 3350 are improved, the reliability and life cycle of the computing system 3300 will be improved in proportion. While not shown, the status checking module of FIGS. 1-10 may be connected to the system bus or included in the memory controller 3320.

The non-volatile memory 3350 and/or the memory controller 3320 may be mounted through various kinds of packages. For example, the non-volatile memory 3350 and/or the controller 3320 may be mounted through various packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP).

Although not illustrated in the drawing, it is apparent to those skilled in the art that a power supply is required in order to supply power necessary for operating the computing system 3300. Additionally, if the computing system 3300 is a mobile device, a battery is additionally required to supply an operating voltage of the computing system 3300.

Figure 41:
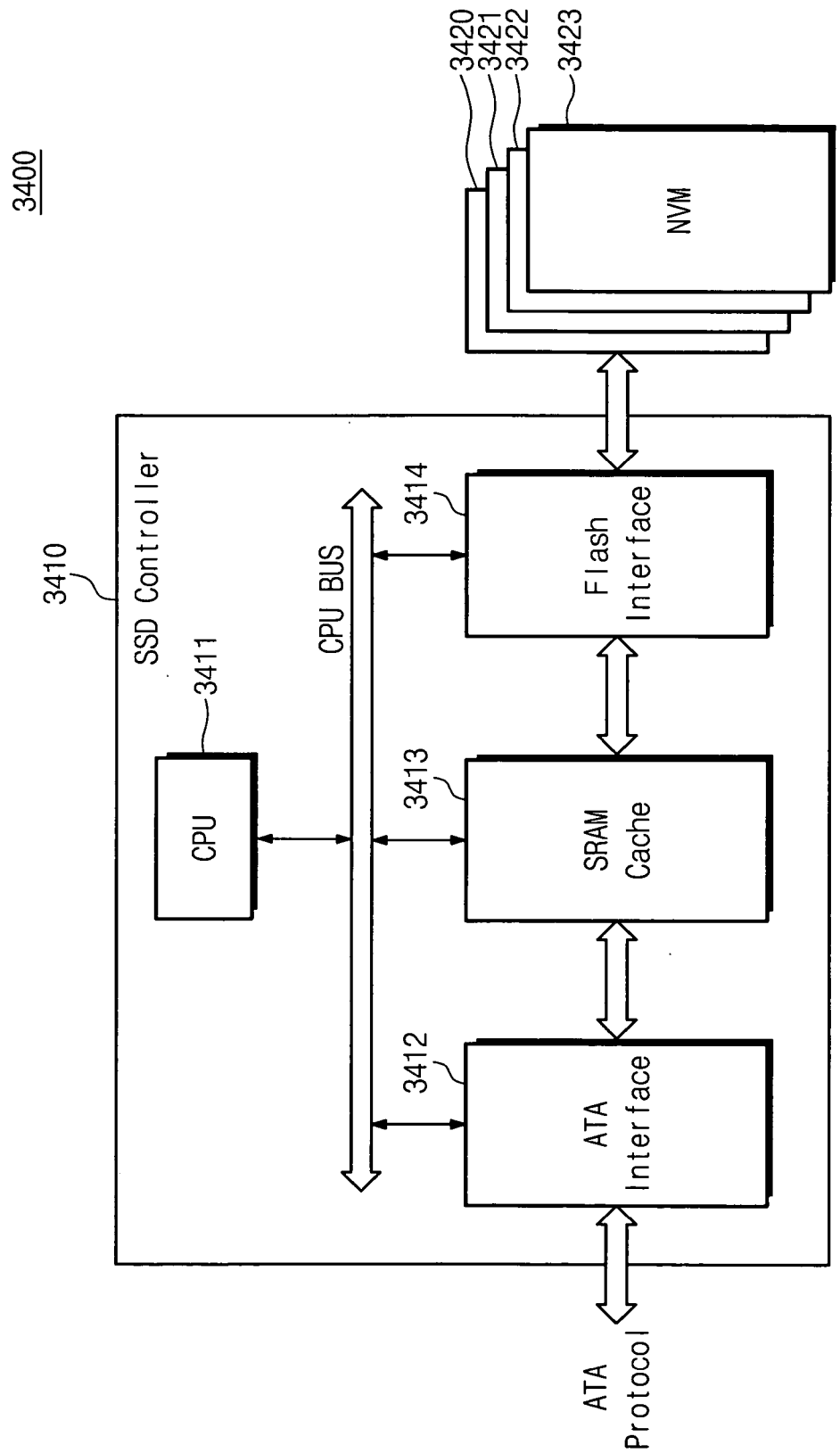
FIG. 41 is a block diagram illustrating a structure of a SSD system according to an embodiment.

FIG. 41 is a block diagram illustrating a structure of SSD system according to a further embodiment. Referring to FIG. 41, the SSD system 3400 includes SSD controller 3410 and flash memories 3420 to 3423. While four flash memories 3420 to 3423 are shown, it will be understood that the SSD system may include more or less than four flash memories.

The semiconductor memory system can be applied to a SSD. SSD products that are expected to replace HDD products in the market for next generation memory products are receiving much attention. The SSD is a data storage device using memory chips such as a flash memory to store data instead of a rotational disk of HDD. The SSD has advantages such as a fast access speed, strong resistance for external impact, and low power consumption, compared to the HDD.

Referring to FIG. 41, the CPU 3411 receives a command from a host and controls and determines whether to store data from the host in the flash memory or read the stored data of the flash memory to transmit them to the host. An ATA interface 3412 exchanges data with the host according to a control of CPU 3411. The ATA interface 3412 fetches a command and an address from the host and then transmits them to the CPU 3411 through a CPU bus. The data, which are inputted from the host or will be transmitted to the host through the ATA interface 3412, are transmitted through the SRAM cache 3413 not the CPU bus according to a control of the CPU 3411.

The SRAM cache 3413 temporarily stores transmission data between the host and the flash memories 3420 to 3423. Additionally, the SRAM cache 3413 may be used for storing a program that will be executed by the CPU 3411. For example, the SRAM cache 3413 may load code data from one or more of the flash memories 3420-3423, and the code data instructs the CPU 3411 on the management of the SSD. The SRAM cache 3413 may be regarded as a kind of a buffer memory, and may not be constituted by only the SRAM. A flash interface 3414 exchanges data (e.g., read and write) with non-volatile memories 3420 to 3423 used as a storage device. The flash interface 3414 may be configured to support a NAND flash memory, an One-NAND flash memory, or a multi-level flash memory. The reserved block obtaining method may be applied to the flash memory by the SSD controller 3410. Also, the flash memories 3420-3423 may be divided into a number of channels, and each memory may be independently controlled by the controller 3410. For example, each channel may include one memory. However, each channel is not limited to including one memory. Accordingly, the read and write operations occur through the plurality of channels, and the reserved blocks may be distributed across the plurality of memories 3420-3423; and therefore, distributed across the plurality of channels. This channel structure may be applied to any of the above described inventive concepts of this embodiment as well as the other embodiments. The SSD controller 3410 may include a status checking module such as discussed with respect to FIGS. 1-10 connected to the CPU bus. The semiconductor memory system may be used as a mobile storage device. Accordingly, the semiconductor memory system may be used as a storage device of MP3, a digital camera, PDA, e-Book, etc. Additionally, the semiconductor memory system can be used as a storage device of a digital TV and a computer.

As described above referring to FIG. 33 to FIG. 41, the fourth embodiment according to inventive concepts of the present invention provides a function of converting a user block into a reserved block when reserved blocks are consumed. Thus, a performance in dealing with a occurrence of a bad block is maintained. That is, reliabilities of a nonvolatile memory device, a memory system including a nonvolatile memory device and a computing system including a memory system having a nonvolatile memory device are advanced.

Accelerated Booting

Hereinafter, a computing system according to a fifth embodiment of inventive concepts of the present invention will now be described referring to FIG. 42 to FIG. 54. The fifth embodiment of inventive concepts of the present invention provides a storage device for storing a boot image and loading a boot image into an operating memory of a computing system during a power-on self test (POST).

Figure 42:
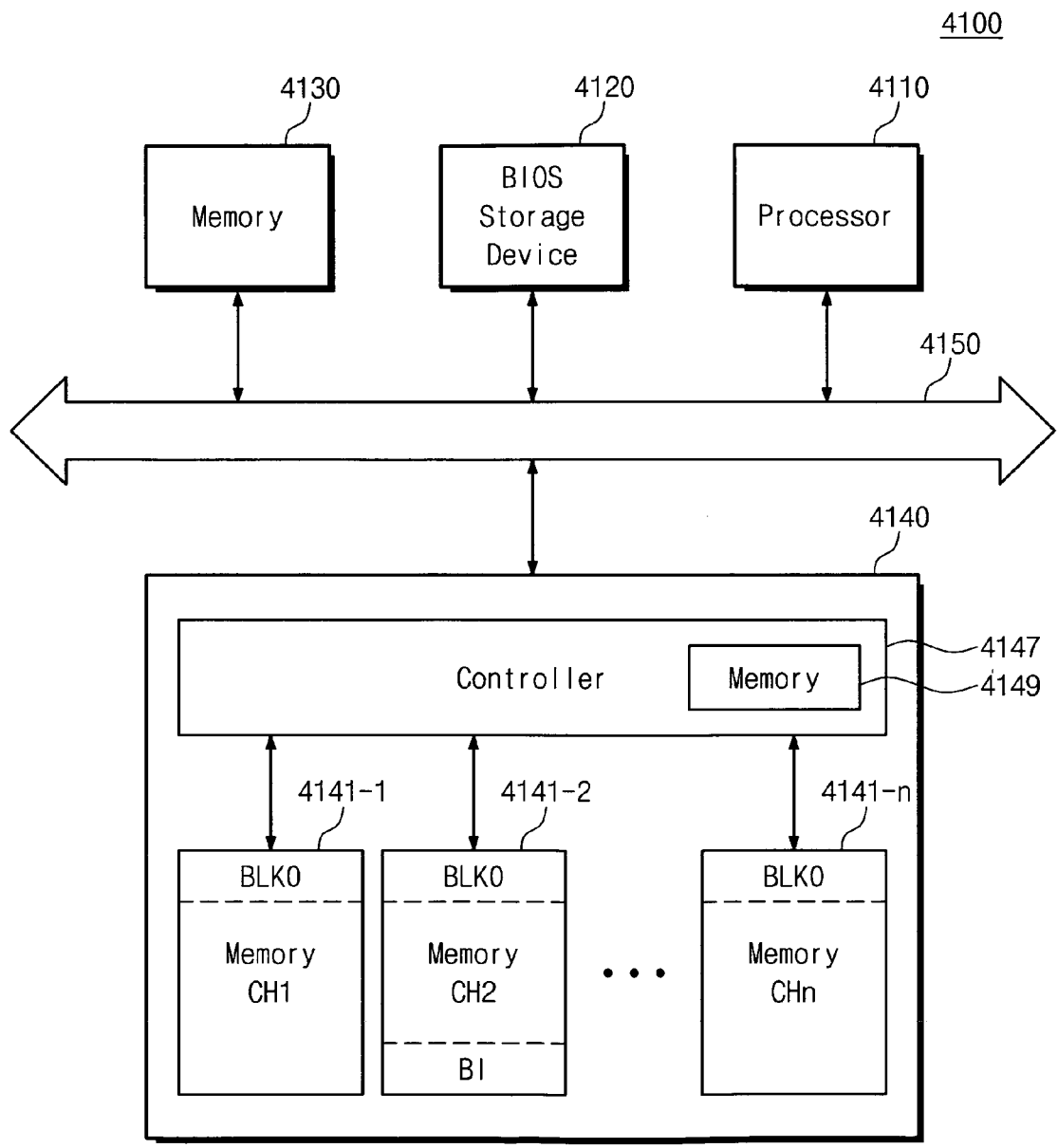
FIG. 42 is a block diagram illustrating a computing system according to a fifth embodiment of inventive concepts of the present invention.

FIG. 42 is a block diagram illustrating a computing system 4100 according to the fifth embodiment of inventive concepts of the present invention. Referring to FIG. 42, the computing system 4100 includes a processor 4110, a BIOS storage device 4120, a memory 4130, a storage device 4140, and a system bus 4150.

The processor 4110 is connected to the system bus 4110. The processor 4110 performs an operation on data transmitted through the system bus 4150. The processor 4110 executes a command delivered through the system bus 4150.

The BIOS storage device 4120 stores BIOS. The BIOS storage device 4120 is connected to the system bus 4150. Once power is supplied to the computing system, the BIOS initializes the computing system 4100 and performs booting. The initialization operation that the BIOS performs includes POST. The POST initializes components of the computing system 4100 such as the memory 4130, the storage device 4140, and a graphic device (not shown) and determines abnormalities.

For example, the BIOS storage device 4120 may include non-volatile memory devices such as ROM, PROM, EPROM, EEPROM, a flash memory device, PRAM, MRAM, RRAM, and FRAM. For example, the BIOS may operate after being loaded from the BIOS storage device 4120 to the memory 4130.

The memory 4130 is connected to the system bus 4150. The memory 4130 may be an operating memory of the computing system 4100. For example, the memory 4130 may include a volatile memory device such as SRAM, DRAM, and SDRAM.

The storage device 4140 is connected to the system bus 4150. For example, the storage device 4140 exchanges data with the system bus 4150 through various protocols such as USB, MMC, PCI-E, Advanced Technology Attachment (ATA), Serial-ATA, Parallel-ATA, SCSI, ESDI, and Integrated Drive Electronics (IDE).

The storage device 4140 is a non-volatile storage device for maintaining data even when power supply is cut off. For example, the storage device 4140 is SSD for storing data in a non-volatile memory device such as ROM, PROM, EPROM, EEPROM, a flash memory device, PRAM, MRAM, RRAM, and FRAM.

The storage device 4140 includes memories 4141-1 to 4141-n and a controller 4147. The memories 4141-1 to 4141-n are divided into the n number of channels, and each memory is independently controlled by the controller 4147. In FIG. 42, each channel includes one memory. However, each channel is not limited to include one memory. For example, each channel of the storage device 4140 can include at least one memory. Hereinafter, memories connected to each channel and each of the channels will refer to the same reference numbers 4141-1 to 4141-n.

In FIG. 42, the storage device 4140 includes the n number of channels 4141-1 to 4141-n. However, the storage device 4140 is not limited to include the n number of channels 4141-1 to 4141-n. For example, the storage device 140 can include at least one channel.

Each of the channels includes a plurality of blocks. A zeroth block BLK0 among blocks of each channel will be allocated for a specific purpose. For example, the zeroth blocks of the channels 4141-1 to 4141-n will be allocated to store codes for operating the storage device 4140. The allocation means the zeroth blocks are used with a characteristic and its meaning will be the same below.

Figure 44:
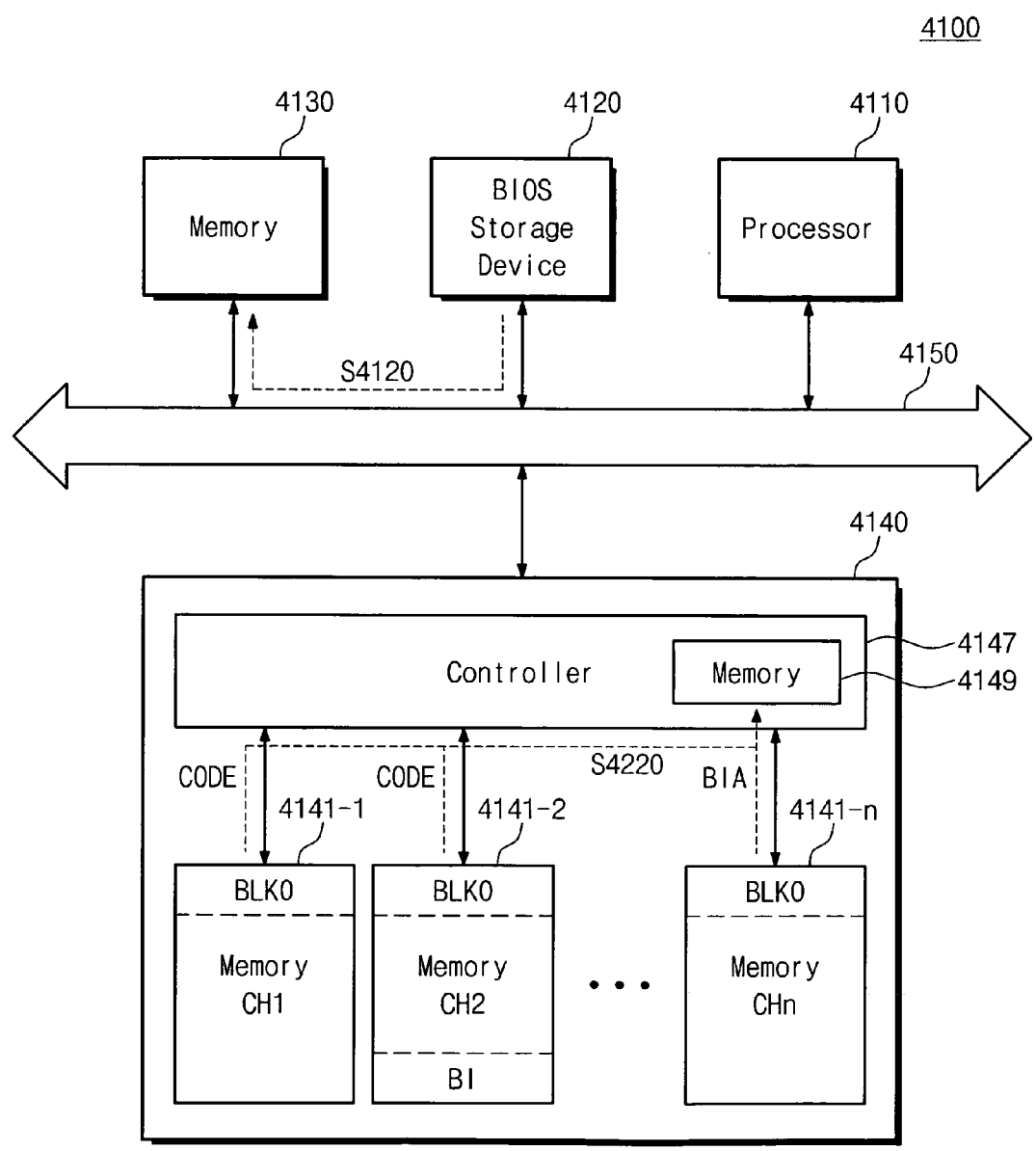
FIGS. 44 to 46 are block diagrams illustrating how the process of FIG. 43 is performed in the computing system of FIG. 42.

The storage device 4140 may store a boot image BI. The boot image BI may include codes that are required for operating the OS. That is, after the boot image BI is loaded into the memory 4130 and then is executed by the processor 4110, the OS will start. In FIG. 44, the boot image BI is stored in the channel 4141-2. However, it is apparent that an area where the boot image BI is stored is not limited to the channel 4141-2.

An address corresponding to an area where the boot image BI is stored will be stored in a reserved area of the storage device 4140. For example, some of the zeroth blocks BLK0 of the channels 4141-1 to 4141-n are allocated to store codes for operating the storage device 4140, and other zeroth blocks BLK0 will be allocated to store an address corresponding to an area where the boot image BI is stored. For example, if the memories 4141-1 to 4141-n of the storage device 4140 includes a flash memory device, the address stored in some of the zeroth blocks BLK0 of the channels 141 to 145 may be a logical block address corresponding to an area where the boot image BI is stored. More generally speaking, the zeroth blocks are examples of most robust blocks, which are blocks manufactured to have the least likelihood of defects. Accordingly, the boot image address may be stored in a most robust block other than a zeroth block.

Hereinafter, for concise description, an address corresponding to an area where the boot image BI is stored is called a boot image address (or, BIA). Additionally, it is assumed that the memories 4141-1 to 4141-n of the storage device 4140 are flash memories. That is, it is assumed that the storage device 4140 is SSD including a flash memory. At this point, the BIA may be a logical block address (or, LBA) corresponding to an area where the boot image BI is stored.

However, it is apparent that the memories 4141-1 to 4141-n of the storage device 4140 are not limited to the flash memory. Additionally, it is apparent that the storage device 4140 is not limited to a semiconductor disk device including a flash memory. For example, the storage device 4140 may be a semiconductor disk device including a non-volatile memory device such as ROM, PROM, EPROM, EEPROM, a flash memory device, PRAM, MRAM, RRAM, and FRAM.

Hereinafter, for concise description, codes that are stored in the zeroth blocks BLK0 of the channels 4141-1 to 4141-n and are used for operating the storage device 4140 are called as a storage device code.

The controller 4147 includes a buffer memory 4149. For example, the buffer memory 4149 is divided into two areas. For example, a first area of the buffer memory 4149 is a code memory. That is, the first area of the buffer memory 4149 is allocated for storing and operating the storage device code. For example, a second area of the buffer memory 4149 is a data memory. That is, the second area of the buffer memory 4149 is allocated for storing data exchanged between the storage device 4140 and the system bus 4150.

For example, the first area of the buffer memory 4149 has a speed different from the second area. For example, an operating speed of the first area in the buffer memory 4149 may be faster than that of the second area or vice versa. For example, the first area of the buffer memory 4149 includes SRAM and the second area of the buffer memory 4149 includes DRAM or SDRAM.

Figure 43:
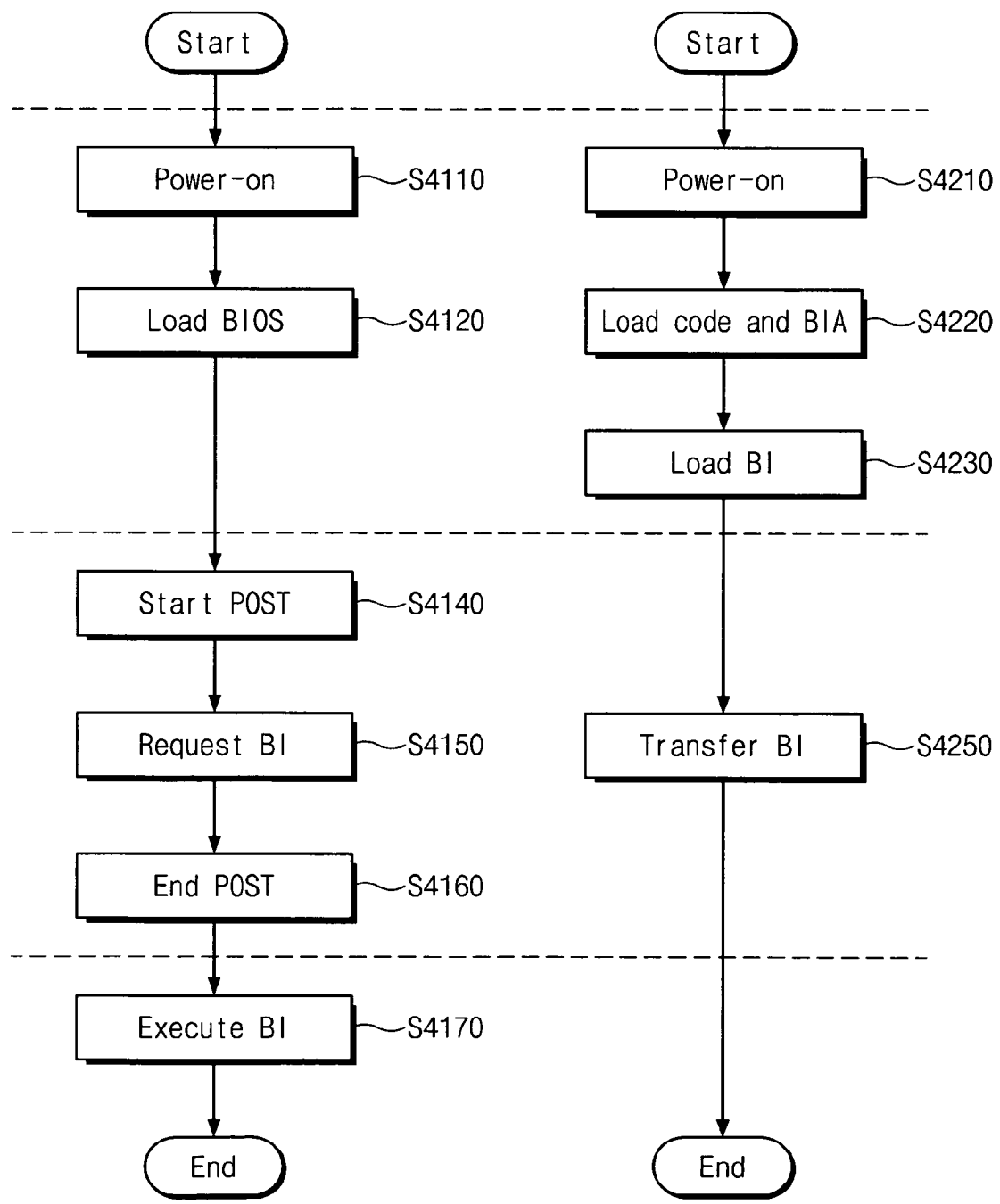
FIG. 43 is a flowchart illustrating an operation of the computing system of FIG. 42.

FIG. 43 is a flowchart illustrating an operation of the computing system 4100 of FIG. 42. In FIG. 43, the left position of the flowchart illustrates operations of the processor 4110, the BIOS storage device 4120, and the memory 4130. That is, the flowchart including operations S4110 to S4170 represents operations of the processor 4110, the BIOS storage device 4120, and the memory 4130. In FIG. 43, the right position of the flowchart represents an operation of the storage device 4140. That is, the flowchart including operations S4210 to S4250 represents an operation of the storage device 4140. Accordingly, the flowchart including operations S4110 to S4170 and operations S4210 to S4250 represents an operation of the computing system 4100.

Figure 45:
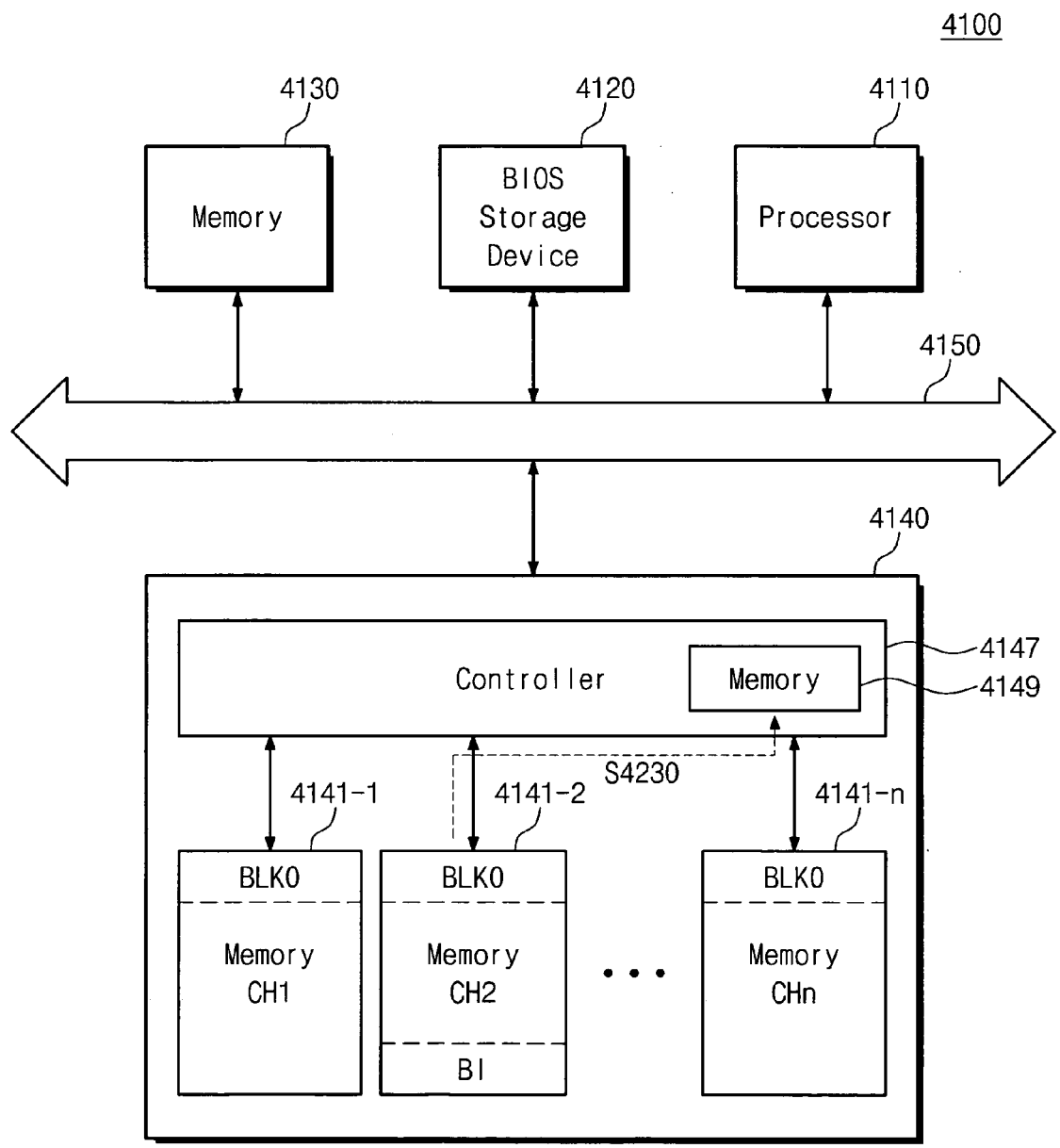
Figure 46:
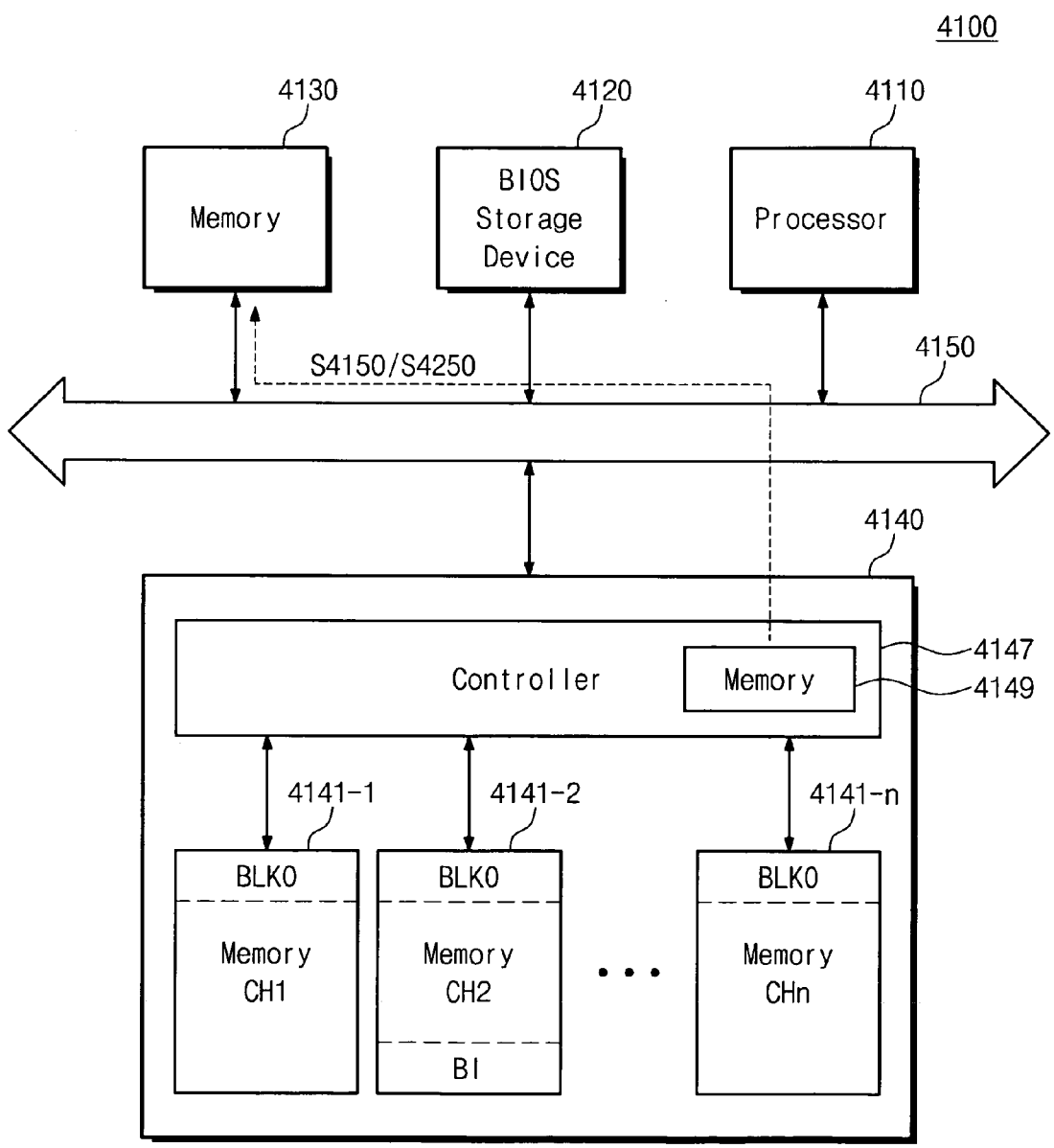

FIGS. 44 to 46 are block diagrams illustrating how the processes of FIG. 42 is performed in the computing system of FIG. 42. In FIGS. 44 to 46, the dotted line represents data transmission.

Referring to FIG. 43, in operations S4110 and S4210, power is supplied to the computing system 4100. Then, power is supplied to the processor 4110, the BIOS storage device 4120, the memory 4130, and the storage device 4140.

Referring to FIGS. 43 and 44, in operation S4120, the BIOS stored in the BIOS storage device 4120 is loaded into the memory 4130, and in operation S4220, data stored in the zeroth blocks BLK0 of the memories 4141-1 to 4141-n in the storage device 4140 are loaded into the buffer memory 4149 of the controller 4147. For example, a storage device code is loaded from the zeroth blocks BLK0 of the memories 414-1 and 4141-2, and BIA is loaded from the zeroth block BLK0 of the memory 4141-n. For example, the storage device code and the BIA are loaded into the first area of the buffer memory 4149, that is, the code memory.

Referring to FIGS. 43 and 45, in operation S4230, BI stored in the memory 4141-2 is loaded into the buffer memory 4149. For example, the BI is loaded into the second area of the buffer memory 4149, that is, the data memory.

The loading of the BI will be performed by firmware of the storage device 4140. For example, in operation S4220, the storage device code loaded in the buffer memory 4149 performs the firmware function of the storage device 4140. That is, in operation S4220, the storage device code and the BIA are loaded into the buffer memory. In operation S4230, the storage device codes loads the BI into the buffer memory 4149 through the BIA.

Operation S4120 is accompanied with power-on of operation S4110 and operations S4220 and S4230 are accompanied with the power-on of operation S4210. That is, as well known to those skilled in the art, operation S4120, operation S4220, and operation S4230 are performed like power-on reset or power-on read when power is applied. In FIG. 43, operation S4110 and operation S4120 are separated and operation S4210, operation S4220, and operation S4230 are separated, but it is apparent that operations S4110, S4120, and S4210 to S4230 constitute a power-on operation. That is, during a power-on operation, the BIOS is loaded from the BIOS storage device 4120 into the memory 4130. Additionally, during the power-on operation, the storage device code and the BIA are loaded from the memories 4141-1 to 4141-n into the buffer memory 4149, and the BI is loaded from the memories 4141-1 to 4141-n into the buffer memory 4149.

Referring to FIG. 43 again, in operation S4140, the POST starts. The POST will be controlled by the BIOS. During the POST, the BIOS initializes components constituting the computing system 4100 such as the memory 4130, the storage device 4140, and a graphic device (not shown) and also determines their abnormalities.

Referring to FIGS. 43 and 46, once the initialization of the memory 4130 and the storage device 4140 is completed, the memory 4130 and the storage device 4140 are in a standby status. When the memory 4130 and the storage device 4140 are in the standby status, the BIOS requests the BI from the storage device 4140. The storage device 4140 transmits the BI, and the transmitted BI is loaded into the memory 4130 through the system bus 4150. While the BI is loaded from the storage device 4140 to the memory 4130, the BIOS requests other components other than the memory 4130 and the storage device 4140 to perform the POST. That is, while the POST is performed on the components except for the memory 4130 and the storage device 4140, the BI is loaded into the memory 4130. Therefore, a booting time can be reduced.

The BI is loaded into the buffer memory 4149 of the storage device 4140 during the power-on operation. A time for loading the BI from the memories 4141-1 to 4141-n of the storage device 4140 to the memory 4130 is shorter than a time for loading the BI from the buffer memory 4149 of the storage device 4140 to the memory 4130. Accordingly, a booting time can be reduced.

Hereinafter, a method of loading the POST and the BI by the BIOS will be described. The BIOS performs the POST on the memory 4130 and the storage device 4140 first rather than other components. Once the POST of the memory 4130 and the storage device 4140 is completed, the BIOS receives a response that the POST of the memory 4130 and the storage device 4140 are completed.

Once the POST response of the memory 4130 and the storage device 4140 is received, the BIOS delivers a POST request to at least one among other components (for example, a graphic device, a sound device, etc.) constituting the computing system 4100. For example, the BIOS delivers the POST request to all the remaining components except for a device (for example, ODD, HDD or SSD, which is not set for a booting drive) sharing a bus (for example, an S-ATA bus) with the storage device 4140. The bus connects the storage device 4140 with the system bus 4150.

After the POST request is delivered to all the remaining components, the BIOS requests the BI of the storage device 4140. In response to the request from the BIOS, the BI is loaded from the storage device 4140 to the memory 4130 through the system bus 4150.

While the BI is loaded from the storage device 4140 to the memory 4130, components where the POST is completed transmits the POST responses. The BIOS stores the POST responses from the components in a designated storage area (for example, an interrupt variable). Once the loading of the BI is completed, the BIOS performs an operation according to the POST responses received from the components.

Once the loading of the BI is completed, the storage device 4140 transmits a response that the loading is completed. For example, the response that the loading of the BI is completed is an interrupt. The BIOS delivers the POST request to the components sharing a bus with the storage device 140 in response to the interrupt from the storage device 4140.

In the above embodiment's description, the BIOS performs the POST on peripheral devices after the POST for the memory 4130 and the storage device 4140 is completed. However, the technical scope is not limited to the performing of the POST operation on the peripheral devices after the POST is performed on the memory 4130 and the storage device 4140. It is understood that the BIOS performs the POST on components that are required for loading the BI from the storage device 4140 to the memory 4130, requests the POST for peripheral devices, and loads the BI.

In brief, the BIOS requests the BI after receiving the POST request on a plurality of components of the computing system 4100. While the BI is loaded, the BIOS stores the POST response from the components and does not perform an operation in response to the POST response. Once the loading of the BI is completed, the BIOS performs an operation according to the stored POST response. Accordingly, the BI will be loaded to the memory 4130 without errors according to the POST response, and the POST is performed while the BI is loaded. That is, a booting time can be reduced.

Operations S4140 to S4160 and S4250 represent the POST of the computing system 4100. Once the POST is completed, the BI loaded in the memory 4130 is performed in operation S4170. Once the BI (e.g., the OS) is performed, OS is executed to allow the computing system 4100 to be in a standby status.

In brief, the computing system 4100 according to this embodiment transmits data (i.e., the BI) stored in the storage device 4140 through the system bus 4150 during the POST. The computing system 4100 includes the storage device 4140 for storing the BI, and the BIOS storage device 4120 for performing the POST and loading the BI to the memory 4130 during the POST. The storage device 4140 includes the buffer memory 4149, the memories 4141-1 to 4141-n for storing the BI, and the controller 4147 for controlling the memories 4141-1 to 4141-n. The controller 4147 loads the BI to the buffer memory 4149 during a power-on operation. Accordingly, a booting time can be reduced.

Figure 47:
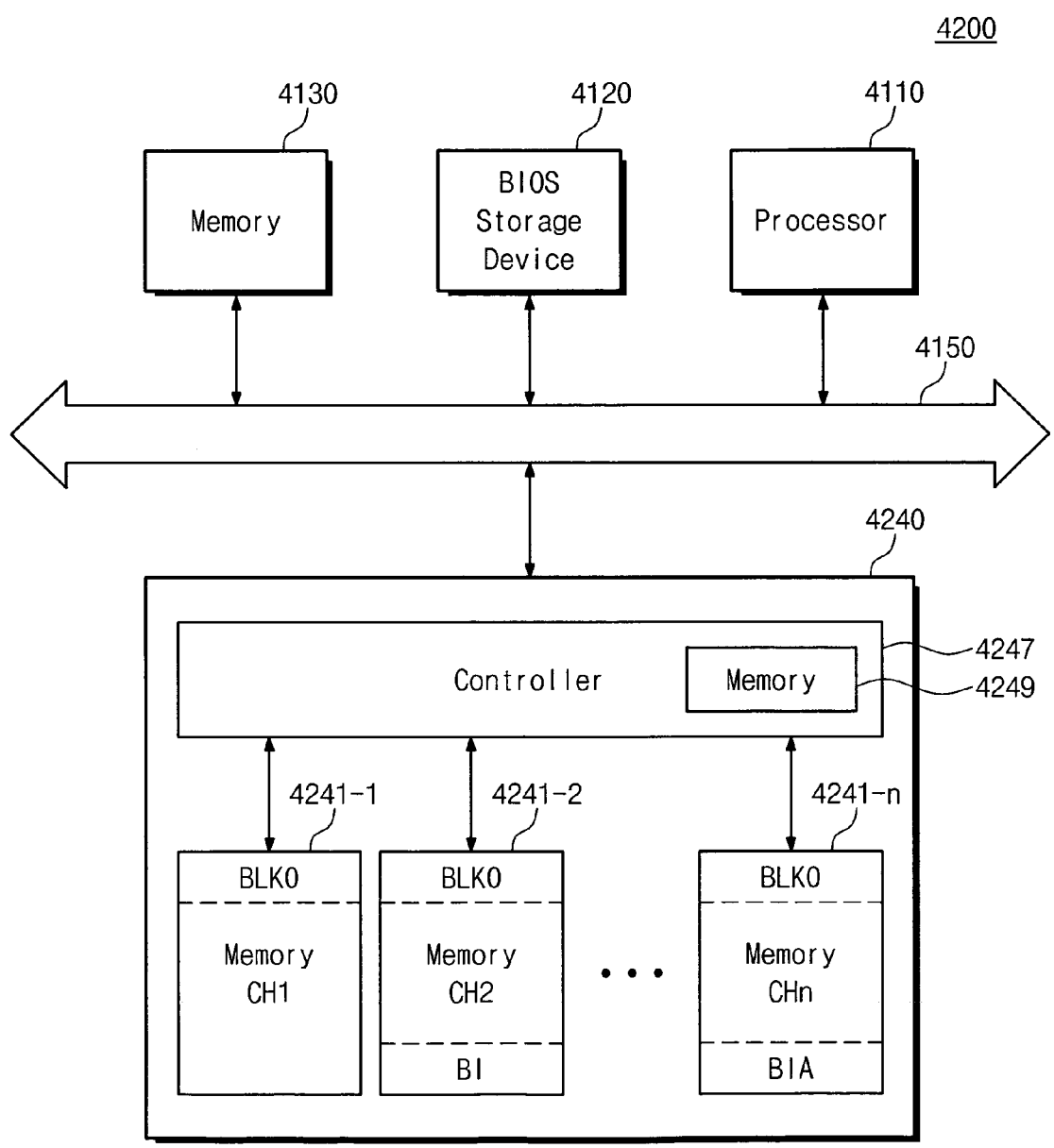
FIG. 47 is a block diagram illustrating a computing system according to another embodiment.

FIG. 47 is a block diagram illustrating a computing system 4200 according to another embodiment. In FIGS. 42 and 47, like reference numerals refer to like elements. Referring to FIG. 47, the computing system 4200 includes a processor 4110, a BIOS storage device 4120, a memory 4130, a storage device 4240, and a system bus 4150. The processor 4110, the BIOS storage device 4120, the memory 4130, and the system bus 4150 are the same as those described with reference to FIGS. 42 to 46. Accordingly, their detailed description will be omitted.

The storage device 4240 includes memories 4241-1 to 4241-n and a controller 4247. The memories 4241-1 to 4241-n have the same configuration as those 4141-1 to 4141-n described with reference to FIGS. 42 to 46. That is, the memories 4241-1 to 4241-n are divided into the n number of channels. Each channel includes at least one memory. The memories 4241-1 to 4241-n are formed of a non-volatile memory such as ROM, PROM, EPROM, EEPROM, a flash memory device, PRAM, MRAM, RRAM, and FRAM. That is, the storage device 4240 may be SSD including a non-volatile memory.

The controller 4247 has the same configuration as the controller 4147 described with reference to FIGS. 42 to 46. Accordingly, detailed description for the controller 4247 will be omitted.

The zeroth blocks BLK0 of the channels 4241-1 to 4241-n store a storage device code. The memories 4241-1 to 4241-n store BI. In FIG. 47, the BI is stored in the memory 4241-2. However, it is apparent that an area where the BI is stored is not limited to the memory 4241-2. The memory 4241-n stores the BIA.

In the embodiment described with reference to FIGS. 42 to 46, the BIA is stored in the zeroth blocks BLK of the channels 4141-1 to 4141-n. In this embodiment, the BIA is stored in a reserved area. The reserved area is a storage area that is allocated for storing the BIA.

In FIG. 47, the BIA is stored in the memory 4241-n. However, an area where the BIA is stored is not limited to the memory 4241-n. The area where the BIA is stored is one of the memories 4241-1 to 4241-n, and its area is allocated for only storing the BIA. For example, the area where the BIA is stored cannot be accessed by a user.

During a power-on operation, the storage device code and the BIA are loaded into the buffer memory 4249. The storage device code is stored in the zeroth blocks BLK of the memories 4241-1 to 4241-n, and the BIA is stored in an allocated reserved area. That is, since areas where the storage device code and the BIA are stored are already known, it is possible to load them to the buffer memory 4249 during a power-on operation.

The storage device code loads the BI to the buffer memory 4249 through the BIA. Hereinafter, as described above with reference to FIGS. 42 to 45, the POST is performed and the BI is loaded into the memory 4130 during the POST. With respect to the above overlapping description, the detailed description herein will be omitted.

Figure 48:
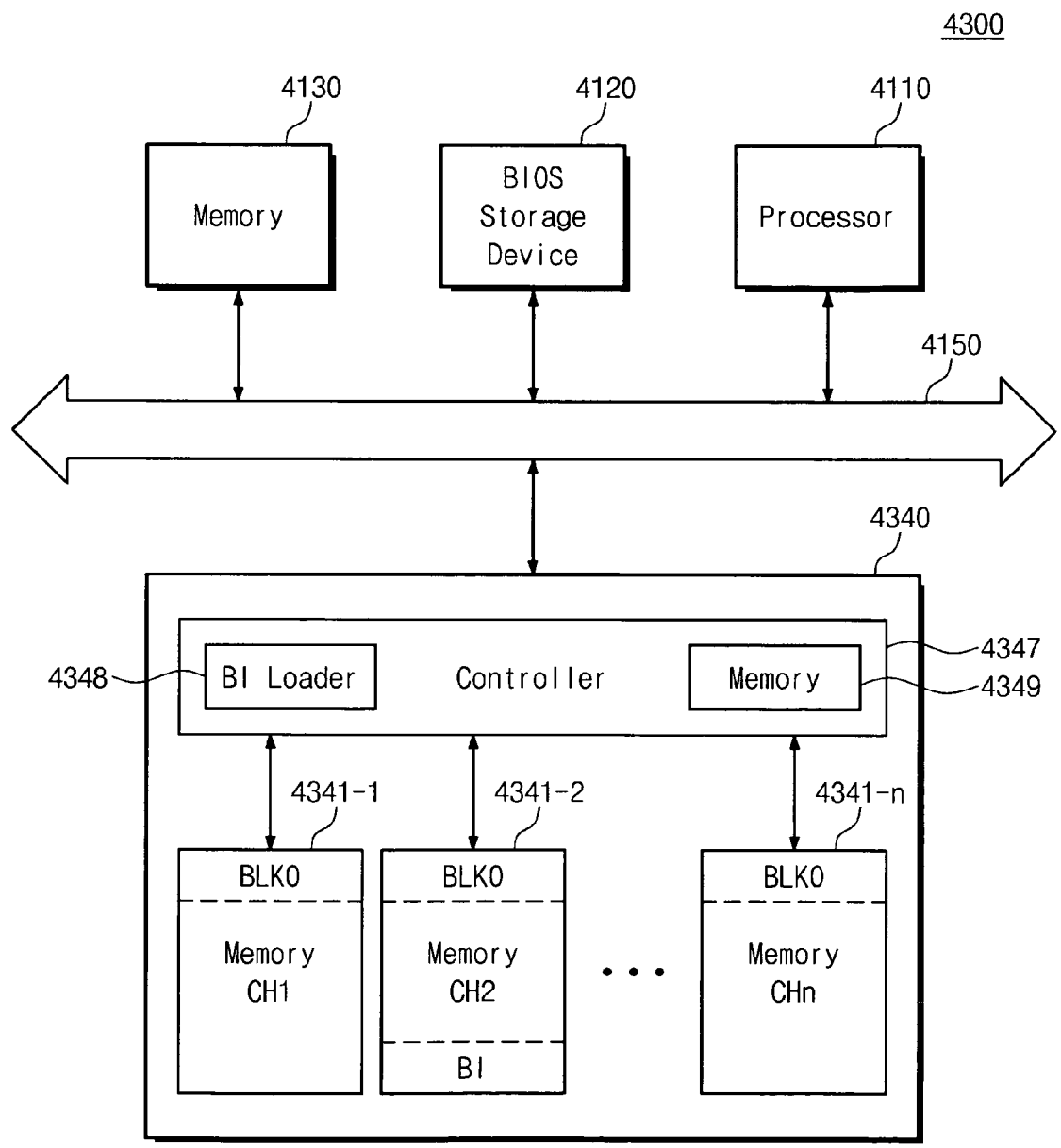
FIG. 48 is a block diagram illustrating a computing system according to a further embodiment.

FIG. 48 is a block diagram illustrating a computing system 4300 according to another embodiment. In FIGS. 42 to 48, like reference numerals refer to like elements. Referring to FIG. 48, the computing system 4300 of the third embodiment includes a processor 4110, a BIOS storage device 4120, a memory 4130, a storage device 4340, and a system bus 4150. The processor 4110, the BIOS storage device 4120, the memory 4130, and the system bus 4150 are the same as those described with reference to FIGS. 42 to 47. Accordingly, their detailed description will be omitted.

The storage device 4340 includes memories 4341-1 to 4341-n and a controller 4347. The memories 4341-1 to 4341-n have the same configuration as the memories 4141-1 to 4141-n and 4241-1 to 4241-n described with reference to FIGS. 42 to 47. That is, the memories 4341-1 to 4341-n are divided into the n number of channels. Each channel includes at least one memory. The memories 4341-1 to 4341-n are formed of a non-volatile memory such as ROM, PROM, EPROM, EEPROM, a flash memory device, PRAM, MRAM, RRAM, and FRAM. That is, the storage device 4340 may be SSD including a non-volatile memory.

A storage device code is stored in zeroth blocks BLK0 of the channels 4341-1 to 4341-n. The memories 4341-1 to 4341-n stores BI in a reserved area. That is, a designated storage area in the memories 4341-1 to 4341-n will be allocated to store the BI.

The controller 4347 includes a buffer memory 4349 and a boot image loader 4348. The buffer memory 4349 will have the same configuration as the buffer memory 4149 or 4249 described with reference to FIGS. 42 to 47. The boot image loader 4348 is configured to load the BI to the buffer memory 4349 without loading a BIA. Namely, the BIA is set in the boot image loader 4348.

During a power-on operation, the storage device code stored in the zeroth blocks BLK0 of the channels 4341-1 to 4341-n is loaded into the buffer memory 4349. Additionally, the BI stored in a reserved area is loaded to the buffer memory 4349 through the boot image loader 4348. For example, the boot image loader 4348 loads the BI to a second area of the buffer memory 4349, that is, a data memory. For example, the loading of the storage device code and the BI is simultaneously performed during a power on operation. For example, the boot image loader 4348 may be constituted by hardware.

Next, as described with reference to FIGS. 42 to 47, POST is performed and the BI is loaded to the memory 4330 during the POST. In order to avoid overlapping description, its detailed description will be omitted.

Figure 49:
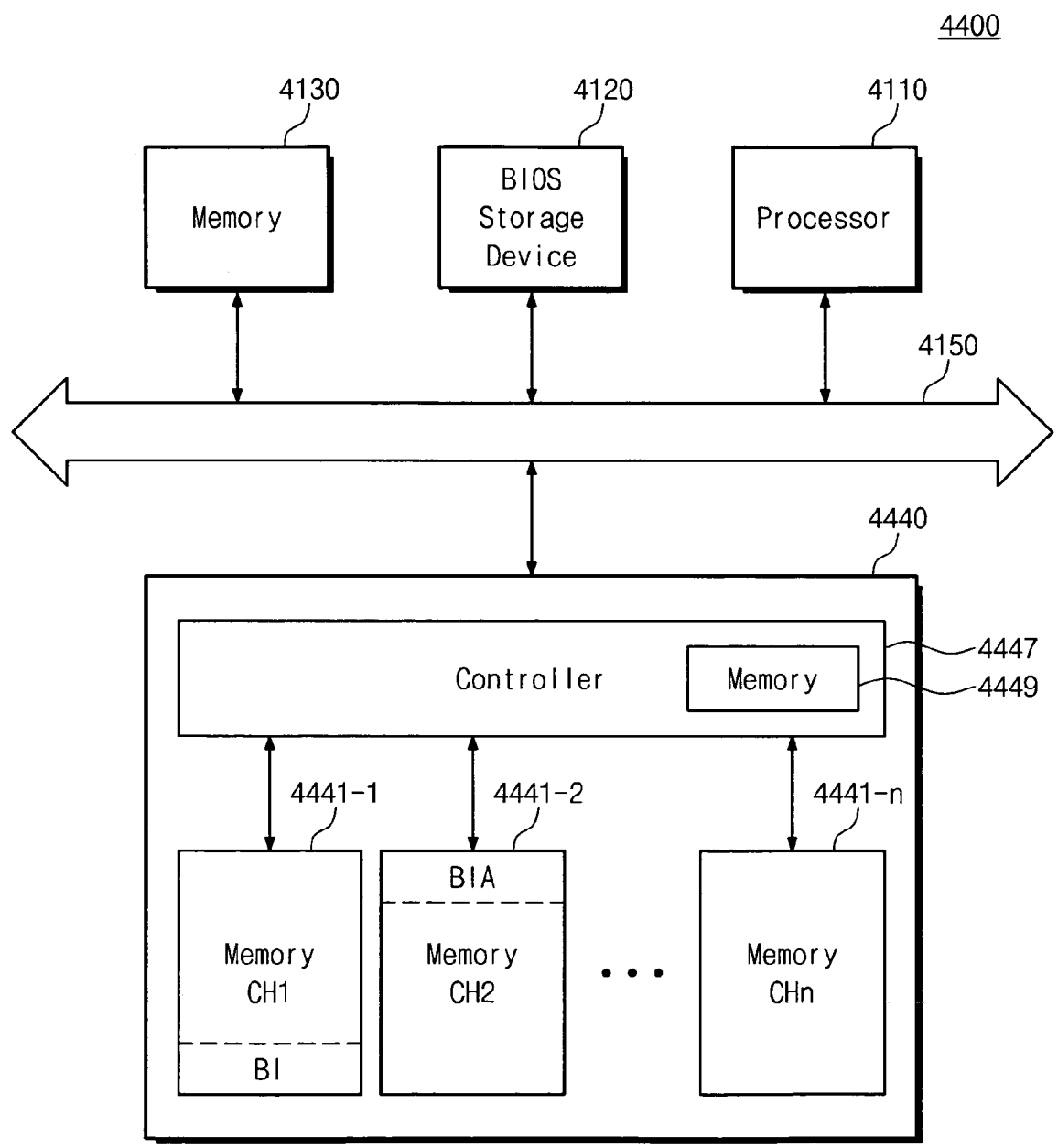
FIG. 49 is a block diagram illustrating a computing system according to a still further embodiment.

FIG. 49 is a block diagram illustrating a computing system 4400 according to a further embodiment. Referring to FIGS. 42 to 49, like reference numerals refer to like elements. Referring to FIG. 49, the computing system 4400 includes a processor 4110, a BIOS storage device 4120, a memory 4130, a storage device 4440, and a system bus 4150. The processor 4110, the memory 4130, the system bus 4150 have the same configuration as those described with reference to FIGS. 42 to 48. Accordingly, its detailed description will be omitted.

The storage device 4440 includes memories 4441-1 to 4441-n and a controller 4447. The memories 4441-1 to 4441-n have the same configuration as the memories 4141-1 to 4141-n, 4241-1 to 4241-n, and 4341-1 to 4341-n described with reference to FIGS. 42 to 46. That is, the memories 4441-1 to 4441-n are divided into the n number of channels. Each channel includes at least one memory. The memories 4441-1 to 4441-n are formed of a non-volatile memory such as ROM, PROM, EPROM, EEPROM, a flash memory device, PRAM, MRAM, RRAM, and FRAM. That is, the storage device 4440 may be SSD including a non-volatile memory.

The storage device 4440 stores BI. In the drawing, the BI is stored in the memory 4441-1. However, an area where the BI is stored is not limited to the memory 4441-1.

The storage device 4440 stores the BIA in a reserved area. An area where the BIA is stored is an allocated storage area.

The controller 4447 includes a buffer memory 4449. The buffer memory 4449 will have the same configuration as the buffer memories 4149, 4249, and 4349 described with reference to FIGS. 42 to 48. Accordingly, detailed description of the buffer memory 4449 will be omitted.

The BIOS 4120 performs POST after power is supplied. Additionally, the BI is loaded from the storage device 4440 to the memory 44304130 during the POST.

Figure 50:
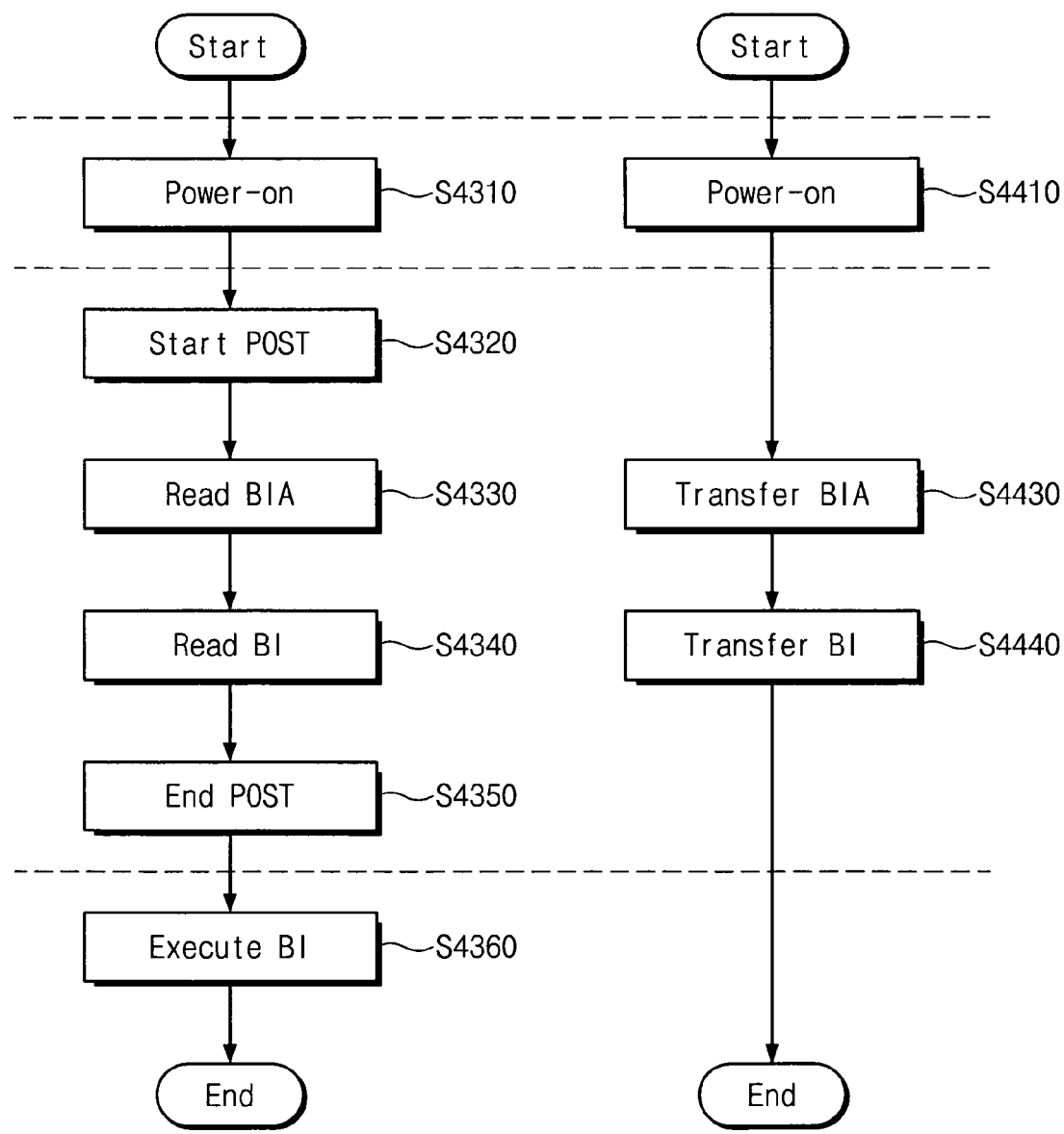
FIG. 50 is a flowchart illustrating an operation of the computing system of FIG. 49.

FIG. 50 is a flowchart illustrating an operation of the computing system 4400 of FIG. 49. In FIG. 50, the left portion of the flowchart illustrates operations of the processor 4110, the BIOS storage device 4120, and the memory 4130. That is, operations S4310 to S4360 represent operations of the processor 4110, the BIOS storage device 4140, and the memory 4130.

In FIG. 50, the right portion of the flowchart illustrates an operation of the storage device 4440. That is, operations S4410 to S4440 represent an operation of the storage device 4440. Accordingly, operations S4310 to S4360 and operations S4410 to S4440 represent operations of the computing system 4400.

Figure 51:
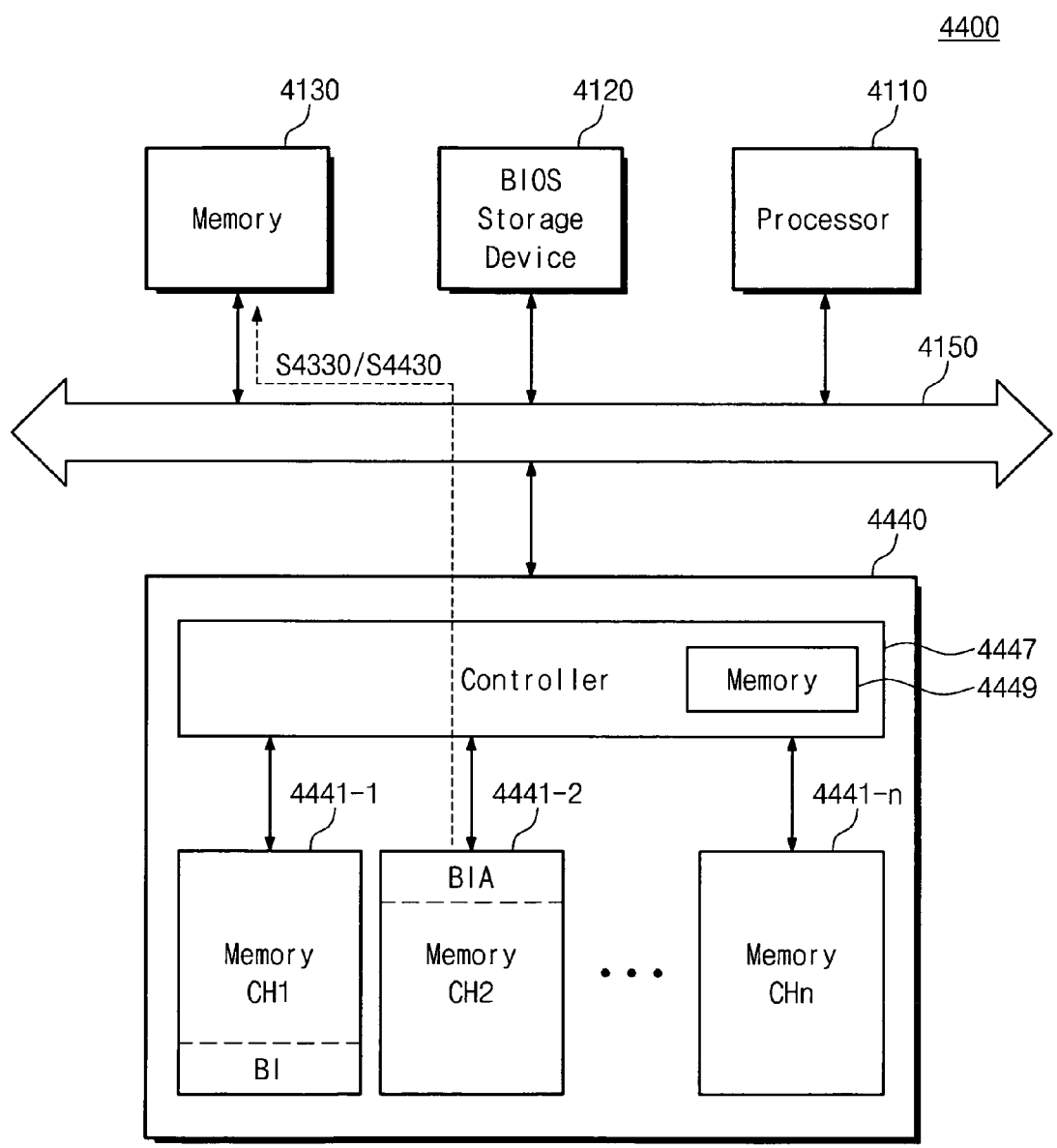
FIGS. 51 and 52 are block diagrams illustrating when the operations of FIG. 50 are performed in the computing system of FIG. 49.
Figure 52:
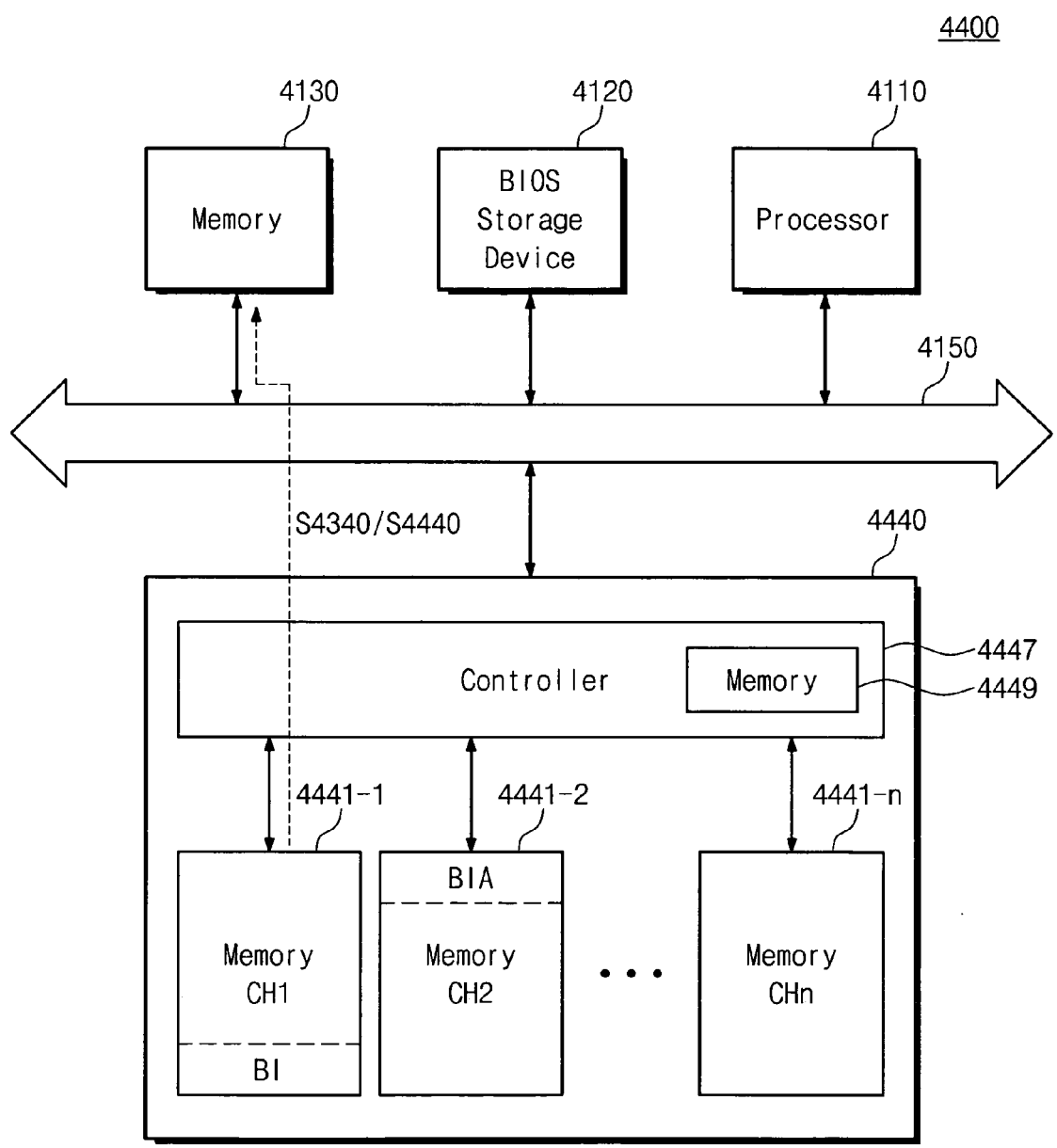

FIGS. 51 and 52 are block diagrams illustrating when the operations of FIG. 50 are performed in the computing system 4400 of FIG. 49. In FIGS. 51 and 52, the dotted line represents data transmission.

Referring to FIG. 50, power is supplied to the computing system 4440 in operations S4310 and S4410. For example, it is understood that BIOS is loaded from the BIOS storage device 4120 to the memory 4130 during a power-on operation. In operation S4320, the BIOS starts POST.

The POST is performed on devices (e.g., the memory 4130 or the storage device 4440) required for loading the BI, and then the BIOS requires the POST of peripheral devices.

Referring to FIGS. 50 and 51, after requesting the POST for peripheral devices, the BIOS reads BIA from the storage device 4440 in operations S4330 and S4430. For example, the read BIA will be stored in the memory 4130.

Referring to FIGS. 50 and 52, in operations S4340 and S4440, the BIOS read the BI from the storage device 4440 through the BIA. The read BI will be loaded into the memory 4130.

Referring to FIG. 50, once the loading of the BI is completed, in operation S4350, the BIOS performs an operation according to a response (for example, an interrupt) delivered from the peripheral devices. Also, it requests the POST of peripheral devices (for example, ODD, HDD or SSD, which is not set for booting) sharing a bus with the storage device 4440. Once an initialization for all the components is completed, the POST is terminated. In operation S4360, when the BI (e.g., the OS) is driven, the OS is executed and the computing system 4400 enters a standby status.

As mentioned above, operations S4320 to S4350 and operations S4430 to S4440 constitute the POST. During the POST, the BIOS loads the BI from the storage device 4440 to the memory 4130 through the system bus 4150. Accordingly, a booting speed can be improved.

The BIA is stored in the zeroth block BLK0 of the channels or a reserved area. The BIA is an address corresponding to an area where the BI is stored. While the computing system is in operation, an area where the BI is stored may be changed. At this point, the storage device stores BIA, but cannot access the BI through the BIA. That is, if an area where the boot image is stored is changed, a means is required for updating the BIA.

The computing system according to an embodiment detects the new BIA when an area where the BI is changed. Additionally, the BIA location is updated in the controller 4447 using the detected address.

For convenience of description, referring to the computing system 4100 of FIGS. 42 to 46, a method of detecting a changed address of the BI and a method of updating the BIA are illustrated. However, the method of detecting a changed address of the BI and the method of updating the BIA may be applied to the computing systems 4200, 4300, and 4400, and it is apparent that various modification and application are possible without being out of the technical scope of the example embodiments.

For convenience of description, a normal booting mode and an accelerated booting mode will be defined. The normal booting mode is defined to represent a typical booting method that reads BI from the storage device 4140 after POST is completed. The accelerated booting mode is defined to represent a booting method that loads the BI to the memory 4130 during POST according to one of the above embodiments.

Figure 53:
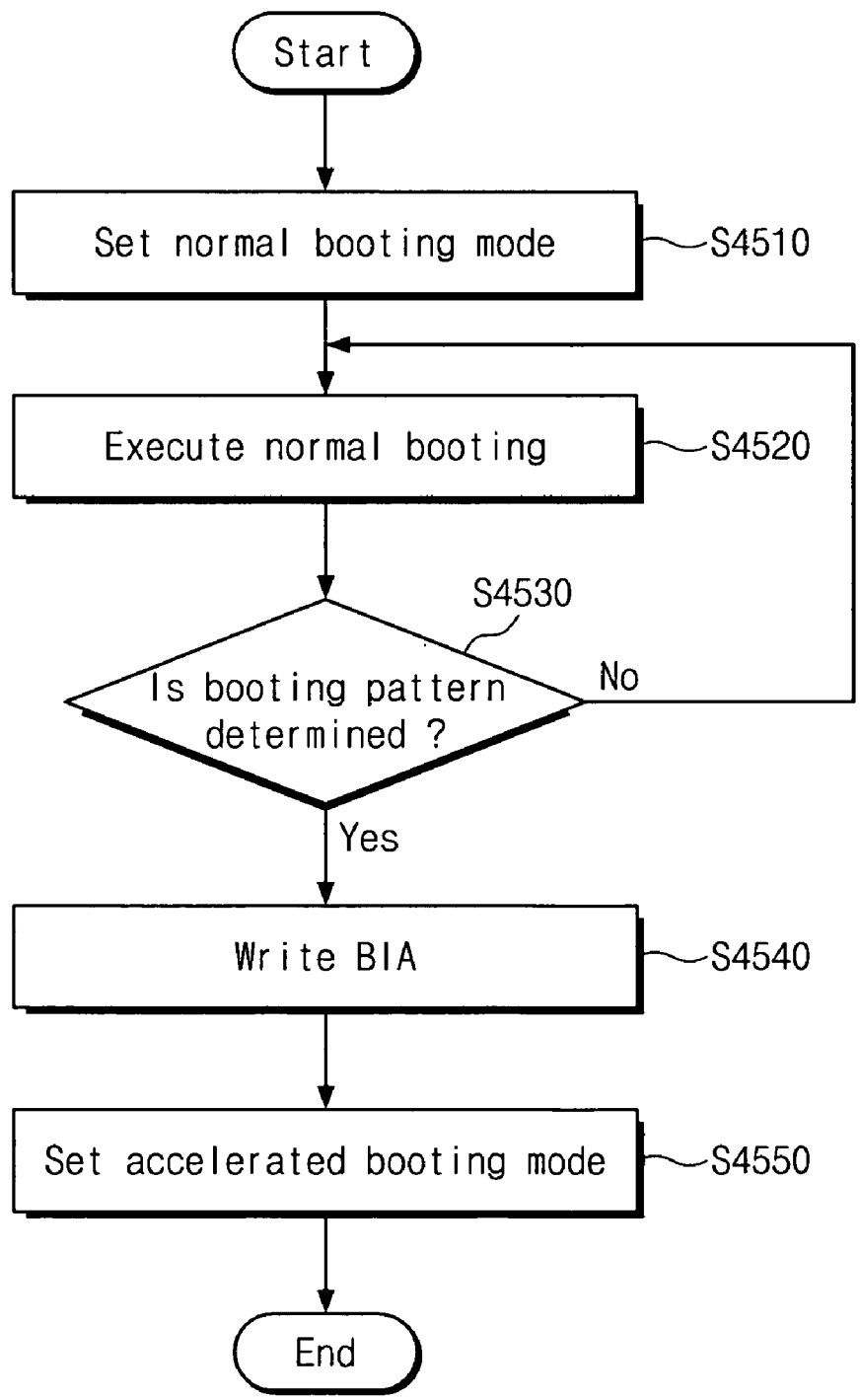
FIG. 53 is a flowchart illustrating a method in which the computing system according to an embodiment of inventive concepts of the present invention detects a changed address of a boot image.

FIG. 53 is a flowchart illustrating a method in which the computing system according to an embodiment detects a changed address of BI. Referring to FIGS. 42 and 53, the booting mode is set as a normal booting mode in operation S4510. In operation S4520, normal booting is performed. In operation S4530, if a booting pattern is not determined, the next booting is performed in a normal booting mode. A booting pattern is determined if the detected address storing the BI is the same address for a desired number of normal bootings. In particular, the detected BIA is stored along with a count value. Each time the same BIA is detected, the count value is updated. If, however, the detected BIA is not the same as the previous BIA, the stored BIA is replaced with the new detected BIA and the count value is reset to an initial count value. If the count value reaches a desired count value (e.g., 3), the booting pattern is considered determined. In operation S4530, if the booting pattern is determined, then in operation S4540 the BIA is updated. For example, the new BIA will be written into some zeroth blocks or a reserved area of the memories 4141-1 to 4141-n.

In operation S4550, the booting mode is set as an accelerated booting mode. The next booting operation will be performed using a fast booting method that loads the BI into the memory 4130 through the new BIA during the POST according to one of the above described embodiments.

As mentioned above, even if a storage area where the BI is changed, the computing system 4100 can detect an address of a changed storage area to update the BIA.

Figure 54:
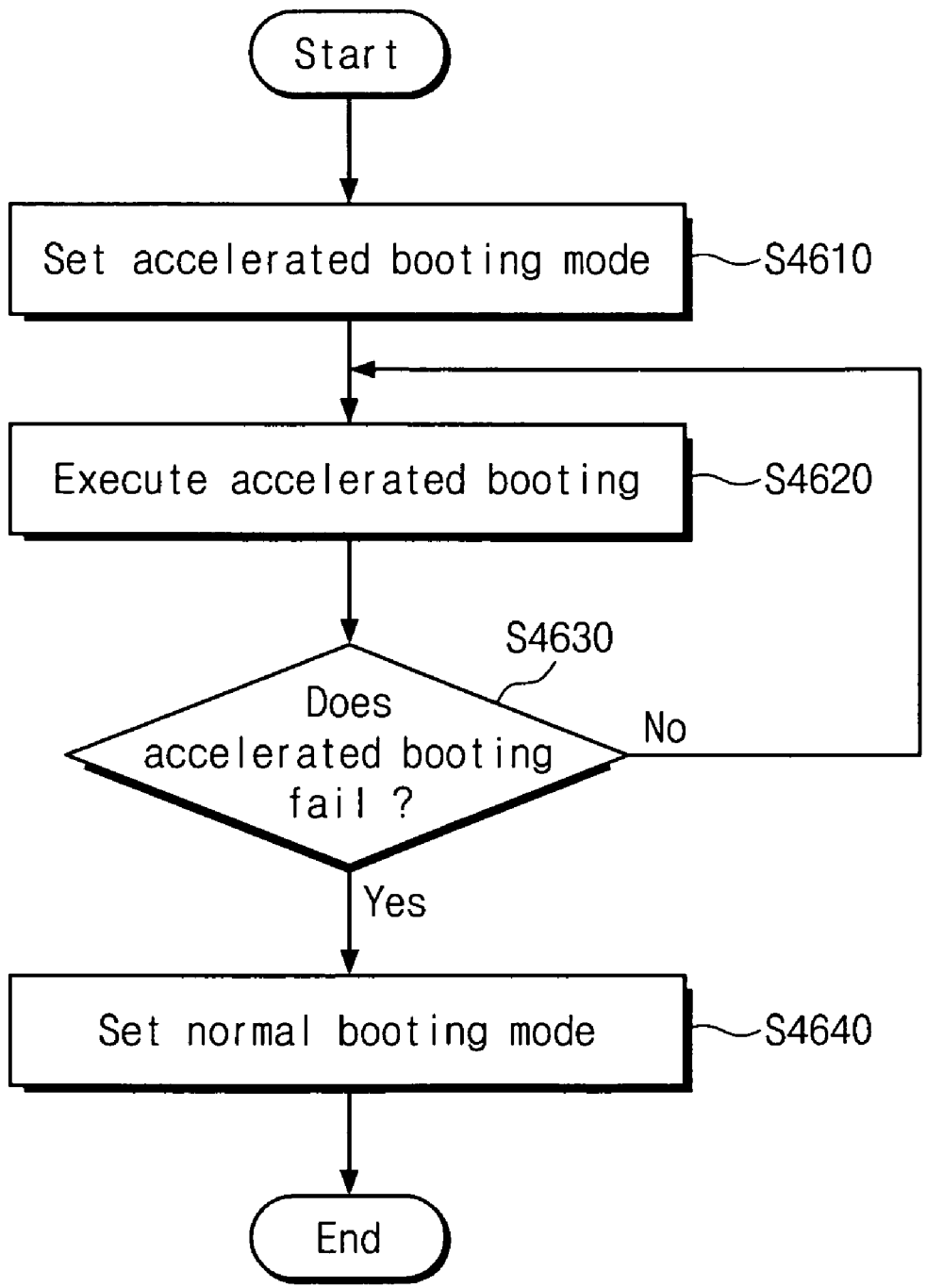
FIG. 54 is a flowchart illustrating an operation of the computing system according to an embodiment when booting fail occurs during an accelerated booting mode.

FIG. 54 is a flowchart illustrating an operation of the computing system according to an embodiment when booting fail occurs during an accelerated booting mode. Referring to FIGS. 42 and 54, in operation S4610, the booting mode is set as an accelerated booting mode. This operation corresponds to operation S4550 in FIG. 23. There, the storage device 4140 stores the BIA and the BI is stored in a storage area corresponding to the BIA.

In operation S4620, the accelerated or fast booting is performed. As long as the BI is stored in a storage area corresponding to the BIA, an accelerated booting is performed as described according to any of the previous embodiments.

In operation S4630, if the accelerated booting fails, then in operation S4640, the booting mode is performed in the normal booting mode. Next, until an address corresponding to a changed storage area of the BI is detected, as illustrated with reference to FIG. 53, the normal booting is performed. If a new BIA is determined, the booting mode is set as the accelerated booting mode.

As mentioned above, the computing systems 4100, 4200, 4300, and 4400 provide an accelerated booting function that loads the BI during the POST. If an area where the BI is stored is changed, the fast booting will fail. In this case, until the new BIA is determined, the normal node booting is performed. If the new BIA is determined, the BIA is updated and it will be set as the accelerated booting mode.

As described above referring to FIG. 42 to FIG. 54, the fifth embodiment of inventive concepts of the present invention provides a function of loading a boot image into a system memory during a POST. Thus, reliabilities of a nonvolatile memory device, a memory system including a nonvolatile memory device and a computing system including a memory system having a nonvolatile memory device are advanced.

As described above referring to FIG. 11 to FIG. 21, the second embodiment of inventive concepts of the present invention provides a function of setting a bad block to a read only service mode when reserved blocks are consumed. As described above referring to FIG. 33 to FIG. 41, the fourth embodiment of inventive concepts of the present invention provides a function of converting or changing a user block into a reserved block when reserved blocks are consumed. The second and fourth embodiments of inventive concepts of the present invention can be combined. For example, the second embodiment and the fourth embodiment can be enabled selectively.

For example, the second and fourth embodiments can be enabled simultaneously. First of all, the second embodiment is enabled. When a specific condition is satisfied, the fourth embodiment is enabled. For example, when a number of bad blocks reach a threshold number, the fourth embodiment is enabled.

For example, the fourth embodiment is enabled firstly. When a specific condition is satisfied, the second embodiment is enabled. For example, when a number of user blocks reaches a threshold value, the second embodiment is enabled.

As described above, the first embodiment described referring to FIG. 1 to FIG. 10, the second embodiment described referring to FIG. 11 to FIG. 21 and the fourth embodiment described referring to FIGS. 33 to 41 advance reliabilities of a nonvolatile memory device, a memory system (e.g. a SSD) including a nonvolatile memory device and a computing system including a memory system having a nonvolatile memory device. When at least one of the first, second and fourth embodiments of inventive concepts of the present invention is applied, reliabilities of a nonvolatile memory device, a memory system (e.g. a SSD) including a nonvolatile memory device and a computing system including a memory system having a nonvolatile memory device are advanced.

As described above, the third embodiment described referring to FIG. 22 to FIG. 32 and fifth embodiment described referring to FIG. 42 to FIG. 54 advance operating speed of a nonvolatile memory device, a memory system (e.g. a SSD)

including a nonvolatile memory device and a computing system including a memory system having a nonvolatile memory device. When at least one of the third and fifth embodiments of inventive concepts of the present invention are applied, operating speed of a nonvolatile memory device, a memory system (e.g. a SSD) including a nonvolatile memory device and a computing system including a memory system having a nonvolatile memory device are advanced.

When combinations between at least one of the first, second and fourth embodiments of inventive concepts of the present invention and at least one of the third and fifth embodiments of inventive concepts of the present invention are applied, both of reliabilities and operating speed of a nonvolatile memory device, a memory system (e.g. a SSD) including a nonvolatile memory device and a computing system including a memory system having a nonvolatile memory device are advanced.

In a first applied embodiment, when a bad block arises and no reserved block exists, then one of user blocks is placed in the read only service mode.

In a second applied embodiment, when a bad block arises and a number of reserved blocks is less than a threshold value, one of user blocks is converted into a reserved block and the bad block is replaced with one of the reserved blocks.

In a third applied embodiment, when a bad block arises, a number of reserved blocks is less than a first threshold value and a number of user blocks is higher than a second threshold value, then one of the user blocks is converted into a reserved block and one of the bad block is replaced with one of the reserved blocks. When a bad block arises, a number of the reserved blocks is less than the first threshold value and a number of the user blocks is less than the second threshold value, then the bad block is replaced with one of the reserved blocks and no user block is converted into a reserved block. When a bad block arises, no reserved block exists and a number of the user block is less than the second threshold value, then the bad block is place in a read only service mode.

In a fourth applied embodiment, when a bad bock arises, one of the second embodiment according to inventive concepts of the present invention described referring to FIG. 11 to FIG. 21 and the fourth embodiment according to inventive concepts of the present invention described referring to FIG. 33 to FIG. 41 is performed selectively. For example, the selection is made by setting a parameter (e.g., a program circuit or a mode register set) of a nonvolatile memory device, a memory system including a nonvolatile memory device and a computing system including a memory system having a nonvolatile memory device. For example, the selection is made automatically by a nonvolatile memory device, a memory system including a nonvolatile memory device and a computing system including a memory system having a nonvolatile memory device (e.g., by the status checking module described referring to FIG. 1 to FIG. 10).

In a fifth applied embodiment, when a bad block arises, the status checking module 125, 225, 415 or 515 described referring to FIG. 1 to FIG. 10 checks a number of the bad blocks. When the number of the bad blocks reaches a threshold number, the status checking module 125, 225, 415 or 515 displays an intermediate (e.g., a warning) status or a bad status. Furthermore, one of the first to fourth applied embodiments is performed.

In a sixth applied embodiment, the status checking module 125, 225, 415 or 515 checks a number of reserved blocks. When the number of the reserved blocks is less than a threshold number, the status checking module 125, 225, 415 or 515 displays a message, which asks a determination to convert an user block into a reserved block should be made. Based on a response from an user, the status checking module 125, 225, 415 or 515 selectively converts a user block into a reserved block.

In a seventh applied embodiment, the status checking module 125, 225, 415 or 515 checks a status of a nonvolatile memory device, a memory system including a nonvolatile memory device during an idle time. When a nonvolatile memory device, a memory system including a nonvolatile memory device includes the I/O predictor 220 or 520 described referring to FIG. 22 to FIG. 32, and the prediction is hit, a response to the hit request is provided faster than a normal response (i.e., response to a non-hit request). Thus, an amount of idle time can occur. During the idle time, the status checking module 125, 225, 415 or 515 checks a status of a nonvolatile memory device and a memory system including a nonvolatile memory device. For example, the status checking module 125, 225, 415 or 515 convert a user block into a reserved block or places a bad block into a read only service mode.

In an eighth applied embodiment, the status checking module 125, 225, 415 or 515 checks whether a booting mode is the normal booting mode or the accelerated booting mode described referring to FIG. 42 to FIG. 54. Then, the status checking module 125, 225, 415 or 515 displays the booting mode.

In a ninth applied embodiment, as described referring to FIG. 42 to FIG. 54, the system memory and the memory system including a nonvolatile memory device is initialized firstly during the POST. Then, while other components are initialized during the POST, the status checking module 125, 225, 415 or 515 checks a status of a nonvolatile memory device and a memory system including a nonvolatile memory device.

In a tenth applied embodiment, the status checking module 125, 225, 415 or 515 checks a status of the reserved block storing the boot image. When the reserved block storing the boot image is the bad status, then the status checking module 125, 225, 415 or 515 converts a user block into the reserved block and copies the boot image to the converted reserved block.

In an eleventh applied embodiment, the status checking module 125, 225, 415 or 515 places the reserved block storing the boot image into a read only service mode.

In a twelfth applied embodiment, the status checking module 125, 225, 415 or 515 checks a status of the reserved block storing the boot image, and displays the status of the reserved block storing the boot image.

In a thirteenth applied embodiment, the status checking module 125, 225, 415 or 515 checks a status of the I/O predictor 220 or 520, and displays a status of a hit ratio (e.g., as a color of LED).

In a fourteenth applied embodiment, the status checking module 125, 225, 415 or 515 checks a status of the I/O predictor 220 or 520. For example, I/O predictor 220 or 520 checks the status of the pattern DB 223. When the pattern DB has an amount of data less than a threshold amount, the status checking module 125, 225, 415 or 515 disables a prediction function of the I/O predictor 220 or 520. When the pattern DB 223 has an amount of data more than a threshold amount, the status checking module 125, 225, 415 or 515 enables the prediction function the I/O predictor 220 or 520. Even though the function of the I/O predictor 220 or 520 is disabled, the pattern DB 223 continues to be updated.

In a fifteenth applied embodiment, the status checking module 125, 225, 415 or 515 checks a status of bad blocks with read only service mode. When a number of bad block with a read only service mode selected during an I/O process is higher than a threshold number, then the status checking module 125, 225, 415 or 515 checks on availability to convert user blocks into reserved blocks and selectively replaces one or more of the bad blocks with the reserved blocks.

In a sixteenth applied embodiment, the status checking module 125, 225, 415 or 515 checks a status of the I/O predictor 220 or 520. When data to be pre-fetched is stored in a block with the read only service mode and a hit ratio of the block with the read only service mode is less than a threshold value, then the status checking module 125, 225, 415 or 515 prevents the pre-fetch in order to maintain a reliability of data stored in the block with the read only service mode.

Many of the above described embodiments refer to caching at the memory controller as well as the operation of an FTL. These operations and structures may be performed as described in U.S. application Ser. No. 10/390,667, filed Mar. 19, 2003, incorporated herein be reference in its entirety.

As described above, at least one of various functions corresponding to the first to fifth embodiments according to inventive concepts of the present invention and the first to sixteenth applied embodiments is performed by a controller controlling a nonvolatile memory device. However, at least one of the various functions can be modified to be performed by an operating system OS.

The above-disclosed subject matter is to be considered illustrative, and not restrictive, and the appended claims are intended to cover all such modifications, enhancements, and other embodiments, which fall within the true spirit and scope of the example embodiments. Thus, to the maximum extent allowed by law, the scope of the example embodiments are to be determined by the broadest permissible interpretation of the following claims and their equivalents, and shall not be restricted or limited by the foregoing detailed description.

We claim:

1. A method of managing a solid state drive, the solid state drive including one or more memory cell arrays divided into a plurality of blocks, a first portion of the blocks designated for storing user data and a second portion of the blocks being designated as reserved blocks for replacing defective blocks in the first portion, the method comprising:
   performing, by a memory controller, one of at least one read operation and at least one write operation through a plurality of channels with respect to the first portion; and
   selectively reformatting, by the memory controller, the solid state drive to convert one or more blocks in the first portion into reserved blocks, the selectively reformatting including a host accessing the solid state drive interpreting a size of the first portion as being unchanged.

2. The method of claim 1, further comprising:
   first determining, at the memory controller, if a number of available reserved blocks in the solid state drive is less than a threshold number, an available reserved block being a reserved block available to replace a block in the first portion; and wherein
   the reformatting step reformats the solid state drive to convert one or more blocks in the first portion into reserved blocks if the first determining step determines the number of available reserved blocks in the solid state drive is less than the threshold number.

3. The method of claim 2, further comprising:
   second determining if sufficient available space exists in the first portion to permit reformatting the solid state drive if the first determining step determines the number of available reserved blocks in the solid state drive is less than a threshold number; and wherein
   the reformatting step reformats the solid state drive to convert one or more blocks in the first portion into available reserved blocks if (1) the first determining step determines the number of available reserved blocks in the solid state drive is less than a threshold number and (2) the second determining step determines sufficient available space exists in the first portion to permit reformatting the solid state drive.

4. The method of claim 3, wherein the second determining step determines whether a sufficient number of free blocks exist and can be created in the first portion such that if converted to available reserved blocks the number of available reserved blocks will exceed the threshold number.

5. The method of claim 4, wherein the reserved blocks are distributed among a plurality of memory chips in the solid state drive.

6. The method of claim 5, further comprising:
   loading code data from at least one of the plurality of memory chips to a random access memory to manage the solid state drive.

7. The method of claim 3, further comprising:
   downloading firmware for backing up data on the solid state drive if the second determining step determines insufficient available space exists in the first portion to permit reformatting the solid state drive.

8. The method of claim 3, further comprising:
   backing up data on the solid state drive if the second determining step determines insufficient available space exists in the first portion to permit reformatting the solid state drive.

9. The method of claim 1, wherein the reformatting step comprises:
   filling, at least partially, at least one block in the first portion by moving valid data portions from partially valid blocks in the first portion;
   creating free blocks from the partially valid blocks by erasing the partially valid blocks; and
   converting at least one of the created free blocks to an available reserved block.

10. A method of managing a solid state drive, the solid state drive including one or more memory cell arrays divided into a plurality of blocks, a first portion of the blocks designated for storing user data and a second portion of the blocks being designated as reserved blocks for replacing defective blocks in the first portion, the method comprising:
    performing, by a memory controller, one of at least one read operation and at least one write operation through a plurality of channels with respect to the first portion; and
    selectively reformatting, by the memory controller, the solid state drive to convert one or more blocks in the first portion into reserved blocks, wherein the selectively reformatting includes,
        filling, at least partially, at least one block in the first portion by moving valid data portions from partially valid blocks in the first portion,
        creating free blocks from the partially valid blocks by erasing the partially valid blocks, and
        setting at least one of the created free blocks to a hybrid state, the hybrid state being recognized as a bad block by a host accessing the solid state drive and being recognized as an available reserved block by the solid state drive such that the host interprets a size of the first portion as being unchanged.

11. The method of claim 1, wherein the reformatting step comprises:
    converting at least one free block in the first portion to an available reserved block.

12. A method of managing a solid state drive, the solid state drive including one or more memory cell arrays divided into a plurality of blocks, a first portion of the blocks designated for storing user data and a second portion of the blocks being designated as reserved blocks for replacing defective blocks in the first portion, the method comprising:

performing, by a memory controller, one of at least one read operation and at least one write operation through a plurality of channels with respect to the first portion; and selectively reformatting, by the memory controller, the solid state drive to convert one or more blocks in the first portion into reserved blocks, wherein the selectively reformatting includes, setting at least one free block in the first portion to a hybrid state, the hybrid state being recognized as a bad block by a host accessing the solid state drive and being recognized as an available reserved block by the solid state drive such that the host interprets a size of the first portion as being unchanged.

13. The method of claim 1, wherein the reformatting step comprises:

converting at least one invalid block storing invalid data to a free block; and converting at least one of the created free blocks to an available reserved block.

14. A method of managing a solid state drive, the solid state drive including one or more memory cell arrays divided into a plurality of blocks, a first portion of the blocks designated for storing user data and a second portion of the blocks being designated as reserved blocks for replacing defective blocks in the first portion, the method comprising:

performing, by a memory controller, one of at least one read operation and at least one write operation through a plurality of channels with respect to the first portion; and selectively reformatting, by the memory controller, the solid state drive to convert one or more blocks in the first portion into reserved blocks, wherein the selectively reformatting includes, converting at least one invalid block storing invalid data to a free block, and setting at least one of the created free blocks to a hybrid state, the hybrid state being recognized as a bad block by a host accessing the solid state drive and being recognized as an available reserved block by the solid state drive such that the host interprets a size of the first portion as being unchanged.

15. The method of claim 1, further comprising:
updating status information for the solid state drive based on the reformatting step.

16. The method of claim 15, further comprising:
determining a status state of the solid state drive based on the status information, the status state being one of a good state, an intermediate state and a bad state, the intermediate state being between the good state and the bad state.

17. The method of claim 16, further comprising:
indicating the determined status state.

18. A system, comprising:
a memory device including one or more memory cell arrays divided into a plurality of blocks, a first portion of the blocks designated for storing user data and a second portion of the blocks being designated as reserved blocks for replacing defective blocks in the first portion; and a memory controller configured to manage reading and writing through a plurality of channels from the first portion and configured to selectively change one or more blocks in the first portion to reserved blocks, wherein a host drive interprets a size of the first portion as being unchanged when accessing the solid state drive.

19. The system of claim 18, wherein the memory controller is configured to determine if a number of available reserved blocks in the memory device is less than a threshold number, an available reserved block being a reserved block available to replace a block in the first portion, and the memory controller is configured to change one or more blocks in the first portion into reserved blocks if the number of available reserved blocks in the solid state drive is less than the threshold number.

20. The system of claim 19, wherein the memory controller is configured to receive information on the number of available reserved blocks from a status checking module.

21. The system of claim 18, wherein the memory controller is configured to remove an association of at least one block address with the first portion to change one or more blocks in the first portion into reserved blocks.

22. The system of claim 18, wherein the memory controller is configured to change an association of at least one block address from the first portion to the second portion to change one or more blocks in the first portion into reserved blocks.

23. The system of claim 18, wherein the memory controller is configured to change an indicator associated with at least one block address in an address translation table to change one or more blocks in the first portion into reserved blocks.

24. A method of managing a solid state drive, the solid state drive including one or more memory cell arrays divided into a plurality of blocks, a first portion of the blocks designated for storing user data and a second portion of the blocks being designated as reserved blocks for replacing defective blocks in the first portion, the method comprising:

performing, by a memory controller, one of at least one read operation and at least one write operation through a plurality of channels with respect to the first portion; and selectively increasing, by the memory controller, a number of available reserved blocks in the solid state drive, an available reserved block being a reserved block available to replace a block in the first portion, the selectively increasing including a host accessing the solid state drive interpreting a size of the first portion as being unchanged.

25. The method of claim 24, wherein the increasing step decreases a number of blocks in the first portion.

26. The method of claim 24, wherein the increasing step does not decrease the number of blocks in the first portion.

27. The method of claim 24, wherein the increasing step increases the number of available reserved blocks to at least a desired number.

28. A method of managing a solid state drive, the solid state drive including one or more memory cell arrays divided into a plurality of blocks, a first portion of the blocks designated for storing user data and a second portion of the blocks being designated as reserved blocks for replacing defective blocks in the first portion, the method comprising:

performing, by a memory controller, one of at least one read operation and at least one write operation with respect to the first portion; and selectively setting, by the memory controller, at least one block in the first portion to a hybrid state, the hybrid state being recognized as a bad block by a host accessing the solid state drive and being recognized as an available reserved block by the solid state drive such that the host interprets a size of the first portion as being unchanged, an available reserved block being a reserved block available to replace a block in the first portion.

29. The method of claim 28, wherein the setting step sets an indicator associated with the at least one block in a flash translation layer of a memory controller to indicate the hybrid state.

* * * * *